(12) United States Patent
Kushibe

(10) Patent No.: US 12,175,329 B2
(45) Date of Patent: Dec. 24, 2024

(54) APPARATUS AND METHOD FOR OPTIMIZATION

(71) Applicant: FUJITSU LIMITED, Kawasaki (JP)

(72) Inventor: Daisuke Kushibe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 507 days.

(21) Appl. No.: 17/480,723

(22) Filed: Sep. 21, 2021

(65) Prior Publication Data
US 2022/0114470 A1    Apr. 14, 2022

(30) Foreign Application Priority Data

Oct. 9, 2020    (JP) ................................. 2020-170876

(51) Int. Cl.
*G06N 10/00*    (2022.01)

(52) U.S. Cl.
CPC .................................... *G06N 10/00* (2019.01)

(58) Field of Classification Search
CPC ....... G06F 30/20; G06F 2111/08; G06N 7/08; G06N 7/01
See application file for complete search history.

(56) References Cited

U.S. PATENT DOCUMENTS

| | | | | |
|---|---|---|---|---|
| 11,714,936 B2* | 8/2023 | Kushibe | ................. | G06F 30/20 703/13 |
| 2008/0065573 A1* | 3/2008 | Macready | ................ | G06N 7/08 706/19 |
| 2014/0297247 A1* | 10/2014 | Troyer | ..................... | G06N 7/01 703/21 |
| 2016/0343932 A1* | 11/2016 | Mohseni | ............... | H10N 60/805 |
| 2018/0005114 A1* | 1/2018 | Tomita | ..................... | G06N 3/04 |
| 2019/0019100 A1* | 1/2019 | Roques-Carmes | .. | G06N 3/0675 |
| 2019/0149425 A1* | 5/2019 | Larish | .................... | G06N 3/045 706/16 |
| 2019/0235033 A1 | 8/2019 | Ohzeki | | |
| 2020/0019885 A1 | 1/2020 | Takemoto et al. | | |
| 2020/0090071 A1* | 3/2020 | Franzke | ................... | G06N 7/01 |

(Continued)

FOREIGN PATENT DOCUMENTS

| | | |
|---|---|---|
| JP | 2018-67200 | 4/2018 |
| JP | 2020-9301 | 1/2020 |
| JP | 2020-64535 | 4/2020 |

OTHER PUBLICATIONS

Sanroku Tsukamoto et al., "An Accelerator Architecture for Combinatorial Optimization Problems", Fujitsu Sci. Tech. J., vol. 53, No. 5, pp. 8-13, Sep. 2017.

(Continued)

*Primary Examiner* — Stacy Whitmore
(74) *Attorney, Agent, or Firm* — STAAS & HALSEY LLP

(57) ABSTRACT

An optimization apparatus finds the ground state of an Ising model that represents a target problem by running a simulation of state changes of the Ising model that occur upon reduction in a magnetic field applied to the Ising model. In doing so, the optimization apparatus adds a value corresponding to noise to some of coefficients used in the simulation. Then, the optimization apparatus performs a first process of real time propagation of reducing strength of the magnetic field as time in the simulation progresses and a second process of reducing energy of the Ising model based on an imaginary time propagation method.

6 Claims, 30 Drawing Sheets

(56) References Cited

U.S. PATENT DOCUMENTS

2020/0125984 A1   4/2020  Kanda et al.
2021/0286919 A1*  9/2021  Kushibe .................. G06N 7/01
2023/0351236 A1* 11/2023  Kushibe ................. G06N 10/60

OTHER PUBLICATIONS

S. Kirkpatrick et al., "Optimization by Simulated Annealing", Science, New Series, vol. 220, No. 4598, pp. 671-680, May 13, 1983.
Koji Hukushima et al., "Exchange Monte Carlo Method and Application to Spin Glass Simulations", Journal of the Physical Society of Japan, vol. 65, No. 6, pp. 1604-1608, Jun. 1996.
E. D. Dahl, "Programming with D-Wave: Map Coloring Problem", whitepaper, D-Wave Systems, Nov. 2013.
Tadashi Kadowaki et al., "Quantum annealing in the transverse Ising model", Physical Review E, vol. 58, No. 5, 5355-5363, Nov. 1998.
Hidetoshi Nishimori et al., "Exponential Enhancement of the Efficiency of Quantum Annealing by Non-Stoquastic Hamiltonians", Hypothesis and Theory, frontiers in ICT, vol. 4, Article 2, Feb. 2017.
Tameem Albash et al., "Demonstration of a scaling advantage for a quantum annealer over simulated annealing", arXiv:1705.07452v3, Aug. 6, 2018.
J. R. Abo-Shaeer et al., "Observation of Vortex Lattices in Bose-Einstein Condensates", Science, vol. 292, Issue 5516, pp. 476-p479, Apr. 20, 2001.
Masaki Mutou et al., "Numerical simulation of quantized vortices in 2-Dimensional Bose-Einstein Condensates", The Fifth Asian International Seminar on Atomic and Molecular Physics, pp. 202-203, Oct. 2002.
D. L. Feder et al., "Dark-soliton states of Bose-Einstein condensates in anisotropic traps", Physical Review A, vol. 62, 053606, Oct. 19, 2000.
Naomichi Hatano et al., "Finding Exponential Product Formulas of Higher Orders", Quantum Annealing and Other Optimization Methods (Lecture Notes in Physics vol. 679), pp. 37-68, Nov. 16, 2005.
Mikio Nakahara et al., Solution for Traveling Salesman Problems by Adiabatic Quantum Computing, Annual reports by Research Institute for Science and Technology, vol. 29, pp. 1-9, Feb. 28, 2017 Partial Translation.
Adil A Gangat et al: "Steady States of Infinite-Size Dissipative Quantum Chains via Imaginary Time Evolution", arxiv org, Cornell University Library, 201 Olin Library Cornell University Ithaca, NY 14853, Aug. 22, 2016 (Aug. 22, 2016), XP080721454, pp. 1-5.
Extended European Search Report, dated Mar. 1, 2022, in corresponding European Patent Application No. 21196685.8 (10 pp.).
European Office Action dated Oct. 28, 2024 for European Application No. 21196685.8.

* cited by examiner

8-CITY TSP

| city No. | x | y |
|---|---|---|
| 1 | 0.05 | 0.43 |
| 2 | 0.44 | 0.21 |
| 3 | 0.64 | 0.25 |
| 4 | 0.96 | 0.22 |
| 5 | 0.77 | 0.41 |
| 6 | 0.8 | 0.72 |
| 7 | 0.4 | 0.6 |
| 8 | 0.42 | 0.44 |

FIG. 18

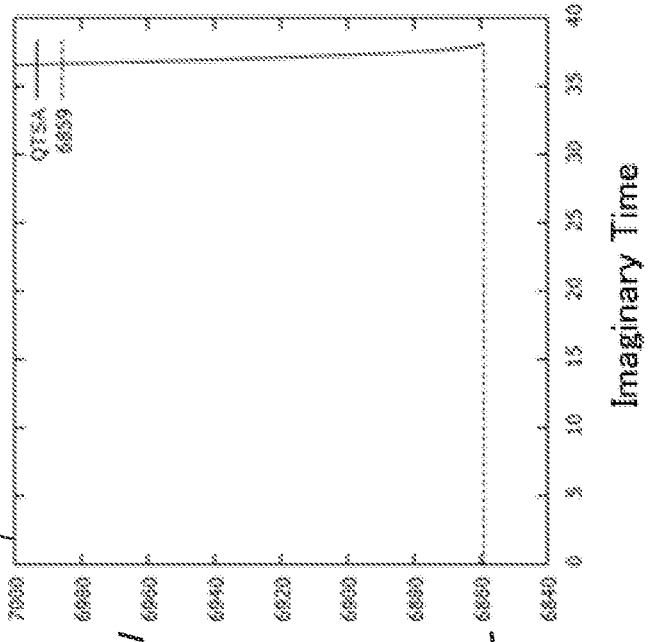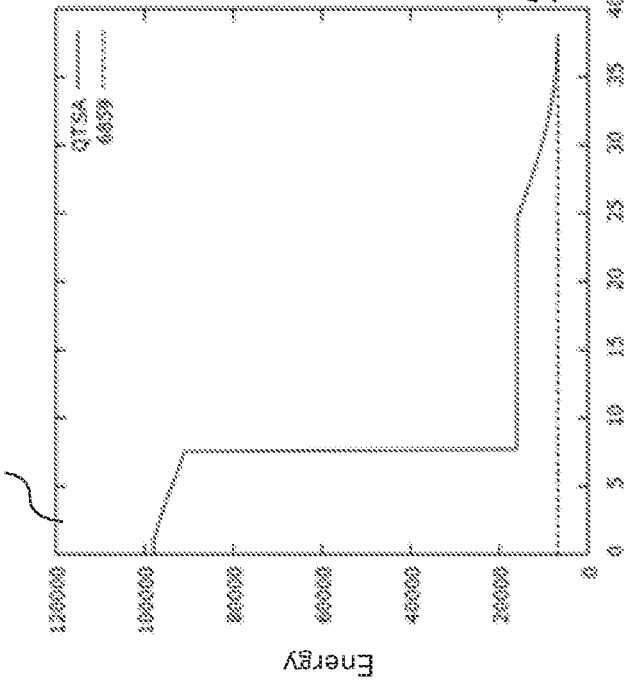
FIG. 26

APPARATUS AND METHOD FOR OPTIMIZATION

CROSS-REFERENCE TO RELATED APPLICATION

This application is based upon and claims the benefit of priority of the prior Japanese Patent Application No. 2020-170876, filed on Oct. 9, 2020, the entire contents of which are incorporated herein by reference.

FIELD

The embodiments discussed herein relate to an apparatus and method for optimization.

BACKGROUND

Minimization problems (or combinatorial optimization problems) for finding the minimum value of an evaluation, also called energy, function (or a combination of the values of state variables of the evaluation function which yield the minimum value) are frequently encountered in natural and social science. In recent years, there is an accelerated trend of formulating such a problem using the Ising model, which describes the behavior of interacting magnetic spins.

One commonly used solution is called simulated annealing (SA) which introduces a stochastic process using Markov Chain Monte Carlo (MCMC), defines a particular distribution such as a Boltzmann distribution, and then introduces a temperature parameter and artificially lowers the temperature. However, to reach an exact solution by simulated annealing, the temperature schedule needs to be inversely proportional to the logarithm of time. That is, fast cooling does not always result in the optimal solution.

Under such circumstances, the development of computing skills and machines based on quantum mechanics has become active in recent years. The technical background of this trend is the implementation of Ising quantum computers. The Ising quantum computers take quantum annealing (QA) as their logical basis. The quantum computers are expected to be able to solve problems which are difficult for commonly used classical computers with electronic circuits to solve within a realistic time frame. At the present stage, not all but some problems are expected to be solved fast by the quantum computers. Typical examples of such are prime factorization problems, which are the basis of cryptographic communication such as Rivest-Shamir-Adleman (RSA) cryptosystem. Thus, because of the implementation of the quantum computers albeit Ising-model ones, a trend of exploring the range of applications of the quantum computers has been accelerated. See, for example, the following documents.

Japanese Laid-open Patent Publication No. 2018-067200.
Japanese Laid-open Patent Publication No. 2020-64535.
Japanese Laid-open Patent Publication No. 2020-9301.
Sanroku Tsukamoto, Motomu Takatsu, Satoshi Matsubara and Hirotaka Tamura, "An Accelerator Architecture for Combinatorial Optimization Problems", FUJITSU Sci. Tech. J., vol. 53, no. 5, pp. 8-13, September 2017.
S. Kirkpatrick, C. D. Gelatt and M. P. Vecchi, "Optimization by Simulated Annealing", Science, vol. 220, no. 4598, pp. 671-680, 13 May 1983.
Koji Hukushima and Koji Nemoto, "Exchange Monte Carlo Method and Application to Spin Glass Simulations", Journal of the Physical Society of Japan, vol. 65, no. 6, pp. 1604-1608, June 1996.
E. D. Dahl, "Programming with D-Wave: Map Coloring Problem", D-Wave Systems whitepaper, November 2013.
Tadashi Kadowaki and Hidetoshi Nishimori, "Quantum Annealing in the Transverse Ising Model", Phys. Rev. E, vol. 58, no. 5, pp. 5355-5363, November 1998.
Hidetoshi Nishimori and Kabuki Takada, "Exponential Enhancement of the Efficiency of Quantum Annealing by Non-Stoquastic Hamiltonians", Frontiers in ICT, volume 4, article 2, February 2017.
T. Albash and D. A. Lidar, "Demonstration of a Scaling Advantage for a Quantum Annealer over Simulated Annealing", arXiv:1705.07452v3, 6 Aug. 2018.
J. R. Abo-Shaeer, C. Raman, J. M. Vogels and W. Ketterle, "Observation of Vortex Lattices in Bose-Einstein Condensates", Science, vol. 292, no. 5516, pp. 476-479, 20 Apr. 2001.
Masaki Mutou, Toru Morishita, Daisuke Kushibe, Shin-ichi Watanabe and Michio Matsuzawa, "Numerical Simulation of Quantized Vortices in 2-Dimensional Bose-Einstein Condensates", The Fifth Asian International Seminar on Atomic and Molecular Physics, pp. 202-203, October 2002.
D. L. Feder, M. S. Pindzola, L. A. Collins, B. I. Schneider and C. W. Clark, "Dark-soliton States of Bose-Einstein Condensates in Anisotropic Traps", Phys. Rev. A, 62, 053606 (2000), 19 Oct. 2000.
Naomichi Hatano and Masuo Suzuki, "Finding Exponential Product Formulas of Higher Orders", Quantum Annealing and Other Optimization Methods, pp. 37-68, 16 Nov. 2005.
Mikio Nakahara, Masamitsu Bando and Shu Tanaka, "Solution for Traveling Salesman Problems by Adiabatic Quantum Computing", Annual reports by Research Institute for Science and Technology (Kinki University), 29, pp. 1-9, 28 Feb. 2017.

Let us consider a case of finding, in a minimization problem defined by N binary variables (N is an integer greater than or equal to 1), the ground state (the optimal value) of a system and a wavefunction of the ground state (a combination of state variables yielding the optimal value) by carrying out a calculation, the principle of which is based on quantum mechanics. The system here refers to a subspace separated from the surrounding environment. When converted to an Ising model, this problem may be solved using a quantum annealing Hamiltonian. An apparatus used to solve such minimization problems is called optimization apparatus.

In exploration using quantum annealing, the optimization apparatus sets an initial state in which the N spins are subjected to a transverse field. The optimization apparatus also arranges the initial state as an experimentally preparable quantum state. Starting with the initial state, the optimization apparatus gradually reduces the transverse field over time. In the end, the transverse field completely disappears and the ground state, i.e., the lowest energy state, of the target Hamiltonian is obtained.

However, in the exploration using quantum annealing, strong constraints are imposed on how to reduce the transverse field so as not to develop a phenomenon called first-order quantum phase transition. That is, the optimization apparatus is able to prevent the occurrence of the first-order quantum phase transition by slowly reducing the transverse field. However, this slow reduction in the strength of the transverse field for the purpose of preventing the first-order quantum phase transition results in prolonged exploration for the solution to the minimization problem.

SUMMARY

According to one embodiment, there is provided an optimization apparatus including a memory; and a processor coupled to the memory and configured to execute a process including: adding, in finding a ground state of an Ising model by running a simulation of state changes of the Ising model that occur upon reduction in a magnetic field applied to the Ising model, a value corresponding to noise to some of coefficients used in the simulation, the Ising model representing a target problem, and performing a first process of real time propagation of reducing strength of the magnetic field as time in the simulation progresses and a second process of reducing energy of the Ising model based on an imaginary time propagation method.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 illustrates an exemplary 8-city TSP;

FIG. 26 illustrates energy dissipation in the quantum theory approach;

DESCRIPTION OF EMBODIMENTS

Several embodiments will be described below with reference to the accompanying drawings. These embodiments may be combined with each other unless they have contradictory features.

(a) First Embodiment

A first embodiment is directed to an optimization method that extends time in terms of a quantum-mechanical time propagation operator to a complex number for the purpose of introducing the effect of heat dissipation to finding the ground state of an Ising model and implements heat dissipation based on an imaginary time propagation (ITP) method. Introduction of a heat dissipation mechanism allows for relaxation to the ground state without strictly complying with adiabatic transition condition. Note however that the introduction of the heat dissipation mechanism using the ITP method does not always lead to obtaining the ground state. In view of this, the optimization method according to the first embodiment increases the possibility of the ground state being reached by adding, to the Ising model, noise that disrupts the symmetry of a wavefunction.

Figure 1:
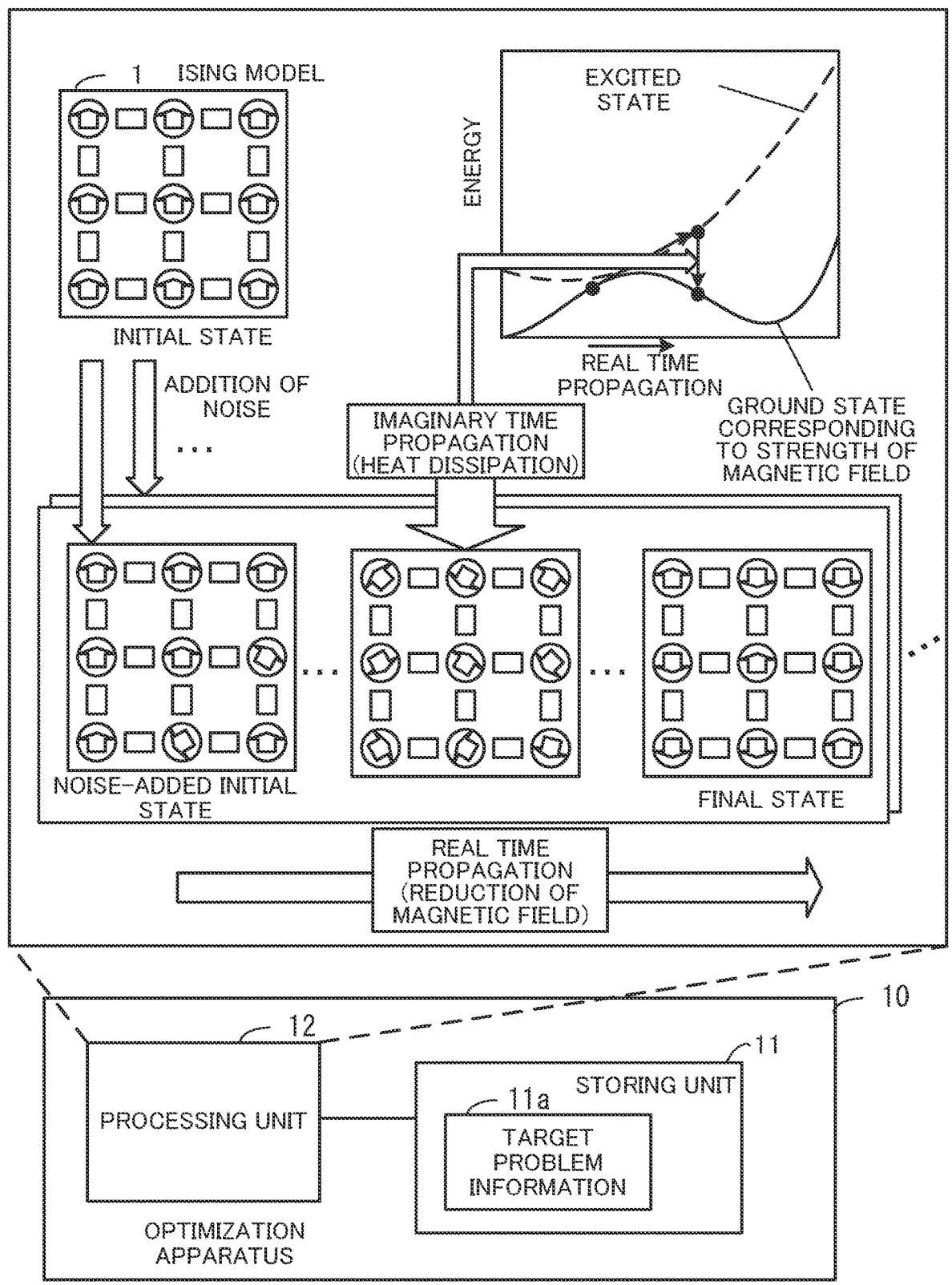
FIG. 1 illustrates an exemplary optimization method according to a first embodiment.

FIG. 1 illustrates an exemplary optimization method according to the first embodiment. FIG. 1 depicts an optimization apparatus 10 for implementing an energy optimization method of an Ising model 1. The optimization apparatus 10 implements the optimization method, for example, by running an optimization program.

The optimization apparatus 10 includes a storing unit 11 and a processing unit 12. The storing unit 11 is, for example, a memory or other storage device provided in the optimization apparatus 10. The processing unit 12 is, for example, a processor or arithmetic circuit provided in the optimization apparatus 10.

The storing unit 11 stores therein target problem information 11a that represents a problem to be solved. The target problem is, for example, a minimization problem convertible into the Ising model 1. As the target problem information 11a, information on the Ising model 1 representing the target problem is provided. The Ising model 1 is defined by N binary variables and the final ground state of the Ising model 1 represents the optimal solution to the target problem.

The processing unit 12 finds the ground state of the Ising model 1 using a variational principle of quantum mechanics. That is, the processing unit 12 simulates the state changes of the Ising model 1 that occur upon reduction in a magnetic field applied to the Ising model 1 which represents the target problem. In finding the ground state of the Ising model 1, the processing unit 12 adds a value corresponding to noise to some coefficients used in the simulation. Then, the processing unit 12 performs a real time propagation process (first process) of reducing the strength of the magnetic field applied to the Ising model 1 as time in the simulation progresses. In the real time propagation process, the magnetic field applied to the Ising model 1 is reduced gradually. Then, when the magnetic field reaches zero, the Ising model 1 is in the ground state.

The processing unit 12 also performs, during the real time propagation process, a heat dissipation process (second process) of lowering the energy of the Ising model 1 based on the ITP method. That is, the processing unit 12 turns time on the simulation clock into an imaginary number and makes the imaginary time progress, to find the ground state of the Ising model 1 corresponding to the magnetic field applied at a given point in time. The ground state of the Ising model 1 corresponding to the magnetic field is the ground state of the Ising model 1 in steady state (stationary ground state) with the real time at that point regarded as a fixed parameter. The real time propagation process progresses and, then, the strength of the magnetic field reaches zero. The ground state of the Ising model 1 at the time is the target ground state.

Thus, it is possible to efficiently find the ground state of the Ising model 1 by adding noise to the initial state and running a calculation that combines the real and imaginary time propagation. The reason for this is described below.

Let us consider finding, on a minimization problem defined for example by N binary variables (N is a natural number), the ground state (optimal value) of a system and a wavefunction of the ground state (combination of state variables yielding the optimal value) by carrying out a calculation, the principle of which is based on quantum mechanics. In this method, a quantum annealing Hamiltonian may be employed as the Hamiltonian. In quantum annealing, the initial state is where the N spins are subjected to a transverse field. For example, an experimentally preparable quantum state is arranged as the initial state. Starting with the initial state, the transverse field is reduced over time. In the end, when the transverse field completely vanishes, the sought Hamiltonian ground state, that is, the minimum energy is obtained. For its numerical solution, a quantum Monte Carlo (QMC) method is generally used. In quantum annealing computation, the system remains in the ground state, and the magnetic field is reduced slowly enough not to excite the system out of the ground state. This is a very strong constraint on the computation. In addition, a phenomenon called first-order quantum phase transition may take place during the course of reducing the magnetic field, at which the energy gap between the ground state and an excited state is exponentially suppressed. In this case, the transverse field needs to be reduced exponentially slowly.

As for the first-order quantum phase transition, it has been reported in recent times that many-body interactions accelerate first-order quantum phase transitions (see the aforementioned Japanese Laid-open Patent Publication No. 2018-067200 and "Exponential Enhancement of the Efficiency of Quantum Annealing by Non-Stoquastic Hamiltonians").

It is also known that dynamic behavior of a quantum system may be simulated by solving, in imaginary time, the time-dependent Schrödinger equation described by the quantum Ising Hamiltonian and a transverse field term describing spin flips. This technique corresponds to quantized simulated annealing, which is referred to here as quantum thermal simulated annealing (QTSA) scheme. The QTSA scheme directly simulates the time propagation of a quantum system and does not therefore differentiate between non-equilibrium and equilibrium states.

However, it is sometimes the case that the ground state is not obtained when the QTSA scheme is directly applied to quantum annealing computation. In view of this, the first embodiment introduces the following two concepts to the optimization apparatus 10.

The first concept to be introduced is quantum trials. It is considered that the quantum annealing Hamiltonian generates time propagation where an initial state of a wavefunction evolves with time to its final state, which is regarded as a type of scattering problem. The optimization apparatus 10 deals with a scattering problem of a wavefunction in imaginary time. Specifically, the optimization apparatus 10 describes, as a scattering problem, excited states, including the ground state, that depend on the initial state of the system, and finds the final state.

The second concept to be introduced is a technique of providing diversity to the initial state of the system. This technique proactively uses noise, which is usually perceived as a problem in gate model quantum computers, in combinatorial optimization problems. In general, noise is harmful, destroying information of the system; however, adding noise to the initial state in the QTSA calculation provides diversity to initial values of the scattering problem. This allows for finding the ground state with finite probability in solving the scattering problem.

As for how to add noise, for example, the processing unit 12 adds a value corresponding to noise (hereinafter sometimes referred to simply as "noise value") to an initial state of the Ising model 1 and sets the state of the Ising model 1 with the noise value added thereto as a starting state of simulation (noise-added initial state). At this time, for example, the processing unit 12 adds the noise value to coefficients included in the wavefunctions of some of the multiple spins included in the Ising model 1. Note that the processing unit 12 selects the spins to be given the noise value, for example, randomly from the multiple spins.

The processing unit 12, for example, performs the addition of the noise value on the Ising model 1 multiple times to generate multiple states of the Ising model 1, each having a different noise pattern. Then, the processing unit 12 performs the first process and the second process using each of the generated states of the Ising model 1 as a starting state of simulation. That is, simulation is performed as many times as the number of the noise-added initial states.

Thus, the addition of various noise patterns to the Ising model 1 allows for providing diversity to the initial state of the system. This diversity in the noise-added initial states increases the chances of the final state corresponding to some noise-added initial state being the ground state. As a result, it is possible to reach the ground state of the Ising model 1 even in a case where the ground state is not obtained as the final state in simulation that uses an initial state with no noise added thereto. In addition, the addition of noise disrupts the symmetry of the system, which avoids a drastic increase in computational expense in the quantum annealing computation. That is, the ground state is readily obtained and efficiency in the solution process is thus improved.

It is often the case that, instead of the correct ground state, a suboptimal solution is obtained, in which a small number of particular spins each has an opposite binary value of either 0 or 1 to that of the ground state. In view of this, the processing unit 12 may also employ a calculation using classical MCMC. According to quantum mechanics, the state of each spin is expressed as a quantum mechanical superposition of the spin's possible states (for example, 0 and 1). The state of the spin expressed as the quantum mechanical superposition indicates the probability of each state to be observed. On the other hand, in an Ising model based on classical mechanics (classical Ising model), the state of each spin is either one of the possible states.

For example, the processing unit 12 repeats, based on quantum mechanics, the first process and the second process on the Ising model 1, in which the state of each spin is expressed as a quantum mechanical superposition of possible states of the spin. Next, based on the state of the Ising model 1 after the energy of the Ising model 1 has converged, the processing unit 12 obtains the state of a classical Ising model in which the state of each spin has been determined to be one of the possible states. Then, the processing unit 12 performs a process of finding the ground state of the classical Ising model by a solution based on classical mechanics (e.g., MCMC) using the obtained state of the classical Ising model (third process).

Thus, incorporation of the solution method based on classical mechanics allows for easily reaching the ground state. It is sometimes the case that, even if the first and second processes alone are not able to find the correct ground state, MCMC based on classical mechanics (hereinafter sometimes referred to as classical MCMC), for example, reaches the ground state in at most several steps. In such a case, incorporation of the classical MCMC allows for obtaining the ground state, thus improving efficiency in finding the ground state.

Another way of accelerating computation by disrupting the symmetry of the system is to add noise to the strength of the transverse field term. The symmetry of the wavefunction of the system is broken also by adding noise to the strength of the transverse field. For example, the processing unit 12 adds a value corresponding to noise to coefficients each representing the strength of the magnetic field acting on a spin in the Ising model 1. Herewith, the symmetry of the system is broken, which avoids a drastic increase in computational expense in the quantum annealing computation.

(b) Second Embodiment

The second embodiment is directed to carrying out, on a minimization problem defined by N binary variables, a calculation whose principle is based on quantum mechanics by using a von Neumann computer, to obtain the ground state (optimal value) of a system and a wavefunction of the ground state (combination of state variables yielding the optimal value).

<Hardware Configuration of Optimization Apparatus>

Figure 2:
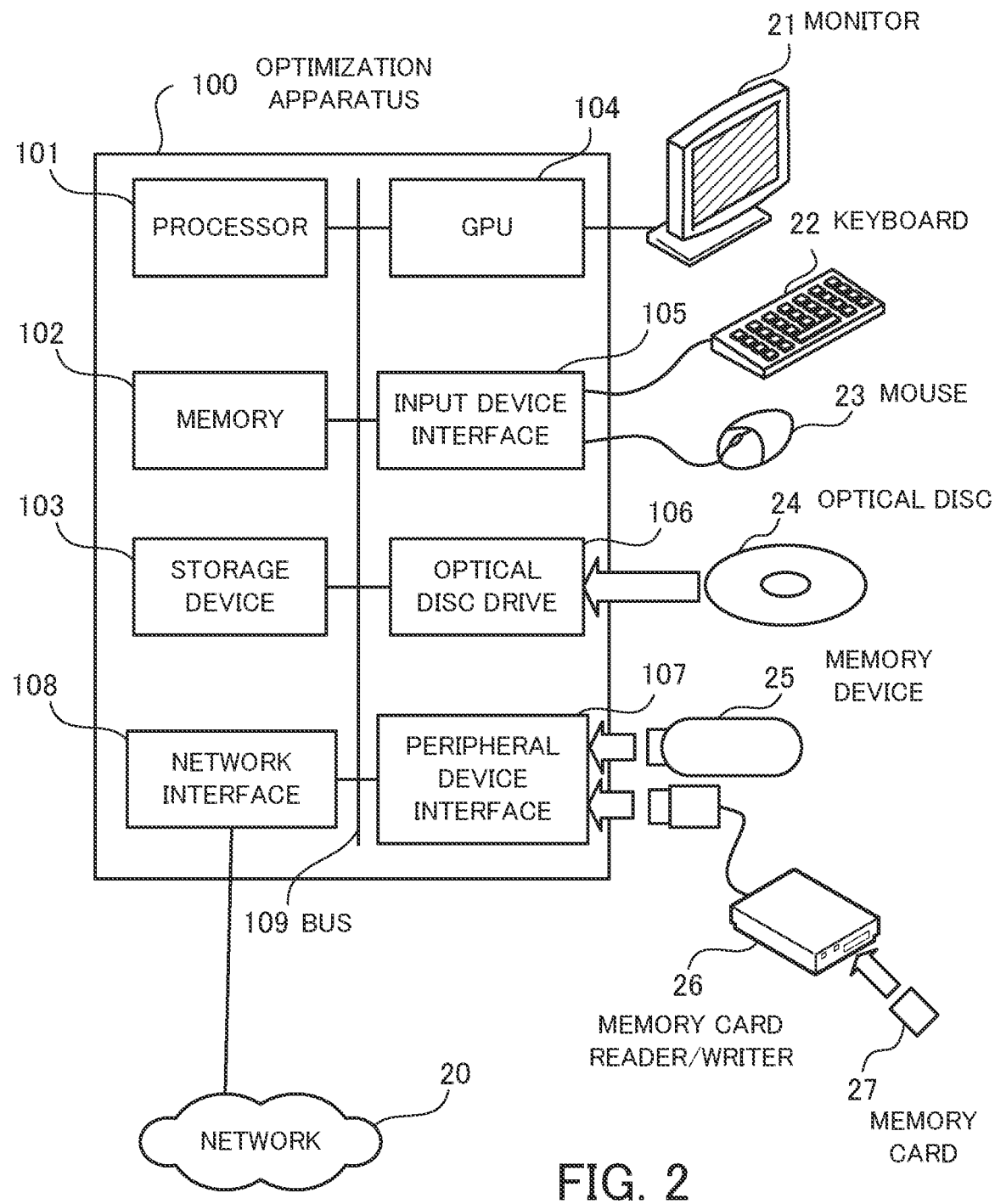
FIG. 2 illustrates an exemplary hardware platform of an optimization apparatus.

FIG. 2 illustrates an exemplary hardware platform of an optimization apparatus. An optimization apparatus 100 has a processor 101 to control its entire operation. The processor 101 is connected to a memory 102 and other various devices and interfaces via a bus 109. The processor 101 may be a single processing device or a multiprocessor system including two or more processing devices, such as a central processing unit (CPU), micro processing unit (MPU), and digital signal processor (DSP). It is also possible to implement processing functions of the processor 101 and its programs wholly or partly into an application-specific integrated circuit (ASIC), programmable logic device (PLD), or other electronic circuits, or any combination of them.

The memory 102 serves as the primary storage device in the optimization apparatus 100. Specifically, the memory 102 is used to temporarily store at least some of the operating system (OS) programs and application programs that the processor 101 executes, as well as various types of data to be used by the processor 101 for its processing. For example, the memory 102 may be implemented using a random access memory (RAM) or other volatile semiconductor memory devices.

Other devices on the bus 109 include a storage device 103, a graphics processing unit (GPU) 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device in the optimization apparatus 100 to store program and data files of the operating system and applications. For example, the storage device 103 may be implemented using hard disk drives (HDD) or solid state drives (SSD).

The graphics processing unit (GPU) 104, coupled to a monitor 21, produces video images in accordance with drawing commands from the processor 101 and displays them on a screen of the monitor 21. The monitor 21 may be, for example, an organic electro-luminescence (OEL) display or a liquid crystal display.

The input device interface 105 is connected to input devices, such as a keyboard 22 and a mouse 23, and supplies signals from those devices to the processor 101. The mouse 23 is a pointing device, which may be replaced with other kinds of pointing devices, such as a touchscreen, tablet, touchpad, and trackball.

The optical disc drive 106 reads out data encoded on an optical disc 24 or writes data to the optical disc 24 by using, for example, laser light. The optical disc 24 is a portable storage medium on which data is recorded in such a manner as to be read by reflection of light. The optical disc 24 may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the optimization apparatus 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a card.

The network interface 108 is connected to a network 20 so as to exchange data with other computers or communication devices (not illustrated).

The above-described hardware platform may be used to implement the processing functions of the optimization apparatus 100 according to the second embodiment. The same hardware configuration of the optimization apparatus 100 of FIG. 2 may similarly be applied to the foregoing optimization apparatus 10 of the first embodiment.

The optimization apparatus 100 provides various processing functions of the second embodiment by, for example, executing computer programs stored in a computer-readable storage medium. A variety of storage media are available for recording programs to be executed by the optimization apparatus 100. For example, the optimization apparatus 100 may store program files in its own storage device 103. The processor 101 reads out at least part of those programs from the storage device 103, loads them into the memory 102, and executes the loaded programs. Other possible storage locations for the programs include the optical disc 24, the memory device 25, the memory card 27, and other portable storage media. The programs stored in such a portable storage medium are installed in the storage device 103 under the control of the processor 101, so that they are ready to be executed upon request. It may also be possible for the processor 101 to execute program codes read out of a portable storage medium, without installing them in its local storage devices.

With the use of the optimization apparatus 100 having the above-described hardware configuration, it is possible to carry out, on a minimization problem defined by N binary variables, a calculation whose principle is based on quantum mechanics, to obtain wavefunctions of the ground state and excited states of a system. Note however that one factor of prolonged solution exploration using quantum annealing is the occurrence of a phenomenon called first-order quantum phase transition, as described above. That is, solution exploration takes a long time to avoid the occurrence of the first-order quantum phase transition. Next described in detail is the reason why exploration for the solution to a minimization problem takes long when trying to control the occurrence of the first-order quantum phase transition.

Note that the ground state of an Ising model is the lowest state of energy described by the Hamiltonian of the Ising model. The ground state of an Ising model is hereinafter sometimes referred to as Hamiltonian's ground state. In addition, a magnetic field applied to an Ising model in quantum annealing is called transverse field.

< Overview of Techniques for Ground State Calculation>

In finding the solution by quantum annealing, a term with the transverse field is prepared as an initial state. In the case of conducting no heat dissipation process, starting with the prepared initial state, the strength of the transverse field in a Hamiltonian of an optimization problem defined as a target N binary variable problem is reduced sufficiently slowly to eventually reach zero. At this time, the wavefunction of the system is slowly brought from the initial state towards the wavefunction of the ground state of the target Ising model, and thus the magnetic field is reduced so that the system does not jump to an excited state. This is called adiabatic transition. As a result of the adiabatic transition, the system eventually evolves into the ground state of the target Hamiltonian. In this manner, it is possible to find the ground state of the target quantum Ising Hamiltonian.

On the other hand, a bottleneck in quantum annealing is the adiabatic transition taking a prolonged time. During the adiabatic transition, the energy gap between the ground state and an excited state may become too small. When this happens, the calculation time grows so that the Hamiltonian of the system remains in the ground state, not jumping to an excited state. That is, a transition to an excited state originates in closing of the energy gap between the ground state and the first excited state for intermediate Hamiltonian in the course of the adiabatic transition. In the case of employing quantum annealing, if the energy gap between the ground state and the first excited state is small, the optimization apparatus 100 evolves the Hamiltonian slow enough to keep it to remain in the ground state by reducing the decrement of the transverse field.

Note here that the case where the energy gap decreases exponentially as a function of the number of spins is called first-order quantum phase transition. In the case of a first-order quantum phase transition, the size of time step for the time propagation as satisfying the adiabatic transition condition according to quantum annealing depends on the energy gap between the ground state and the excited state. For this reason, the optimization apparatus 100 decreases the size of time step exponentially, which means an exponential increase in the number of time propagation runs taken for reaching the final state by quantum annealing.

On the other hand, there is a case where the energy gap decreases as a power function of the number of spins. This case is called second-order quantum phase transition. When the second-order quantum phase transition occurs, the speed of the adiabatic transition in quantum annealing decreases as a power function. In this case, the time taken for reaching the final state increases polynomially.

However, because many applicatively interesting problems involve the first-order quantum phase transition, their practical applications are hindered by the fact that calculation time grows exponentially. In view of this, there has been research on exploring whether the first-order quantum phase transition may be replaced with the second-order quantum phase transition. Some study reports that the first-order phase transition is reduced to second order by devising the transverse field term in a special Hamiltonian system called non-stoquastic Hamiltonian (see the aforementioned "Exponential Enhancement of the Efficiency of Quantum Annealing by Non-Stoquastic Hamiltonians"). Therefore, under the framework of normal quantum annealing, a central issue in conducting the computation is how to avoid the first-order quantum phase transition.

In addition, in quantum annealing, the adiabatic transition condition needs to be met. However, there is a report that, in computation using a quantum computer supporting quantum annealing, the ground state is possibly found with finite probability even though the adiabatic transition condition is violated (see the aforementioned "Demonstration of a Scaling Advantage for a Quantum Annealer over Simulated Annealing"). The report states that an optimal time-to-solution (TTS) exists in computation using a quantum annealing processor; however, the reason why the optimal TTS exists leaves room for consideration from a physics perspective.

Judging from these contexts, it is considered that, in quantum annealing, energy dissipation (heat dissipation) may occur for some reason and allow a mechanism of quantum annealing to work. Therefore, taking into account the possibility that heat dissipation may occur in the framework of quantum theory holds the key to substantial understanding of the quantum annealing process.

For heat dissipation, interactions with external environment are fundamental. Hence, the influence of external environment needs to be incorporated into the Hamiltonian using a heat dissipation term. In the field of nuclear physics, a method of dealing with energy dissipation has been developed, where the time-dependent Schrödinger equation is solved in imaginary time. A wave equation is converted into a diffusion equation by introducing imaginary time, which is the main reason that allows for dealing with energy dissipation.

A specific example of dealing with energy dissipation is a method designed to deal with a Bose condensate formed by Bose-Einstein condensation (BEC) in dilute atomic gases. The theory of BEC in dilute atomic gases is studied from various aspects; however, one of obstacles encountered in theoretical treatment is computation of quantized vortices. It is known that quantized vortices are observed empirically when an optical spoon experimentally stirs up a Bose condensate (see the aforementioned "Observation of Vortex Lattices in Bose-Einstein Condensates"). The ground state of the Bose condensate with quantized vortices is known to be approximated well by an equation where an angular momentum term is incorporated to the Gross-Pitaevskii (GP) equation obtained as a result of mean field approximation.

However, finding the ground state of the GP equation in a vortex lattice is a very difficult task because the equation tells neither symmetry properties of the vortex lattice nor the number of vortices. Thus, although the ground state exists, there is a situation where no information including symmetry properties is known. Then, a method used to calculate the ground state of the vortex lattice at this point is the ITP method. Employing the ITP method allows for calculating the ground state when no information including symmetry properties on the ground state of a system is available (see the aforementioned "Numerical Simulation of Quantized Vortices in 2-Dimensional Bose-Einstein Condensates"). In addition, this method may also be used to introduce a phenomenological heat dissipation term, and there is a study dealing with dark soliton states in BECs (see the aforementioned "Dark-soliton States of Bose-Einstein Condensates in Anisotropic Traps"). The ITP method is a simple and powerful algorithm; however, it is not easy to apply the ITP method to a quantum annealing system because the kinetic-energy operator is not explicitly represented in the quantum annealing system.

In the ITP method, by representing time by an imaginary number, a quantum-mechanical time propagation operator is changed from $\exp(-iEt)$ to $\exp(-E\tau)$ (i is an imaginary unit, E is energy, t is real time, and $\tau$ is imaginary time). Therefore, a given wavefunction is expanded as equation (1) using a complete system $|\psi_n\rangle$ (the n-th eigenstate), which is then defined as equation (2) when time is represented by an imaginary number.

$$|\Psi(t)\rangle = \sum_{n=0}^{\infty} d_n(t)\exp\left(-i\frac{E_n}{\hbar}t\right)|\Psi_n\rangle \quad (1)$$

$$|\Psi(\tau)\rangle = \exp\left(-\frac{E_0}{\hbar}\tau\right)\sum_{n=0}^{\infty} d_n(\tau)\exp\left(-\frac{(E_n-E_0)}{\hbar}\tau\right)|\Psi_n\rangle \quad (2)$$

$|\psi(t)\rangle$ is the wavefunction representing the state of spins at time t, $d_n(t)$ is a coefficient of $|\psi_n\rangle$, i is the imaginary unit, En is the n-th energy level of the Hamiltonian, $E_0$ is the energy level of the ground state, h is the Dirac constant, and t is the imaginary time. In equation (2), when taking the limit of the imaginary time $\tau \to \infty$, only the amplitude of the ground state remains, which is described as equation (3) below.

$$|\Psi(\tau)\rangle \cong d_0(\tau)\exp\left(-\frac{E_0}{\hbar}\tau\right)|\psi_0\rangle \quad (3)$$

If being left as it is, however, the amplitude of the ground state decreases to zero according to $\exp(-E_0\tau/h)$. This is because the unitarity (conservation of probability) is broken by representing time by an imaginary number. Therefore, the calculation is continued while the wavefunction is renormalized for each computation run so as to forcibly preserve the unitarity. In this manner, it is possible to reach the ground state.

This ITP method is based on a variational principle and is applicable regardless of the problem. Because resting on the variational principle, the method is theoretically guaranteed to reach an optimal solution. Employing the ITP method allows for dealing with time propagation of a quantum Ising system in a deterministic manner.

Figure 3:
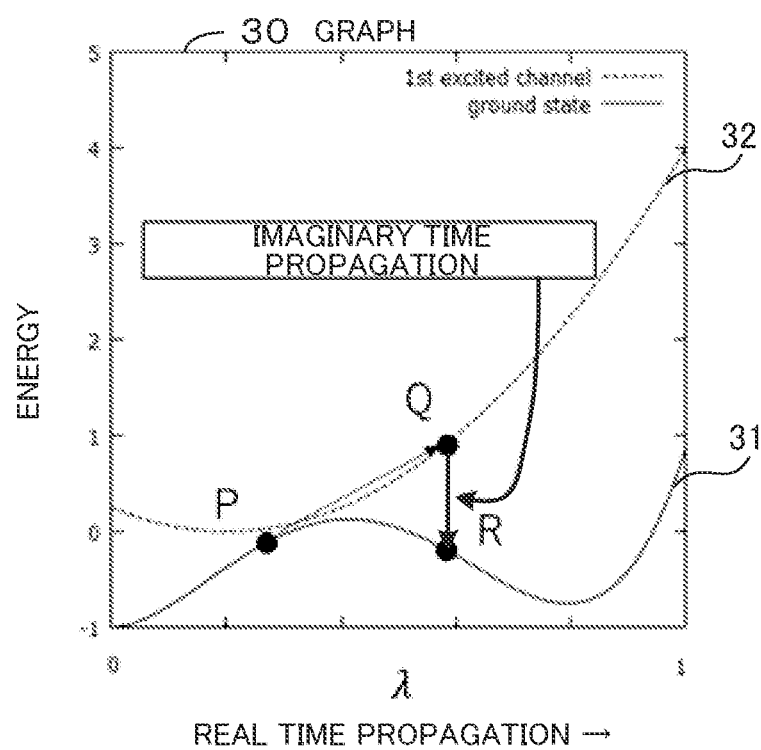
FIG. 3 is a schematic diagram of heat dissipation using an imaginary time propagation (ITP) method.

FIG. 3 is a schematic diagram of heat dissipation using the ITP method. FIG. 3 depicts a graph 30 with the horizontal axis representing $\lambda$ and the vertical axis representing the energy of a system, given by the Hamiltonian. In the example of FIG. 3, a solid line 31 represents the energy of the ground state according to a constant $\lambda$, which corresponds to the strength of the transverse field, when $\lambda$ changes from 0 to 1 along with evolution in real time. A dotted line 32 represents a first excited energy state according to $\lambda$. The strength of the transverse field is maximum when $\lambda=0$ and minimum when $\lambda=1$.

In general quantum annealing approaches, if the magnetic field is changed too much, the system being in the ground state at point P is excited to the first excited energy state at point Q. This situation is not allowed in the general quantum annealing approaches, and therefore the magnetic field needs to be reduced adiabatically slowly. However, if it is possible to bring the energy level down from point Q to point R by deexcitation, there is no need to strictly comply with the adiabatic transition condition. The optimization apparatus 100 employs imaginary time propagation to lower the energy level from point Q to point R by deexcitation.

On the other hand, even when the ITP method is used, the first-order quantum phase transition takes place. When the first-order quantum phase transition occurs, the energy gap between the ground state and the excited state vanishes and the ground state becomes nearly degenerate in the middle of quantum annealing where the transverse field is ramped down. If the energy level between the ground state and the excited state is degenerate, these two states are not distinguishable based on their energy levels. This makes it impossible to have control over whether the system reaches the ground state or is promoted to the excited state. That is, the ground state is not always obtained even when the ITP method is used and, thus, the solution is found with a fixed probability. This is a problem stemmed from not only an initial state of the wavefunction of the system but also the system's Hamiltonian itself.

Therefore, in the field of quantum annealing, the development of technique for reaching the ground state within the framework of the QTSA delivers value to both fundamental sciences and engineering. The second embodiment is the result of development of technique for systematically calculating the ground state.

<Ising Model and Hamiltonian of Problem>

Next described is an Ising minimization problem (Ising model problem) which is the solution target of the optimization apparatus 100. The Ising model problem is originally a model used in the study of magnetic substance in the physics area, and the total energy of N spins is described by equation (1.1) below.

$$H(\{x\}) = \sum_{j>i}^{N} W_{ij}x_i x_j + \sum_{i=1}^{N} b_i x_i + C \quad (1.1)$$

The first term on the right side is a summation of the products of values (0 or 1) of two state variables and a weight coefficient over all combinations of N state variables that are mutually exclusive and collectively exhaustive. $x_i$ is the i-th state variable; $x_j$ is the j-th state variable; and $W_{ij}$ is the weight coefficient representing the strength of interaction between $x_i$ and $x_j$. The second term on the right side is a summation of the products of a bias coefficient $b_i$ and the value of each state variable over all state variables. The third term on the right side is a constant C.

The minimization problem is a problem for obtaining the minimum value of the Hamiltonian given by equation (1.1). It is known that, when the minimum value of the Hamiltonian given by equation (1.1) is obtained using calculation resting, for example, on a Monte Carlo method, the computational effort is in the order of $2^N$ in general. That is, the calculation for obtaining the optimal solution needs time beyond polynomial and increases exponentially.

To fix this issue, quantum theory is introduced. The Hamiltonian described by equation (1.1) is converted to a quantized Hamiltonian as given by equations (1.2), (1.3), and (1.4).

$$\hat{H}_{TH} = \hat{H}_Q + \hat{H}_{TL} + C \tag{1.2}$$

$$\hat{H}_Q = \sum_{j>i}^{N} W_{ij} \hat{\sigma}_i^z \hat{\sigma}_j^z \tag{1.3}$$

$$\hat{H}_{TL} = \sum_{i=1}^{N} b_i \hat{\sigma}_i^z \tag{1.4}$$

Equation (1.2), with a Hamiltonian $\hat{H}_{TH}$ (the suffix TH stands for target Hamiltonian) on the left side, is obtained by quantizing equation (1.1). $\sigma_i^z$=(with ^ over σ) in equations (1.3) and (1.4) represents the z-component of Pauli matrix acting on the i-th spin.

Note that, when describing dynamics of quantum mechanics, it is not possible to describe spin flips using only equations (1.2), (1.3), and (1.4) above. Hence, a Hamiltonian with a transverse field term as stated by equation (1.5) is defined as a quantum mechanical Hamiltonian.

$$\hat{H}(\lambda) = G_1 \hat{H}_{TH} + G_2 \hat{T} \tag{1.5}$$

T (with ^) in equation (1.5) is called transverse field term, which is introduced to describe spin flips in the time-dependent quantum mechanical equation. The transverse field term is defined as equation (1.6) below.

$$\hat{T} = J \sum_{i=1}^{N} \hat{\sigma}_i^x \tag{1.6}$$

J is a coefficient describing the spin-to-spin strength. In the Hamiltonian, $G_1$ is a constant describing the strength of the longitudinal field term while $G_2$ is a constant describing the strength of the transverse field term. The case of taking only first order terms out in regard to $\sigma_i^x$ (with ^ over σ) in equation (1.6) is a derived quantum annealing approach disclosed in the aforementioned "Quantum Annealing in the Transverse Ising Model". In the quantum annealing approach of the literature, $G_1=\lambda$ and $G_2=1-\lambda$ where $\lambda$ is a parameter representing the strength of the transverse field, ranging from 0 to 1 inclusive ($0 \leq \lambda \leq 1$). In general, however, $G_1$ and $G_2$ may independently take values, irrespectively to each other.

Next, matrix and vector notations of operators of the problem are defined by the following equations.

$$\hat{\sigma}_i^z = \begin{pmatrix} 1 & 0 \\ 0 & 0 \end{pmatrix} \tag{1.7}$$

$$\hat{\sigma}_i^x = \begin{pmatrix} 0 & 1 \\ 1 & 0 \end{pmatrix} \tag{1.8}$$

$$|1\rangle = |\alpha_i\rangle = \begin{pmatrix} 1 \\ 0 \end{pmatrix} \tag{1.9}$$

$$|0\rangle = |\beta_i\rangle = \begin{pmatrix} 0 \\ 1 \end{pmatrix} \tag{1.10}$$

The definition of equation (1.7) is different from one commonly used. This is to allow the spin operator to have eigenvalues of 1 and 0 instead of 1 and −1. $|\alpha_i\rangle$ and $|\beta_i\rangle$ have an orthogonal relationship to each other as defined by equation below.

$$\langle \alpha_i | \beta_i \rangle = \langle \beta_i | \alpha_i \rangle = \delta_{\alpha_i \beta_i} \tag{1.11}$$

Next, eigenequations for the longitudinal field $\sigma_i^z$ (with ^ over σ) are presented below.

$$\hat{\sigma}_i^z |\alpha_i\rangle = 1|\alpha_i\rangle \tag{1.12}$$

$$\hat{\sigma}_i^z |\beta_i\rangle = 0|\beta_i\rangle \tag{1.13}$$

Eigenequations for the transverse field $\sigma_i^x$ (with ^ over σ) are as follows.

$$\hat{\sigma}_i^x |\alpha_i\rangle = |\beta_i\rangle \tag{1.14}$$

$$\hat{\sigma}_i^x |\beta_i\rangle = |\alpha_i\rangle \tag{1.15}$$

Next, a ket of a single particle wavefunction, representing the i-th qubit is defined by equation (1.16).

$$|\varphi_i(t)\rangle = C_{i\alpha}(t)|\alpha_i\rangle + C_{i\beta}(t)|\beta_i\rangle \tag{1.16}$$

$C_{i\alpha}(t)$ is a complex number representing the probability amplitude and phase of a ket state $|\alpha_i\rangle$ of the i-th spin. $C_{i\beta}(t)$ is a complex number representing the probability amplitude and phase of a ket state $|\beta_i\rangle$ of the i-th spin. A bra of the single particle wavefunction is defined below by equation (1.17).

$$\langle \varphi_i(t)| = C_{i\alpha}^*(t)\langle \alpha_i| + C_{i\beta}^*(t)\langle \beta_i| \tag{1.17}$$

$C_{i\alpha}^*(t)$ and $C_{i\beta}^*(t)$ are complex conjugates of $C_{i\alpha}(t)$ and $C_{i\beta}(t)$, respectively. In quantum mechanics, wavefunctions are functions defined generally by complex numbers, and their coefficients are therefore also defined by complex numbers. Here, equation (1.18) holds on the assumption that the single particle wavefunction has been normalized.

$$\langle \varphi_i(t)|\varphi_i(t)\rangle = |C_{i\alpha}|^2 + |C_{i\beta}|^2 = 1 \tag{1.18}$$

Next, commonly used physical quantities are defined as follows.

$$x_i = \langle \varphi_i(t)|\hat{\sigma}_i^z|\varphi_i(t)\rangle = |C_{i\alpha}|^2 \tag{1.19}$$

$$y_i = \langle \varphi_i(t)|\hat{\sigma}_i^x|\varphi_i(t)\rangle = C_{i\alpha}^*(t)C_{i\beta}(t) + C_{i\beta}^*(t)C_{i\alpha}(t) \tag{1.20}$$

A wavefunction of a system of N particles is defined as follows.

$$|\Psi(t)\rangle = \prod_{i=1}^{N} |\varphi_i(t)\rangle \quad (1.21)$$

The probabilities of the m-th spin observed as an α spin and a β spin are denoted by $P_{m,\alpha}$ and $P_{m,\beta}$, respectively. $P_{m,\alpha}$ and $P_{m,\beta}$ are defined as follows.

$$P_{m,\alpha} = |C_{m\alpha}|^2 \quad (1.22)$$

$$P_{m,\beta} = |C_{m\beta}|^2 \quad (1.23)$$

<Basic Equation of ITP Method>

Let us consider solving equation (2.1), which is the time-dependent Schrödinger equation defined by the Hamiltonian equation (1.5).

$$\hat{H}|\Psi(t)\rangle = i\hbar \frac{\partial}{\partial t}|\Psi(t)\rangle \quad (2.1)$$

The n-th eigenvalue $E_n$ and its eigenstate $|\psi_n\rangle$ of equation (2.1) are the solution of equation (2.2) below.

$$\hat{H}|\psi_n\rangle = E_n|\psi_n\rangle \quad (2.2)$$

A given wavefunction $|\Psi(t)\rangle$ is expanded as follows using the complete system $|\psi_n\rangle$.

$$|\Psi(t)\rangle = \sum_{n=0}^{\infty} d_n(t) \exp\left(-i\frac{E_n}{\hbar}t\right)|\psi_n\rangle \quad (2.3)$$

Here, time is transformed from real valued time into imaginary time τ using equation (2.4) below.

$$t = -i\tau \quad (2.4)$$

With the representation in imaginary time, equation (2.3) is converted to equation (2.5) below.

$$|\Psi(\tau)\rangle = \exp\left(-\frac{E_0}{\hbar}\tau\right) \sum_{n=0}^{\infty} d_n(\tau) \exp\left(-\frac{(E_n - E_0)}{\hbar}\tau\right)|\psi_n\rangle \quad (2.5)$$

When taking the limit of the imaginary time τ→∞ here, populations of excited states decay at faster rates than that of the ground state. Therefore, only the population of the ground state remains as described by equation (2.6).

$$|\Psi(\tau)\rangle \cong d_0(\tau) \exp\left(-\frac{E_0}{\hbar}\tau\right)|\psi_0\rangle \quad (2.6)$$

However, the coefficient factor $\exp(-E_0\tau/\hbar)$ itself becomes 0 when taking the limit of the imaginary time τ→∞. This is because turning real-number-valued time into an imaginary number breaks the unitarity of the time propagation operator, and concretely speaking, the value of the normalized integral of the wavefunction goes below 1. In view of this, the normalized integral is forcibly set to 1 during the progress of the calculation. This operation is called renormalization. With use of the imaginary time propagation and renormalization, it is theoretically guaranteed to reach the ground state of the system.

Next, a governing equation is developed for the case where the ITP method is applied to a quantum Ising system. As the time propagation operator, a linear ITP operator is used, which is given by equation (2.7).

$$\hat{U}(t_0, t_0 + \Delta t) \cong \exp\{-\hat{T}\Delta\tau\}\exp\{-\hat{V}\Delta\tau\} + O(\Delta\tau^2) \quad (2.7)$$

In equation (2.7), the second order term of Δτ is wrapped in the function $O(\Delta\tau^2)$. Equation (2.7) is expanded up to the first order term with respect to Δt and sorted to give equation (2.8) below.

$$\hat{U}(\tau, \tau + \Delta t) \cong 1 - \hat{H}(\lambda, \tau)\Delta\tau + O(\Delta\tau^2) \quad (2.8)$$

Next, an equation that describes the time propagation of the wavefunction is developed. The time propagation of the wavefunction is given by equation (2.9).

$$|\Psi(\tau + \Delta t)\rangle = \hat{U}(\tau, \tau + \Delta t)|\Psi(\tau)\rangle \quad (2.9)$$

The wavefunction of an N−1 particle system, where only the wavefunction of the m-th particle has been removed, is denoted as $|\overline{\Psi}_m(\tau)\rangle$ (m with an overbar) to give equation (2.10) below.

$$|\overline{\Psi}_m(\tau)\rangle = \prod_{i=1, i\neq m}^{N} |\varphi_i(\tau)\rangle \quad (2.10)$$

$\langle\alpha_m| \otimes \overline{\Psi}_m(\tau_0)$ (⊗ representing a tensor product, and the subscription m of Ψ given an overbar) is applied to both sides of equation (2.9). As a result, the left side of equation (2.9) turns to be equation (2.11).

$$\langle\alpha_m| \otimes \langle\overline{\Psi}_m(\tau)| \Psi(\tau + \Delta\tau)\rangle = C_{m\alpha}(\tau + \Delta\tau) \prod_{i=1, i\neq m}^{N} \{1 + M_i^* \Delta\tau\} \quad (2.11)$$

In a similar fashion, $\langle\beta_m| \otimes \langle\overline{\Psi}_m(\tau_0)|$ (the subscription m of Ψ given an overbar) is applied to both sides of equation (2.9). As a result, the left side of equation (2.9) turns to be equation (2.12).

$$\langle\beta_m| \otimes \langle\overline{\Psi}_m(\tau)| \Psi(\tau + \Delta\tau)\rangle = C_{m\beta}(\tau + \Delta\tau) \prod_{i=1, i\neq m}^{N} \{1 + M_i^* \Delta\tau\} \quad (2.12)$$

Here, $M_i^*$ represents the degree of rigidity of the spin to changing its state, and is given by equation (2.13) below.

$$M_i^* = C_{i\alpha}^*(\tau) \frac{dC_{i\alpha}(\tau)}{d\tau} + C_{i\beta}^*(\tau_0) \frac{dC_{i\beta}(\tau)}{d\tau} \quad (2.13)$$

Equation (2.14) is defined as follows.

$$\Omega_m(\tau) = \prod_{i=1, i\neq m}^{N} \{1 + M_i^* \Delta\tau\} \quad (2.14)$$

$\Omega_m(\tau)$ is rearranged up to the term of $\Delta\tau$ to give equation (2.15) below.

$$\Omega_m(\tau) \cong 1 + \Delta\tau \sum_{i=1, i\neq m}^{N} M_i^* \tag{2.15}$$

Next, $\overline{<\alpha_m|} \otimes \overline{<\Psi_m(\tau_0)|}$ and $\overline{<\beta_m|} \otimes \overline{<\Psi_m(\tau_0)|}$ (the subscription m of $\Psi$ given an overbar) are applied to both sides of equation (2.9) to obtain the right side, and a governing equation is obtained as defined by equation (2.16).

$$\begin{pmatrix} C_{m\alpha}(\tau+\Delta\tau)\Omega_m(\tau) \\ C_{m\beta}(\tau+\Delta\tau)\Omega_m(\tau) \end{pmatrix} = \begin{pmatrix} C_{m\alpha}(\tau) \\ C_{m\beta}(\tau) \end{pmatrix} - \Delta\tau \begin{pmatrix} H_{1,\alpha\alpha} & H_{1,\alpha\beta} \\ H_{1,\alpha\beta} & H_{1,\beta\beta} \end{pmatrix} \begin{pmatrix} C_{m\alpha}(\tau) \\ C_{m\beta}(\tau) \end{pmatrix} \tag{2.16}$$

Matrix elements in equation (2.16) are obtained by equations (2.17) to (2.19) below.

$$H_{1,\alpha\alpha} = G_1(E_{TH} + (1-x_m)h_{z,m}) + G_2 T_{\alpha\alpha} \tag{2.17}$$

$$H_{1,\beta\beta} = G_1(E_{TH} - x_m h_{z,m}) + G_2 T_{\beta\beta} \tag{2.18}$$

$$H_{1,\alpha\beta} = H_{1,\beta\alpha} = G_2 T_{\alpha\beta} \tag{2.19}$$

Parameters $E_{TH}$, $h_{z,m}$, $T_{\alpha\alpha}$, $T_{\beta\beta}$, and $T_{\alpha\beta}$ in equations (2.17) to (2.19) are given below.

$E_{TH}$ is the energy term of the target Hamiltonian and defined by equations (2.20) to (2.22).

$$E_{TH} = E_Q + E_{TL} + C \tag{2.20}$$

$$E_Q = \langle\Psi|\hat{H}_Q|\Psi\rangle = \langle\Psi|\sum_{j>i}^{N} W_{ij}\hat{\sigma}_i^z \hat{\sigma}_j^z|\Psi\rangle = \sum_{j>i}^{N} W_{ij}x_i x_j = \frac{1}{2}\sum_{i,j=1}^{N} W_{ij}x_i x_j \tag{2.21}$$

$$E_{TL} = \langle\Psi|\hat{H}_{TL}|\Psi\rangle = \langle\Psi|\sum_{i=1}^{N} b_i\hat{\sigma}_i^z|\Psi\rangle = \sum_{i=1}^{N} b_i x_i \tag{2.22}$$

$h_{z,m}$ corresponds to the mean field and is given by equations (2.23) and (2.24).

$$h_m = v_m + b_m \tag{2.23}$$

$$v_m = \sum_{j=1}^{N} W_{mj} x_j \tag{2.24}$$

$T_{\alpha\alpha}$ is an expectation of the transverse field term, which is obtained by taking out a coefficient of $C_{m\alpha}(\tau)$ from $\overline{<\alpha_m|} \otimes \overline{<\Psi_m(\tau_0)|}T|\Psi>$ (the subscription m of $\Psi$ given an overbar, and T given $\hat{}$). $T_{\alpha\beta}$ is obtained by taking out a coefficient of $C_{m\beta}(\tau)$ from $\overline{<\alpha_m|} \otimes \overline{<\Psi_m(\tau_0)|}T|\Psi>$ (the subscription m of $\Psi$ given an overbar, and T given $\hat{}$). $T_{\beta\beta}$ is obtained by taking out a coefficient of $C_{m\beta}(\tau)$ from $\overline{<\beta_m|} \otimes \overline{<\Psi_m(\tau_0)|}T|\Psi>$ (the subscription m of $\Psi$ given an overbar, and T given $\hat{}$).

The matrix form is evaluated in the following manner. Here, equation (2.25) is introduced as an N particle wavefunction, where only the m-th single particle wavefunction has been replaced with $|\varphi_m>$.

$$|\Phi(t)\rangle = |\varphi_m\rangle \otimes |\Psi_{\overline{m}}(\tau)\rangle \tag{22}$$

$|\varphi_m>$ is defined as equation (2.26).

$$|\varphi_m\rangle = C'_{m\alpha}(\tau)|\alpha_m\rangle + C'_{m\beta}(\tau)|\beta_m\rangle \tag{2.26}$$

Now, based on equation (2.25), the following integral is considered.

$$\langle\Phi(\tau)|\hat{T}|\Psi(\tau)\rangle \tag{2.27}$$

The integral of expression (2.27) is evaluated as equation (2.28) below.

$$\langle\Phi(\tau)|\hat{T}|\Psi(\tau)\rangle = (C'_{m\alpha}(\tau), C'_{m\beta}(\tau))\begin{pmatrix} T_{\alpha\alpha} & T_{\alpha\beta} \\ T_{\beta\alpha} & T_{\beta\beta} \end{pmatrix}\begin{pmatrix} C_{m\alpha}(\tau) \\ C_{m\beta}(\tau) \end{pmatrix} \tag{2.28}$$

The matrix form evaluated in the above-described manner gives the matrix elements in two rows and two columns on the right side of equation (2.16) that represents the time propagation of the wavefunction. The matrix elements of $T_{\alpha\alpha}$, $T_{\beta\beta}$, and $T_{\alpha\beta}$ are given as equations (2.29) and (2.30).

$$T_{\alpha\alpha} = T_{\beta\beta} = JX_m \tag{2.29}$$

$$T_{\alpha\beta} = T_{\beta\alpha} = J \tag{2.30}$$

Note that the matrix elements $T_{\alpha\alpha}$, $T_{\alpha\beta}$, $T_{\beta\alpha}$, and $T_{\beta\beta}$ are calculated from the integral $<\varphi(t)|T_n|\Psi(t)>$ (T given $\hat{}$).

A concrete description of the matrix elements is represented by equation (2.31).

$$\hat{T} = \begin{pmatrix} T_{1,m,\alpha\alpha} & T_{1,m,\alpha\beta} \\ T_{1,m,\beta\alpha} & T_{1,m,\beta\beta} \end{pmatrix} = J\begin{pmatrix} X_m & 1 \\ 1 & X_m \end{pmatrix} \tag{2.31}$$

Here, $X_m$ is set as indicated in equation (2.32).

$$X_m = \sum_{i=1}^{N} y_i - y_m \tag{2.32}$$

Next described is $\Omega_m(T)$. The probability of the spin with $\alpha$ being observed is given by equation (1.22) while the probability of the spin with $\beta$ being observed is given by equation (1.23). Therefore, by differentiating the sum of the observation probabilities in terms of the imaginary time $\tau$, equation (2.33) is obtained.

$$\frac{d}{d\tau}(P_{m,\alpha} + P_{m,\beta}) = M_m + M_m^* = 0 \tag{2.33}$$

As for the sum of the observation probabilities, $P_{m,\alpha} + P_{m,\beta} = 1$ is defined to be always true. Therefore, $M_m^*$ is a purely imaginary number, which has no real part.

Let us consider here the case of selecting real numbers for both initial values $C_{m\alpha}(\tau=0)$ and $C_{m\beta}(\tau=0)$ of the wavefunction in the time propagation governing equation (2.16). The matrix elements on the right side of equation (2.16) are all real numbers. Therefore, when $C_{m\alpha}$ and $C_{m\beta}$ are real numbers, $C_{m\alpha}(\tau+\Delta\tau)\Omega_m(\tau)$ is also a real number. On the other hand, $\Omega_m(T)$ is calculated from $M_m^*$, and $M_m^*$ at time $\tau$ is also a real number according to equation (2.13), which is the definition equation for $M_m^*$. However, according to equation (2.33), $M_m^*$ is a purely imaginary number, and therefore $M_m^* = 0$ in this case. Hence, $\Omega_m(\tau) = 1$ and $C_{m\alpha}(\tau+\Delta\tau)$ is also a real number. The exact same argument goes for $C_{m\beta}(\tau+\Delta\tau)$, and $C_{m\beta}(\tau+\Delta\tau)$ is thus a real number.

Next, consider the case of selecting complex numbers for the initial values $C_{m\alpha}(\tau=0)$ and $C_{m\beta}(\tau=0)$ of the wavefunction. In this case, $M_m^*$ is given as a complex number. In this case, $\Omega_m(\tau)\neq 1$ in general, and is a complex number. $M_m^*$ is the value determined on the m-th spin. Therefore, $\Omega_m(\tau)$ is determined based on information of all the spins other than the m-th spin of interest. Hence, $C_{m\alpha}(\tau+\Delta\tau)$ is affected by the immediately preceding wavefunctions $C_{i\alpha}(\tau)$ and $C_{i\beta}(\tau)$ of all other spins satisfying $i\neq m$. That is, in the case where phase information is incorporated into information of the wavefunctions at time $\tau=0$ so that the wavefunctions take complex numbers, information is exchanged via the imaginary components. Phase components having no effect on the observation probabilities each defined as the square of absolute value play a key role in interaction between spins. Then, the spin is coupled to all other spins through the interaction as well as through the phase components.

Thus, the governing equation that deals with quantum annealing in a deterministic manner is derived. Note that the total energy is given by equations (2.34) and (2.35).

$$E(G_1, G_2) = G_1 E_{TH} + G_2 E_{0L} \quad (2.34)$$

$$E_{0L} = \langle \Psi | \hat{H}_{0L} | \Psi \rangle = \langle \Psi | \sum_{i=1}^{N} J_i \hat{\sigma}_i^x | \Psi \rangle = \sum_{i=1}^{N} J_i y_i \quad (2.35)$$

As for the computation costs, the order of complexity of the governing equation (2.16) for the imaginary time propagation is $O(2^N)$. Calculation of the matrix elements in equation (2.16) involves computation of the total energy of the target Hamiltonian, and the order of complexity of the total energy computation is $O(N^2)$, Therefore, given that the number of computation runs needed until convergence of the ITP method is L, the computational costs are $O(LN^2)$. However, the energy is estimated to decay with $\exp(\Delta E_{01}\tau)$ and then converge in the imaginary time propagation, thus decreasing exponentially fast.

<Definition of Quantum Trials>

The term quantum trial used hereinafter is defined as follows. An imaginary time propagation operator for the N particle wavefunction $|\Psi_0\rangle$ at $t=0$ is defined as equation (0.3.1).

$$\hat{U}(t, t_0) = T\exp\left\{-i\int_{t_0}^{t} \hat{H}(t)dt\right\} \quad (3.1)$$

At this time, equation (3.2) is obtained where $|\Psi(\tau)\rangle$ is the final state obtained as a result of the imaginary time propagation.

$$|\psi(t)\rangle = \hat{U}(t,t_0)|\psi_0\rangle \quad (3.2)$$

At this time, a different $|\Psi_0\rangle$ generally yields a different final state. The term quantum trial refers to a process of obtaining a final state from an initial state. Thus, it is possible to see quantum annealing as a type of scattering process.

<Generation of Initial States by Adding k-Particle Excitation Noise to Wavefunction>

There is a plurality of methods to prepare initial states. The initial value of a single particle wavefunction, which makes up the N particle wavefunction, is prepared as follows.

$$|\varphi_i(t=0)\rangle = C_{i\alpha}(t=0)|\alpha_i\rangle + C_{i\beta}(t=0)|\beta_i\rangle \quad (4.1)$$

Assume here that such initial values in equation (4.1) are used that keep coefficients of all single particle wavefunctions the same. That is, for given two spins i and j ($i\neq j$), initial states ensuring $C_{i\alpha}(t=0)=C_{j\alpha}(t=0)$ and $C_{i\beta}(t=0)=C_{j\beta}(t=0)$ are prepared. At this time, k-particle excitation noise is defined as follows. Amongst the N spins, k spins are selected, for each of which z percent noise is added to its probability amplitude. As for the first spin selected, the probability amplitude after noise is added is defined by equations (4.2) and (4.3).

$$C'_{i\alpha}(t=0)=(1+z)C_{i\alpha}(t=0) \quad (4.2)$$

$$C'_{i\beta}(t=0)=\sqrt{1-|C'_{i\alpha}(t=0)|^2} \quad (4.3)$$

When an initial state of $C_{i\alpha}=0$ is used in equation (4.2), no noise is added. In this case of equations (4.2) and (4.3), therefore, noise is added to $C_{i\beta}$.

Note however that the equations for defining noise addition represented by equations (4.2) and (4.3) are just examples. What is important is that, by adding noise, only certain spins have single particle quantum states that are different from those of other quantum spins. In addition, it is appropriate to ensure that z generally takes a different value for each spin. This is because, although noise is added to k spins, it is not logical that the same noise is added to all the k spins. Therefore, the optimization apparatus 100 determines the noise amplitude z each time using, for example, a random number.

When noise is added to k spins according to equations (4.2) and (4.3), the probability amplitude increases or decreases, which may be viewed as partial introduction of different states. This may be interpreted as partial incorporation of excitation. Hence, the added noise is here referred to as k-particle excitation noise. Note that an initial state with broken symmetry, where $C_{i\alpha}(t=0)\neq C_{j\alpha}(t=0)$ and $C_{i\beta}(t=0)\neq C_{j\beta}(t=0)$, may be prepared from the very start before noise addition. For example, one spin may be assigned to be $C_{i\alpha}(t=0)=1$ while the remaining spins are assigned to be $C_{j\alpha}(t=0)=0$ ($i\neq j$). In this case also, a different final state is obtained by noise addition.

<Challenge to be Addressed Using Quantum Trials and Noise Addition>

The discussion so far has provided no grounds for the quantum trials and noise addition to wavefunctions. Next described is a mechanism where the introduction of these two schemes resolves an issue hard to overcome only by the ITP method, which is not always being able to find the ground state even when a quantum system is let to evolve over time within the framework of the ITP method.

Let us present a concrete issue that occurs in actually solving a 4-city traveling salesman problem (TSP) using the ITP method.

Figure 4:
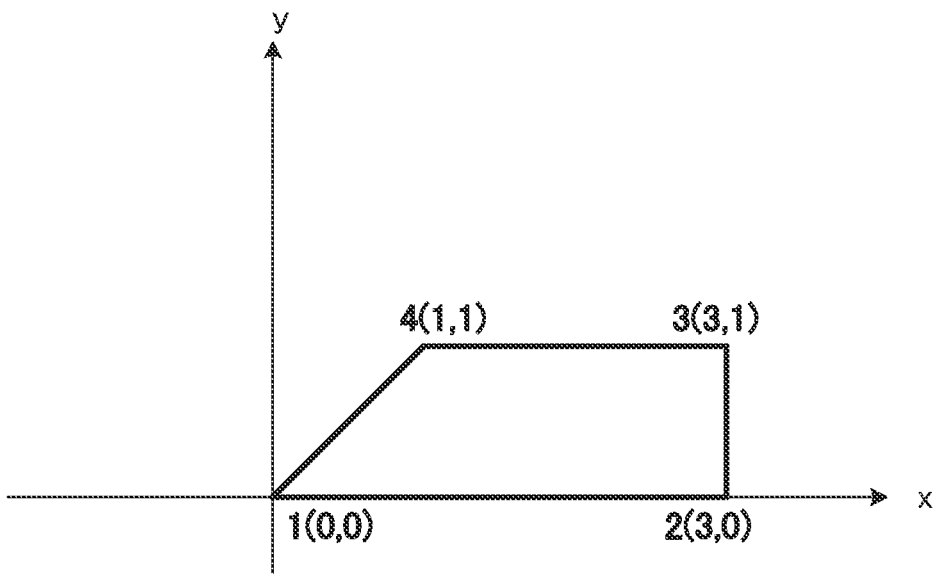
FIG. 4 illustrates exemplary city locations in a 4-city traveling salesman problem.

FIG. 4 illustrates exemplary city locations in the 4-city TSP. In the example of FIG. 4, the location of the first city is (0, 0); the second city, (3, 0); the third city, (3, 1); and the fourth city, (1, 1).

For the problem depicted in FIG. 4, there are three candidates for solution. Path lengths of the candidates are 7.414, 7.812, and 10.398 in ascending order.

Let us consider the case of converting the TSP to an Ising model and performing quantum annealing calculation in an external magnetic field like the one discussed in the aforementioned "Quantum Annealing in the Transverse Ising Model" by using the ITP method. Let $G_1=1-G_2$ where $0 \leq G_2 \leq 1$ and $G_2=1$ at imaginary time $\tau=0$. $G_2$ is given as discrete points, and division points are provided at regular intervals. Here, the number of division points n used for the calculation is increased from 64 to 1024. The n-th $G_2$ value is denoted by $G_2(n)$. Intermediate states are defined by equation (5.1).

$$G_2(n)=1-0.01n \qquad (5.1)$$

For each of the intermediate states defined by equation (5.1), an imaginary time propagation process is performed and calculation is continued until the energy has converged. Let the threshold of calculation convergence is $10^{-10}$. The initial values of the wavefunction are set as $C_{m\alpha}(\tau=0)=1$ and $C_{m\beta}(\tau=0)$ here although they would take any given values. Also let $G_2(0)=1$ and $G_1=1.0$. Once the calculation for n=0 finishes, the value of n is increased by 1, and the imaginary time propagation process is repeated to find the ground state at the next intermediate point with $G_2(1)$ and $G_1(1)$. Here, the value of $G_2(1)$ has been reduced from that of the previous point. Note that, as the initial state of the wavefunction at the new intermediate point, the wavefunction obtained as a final result of the previous point, where the energy converged with $G_2(0)$, is used. This calculation is repeated and, in the end when calculation of $G_2$ (n=100)=0 is finished, the ground state (or an excited state) of the target problem Hamiltonian is obtained. This series of calculations is a quantum trial.

Figure 5:
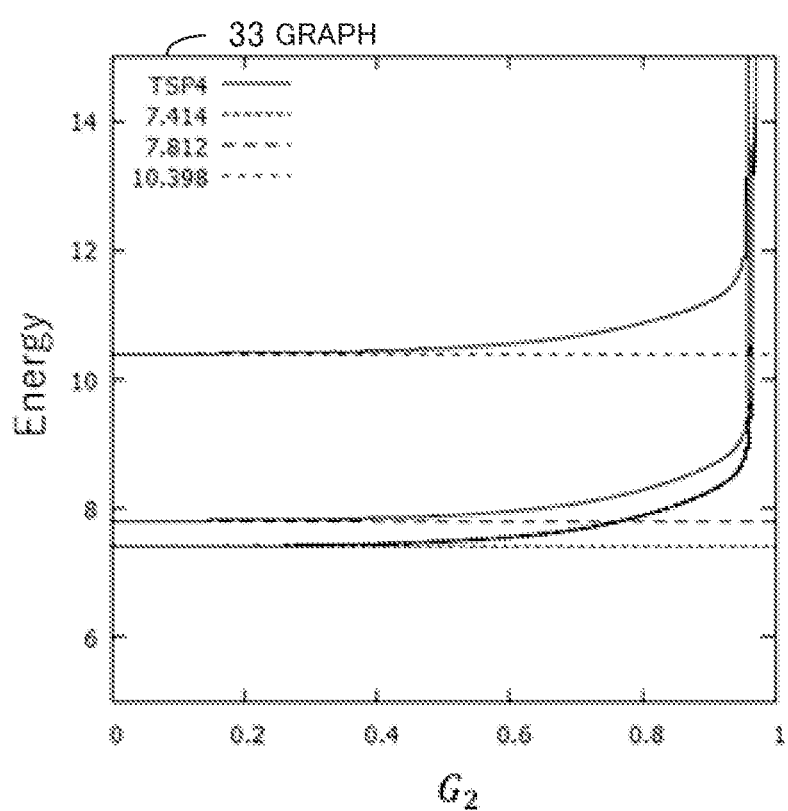
FIG. 5 illustrates differences in calculated results according to the number of $G_2$ values.

FIG. 5 illustrates differences in calculated results according to the number of $G_2$ values. FIG. 5 depicts a graph 33 with the horizontal axis representing $G_2$ and the vertical axis representing energy. Three solid lines in the graph 33 represent value of energy in relation to $G_2$, each corresponding to a quantum trial with a different number of division points. As illustrated in the graph 33, depending on the number of division points, the ground state with energy 7.414 is found or an excited state with energy 7.812 or 10.398 is found.

In the case of the 4-city TSP, the ground state is found for sure by reducing the truncation error and increasing the number of division points. However, this is not the case with, for example, ulysses16, which is a more practical problem included in TSPLIB (TSP workbook). On such a problem, the ground state is not reached even when the energy truncation error is represented in double precision floating point and a considerably large number of division points is provided.

Thus, although there is a possibility that the ground state is not reached, all the three candidates to be found in the 4-city TSP are obtained. This calculation does not necessarily adhere to the adiabatic transition condition but supports the aforementioned experimental quantum annealing results of the ground state being found with a fixed probability. Therefore, it is interpreted that natural energy dissipation resulting from heat dissipation takes place in quantum annealing calculation of an actual processor.

The mechanism causing such a phenomenon is described next.

Figure 6:
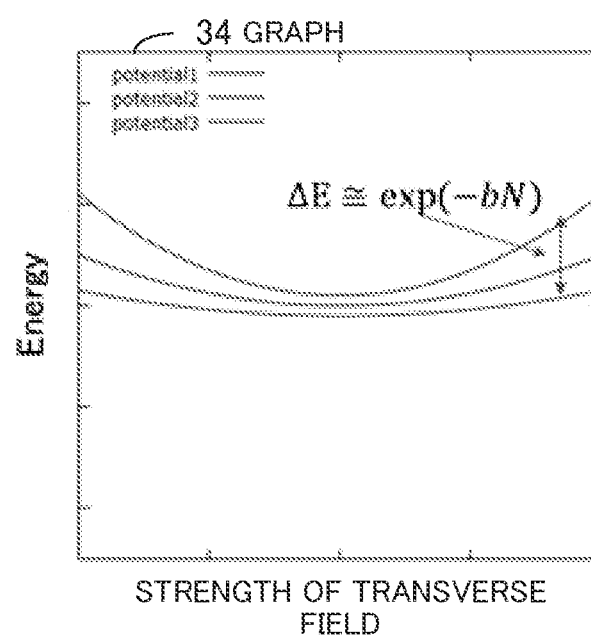
FIG. 6 is a schematic diagram of value of energy in relation to the strength of a transverse field.

FIG. 6 is a schematic diagram of value of energy in relation to the strength of the transverse field. In a graph 34 of FIG. 6, the horizontal axis represents the strength of the transverse field and the vertical axis represents energy. The graph 34 depicts a typical first-order quantum phase transition. The first-order quantum phase transition is a phenomenon that takes place during quantum annealing, where the influence of the target Hamiltonian becomes stronger as the transverse field is reduced and, then, multiple quantum states become virtually degenerate. In a qualitative sense, the energy gap closes exponentially like $\Delta E \neq \exp(-bN)$ where N is the number of spins and b is a coefficient.

Quantum annealing is a metaheuristic for finding the target ground state by reducing the transverse field while keeping a quantum state represented by the bottommost potential curve in the graph 34. However, with an increase in the number of qubits (spins), the energy gap closes exponentially. As a result, energy dissipation takes place, and the energy gap may reach practically 0 even if interactions with external environment are present. Double-precision floating point numbers are often used in the numerical computation but they allow for only 16 digits of precision. Therefore, in the case where differences appear in the $17^{th}$ or subsequent digit, the use of double-precision floating point numbers is not sufficient to represent the differences. That is, all the differences are numerically degenerate.

The second embodiment looks at the energy degeneration within the computational resolution from a different angle, and considers that all the degenerate states are probable. That is, we consider that it is acceptable to find the ground state with finite probability rather than finding it with a probability of 100%. In this line of thought, it is possible to also find excited states. However, because the same calculation procedure would produce the same microscopic state, small noise is deliberately introduced to create variation in the initial state. Equation (2.16) which is the QTSA governing equation is a type of mean field approximation equation including its own wavefunction at the current time in the potential term and, therefore, behaves like a typical complex system. Therefore, very small noise added is amplified during time propagation and causes unexpected behavior of the system. The system stochastically reaches the ground state and also excited states. The optimization apparatus 100 according to the second embodiment introduces quantum trials and noise so that the system stochastically reaches the target ground state as well as excited states.

Figure 7:
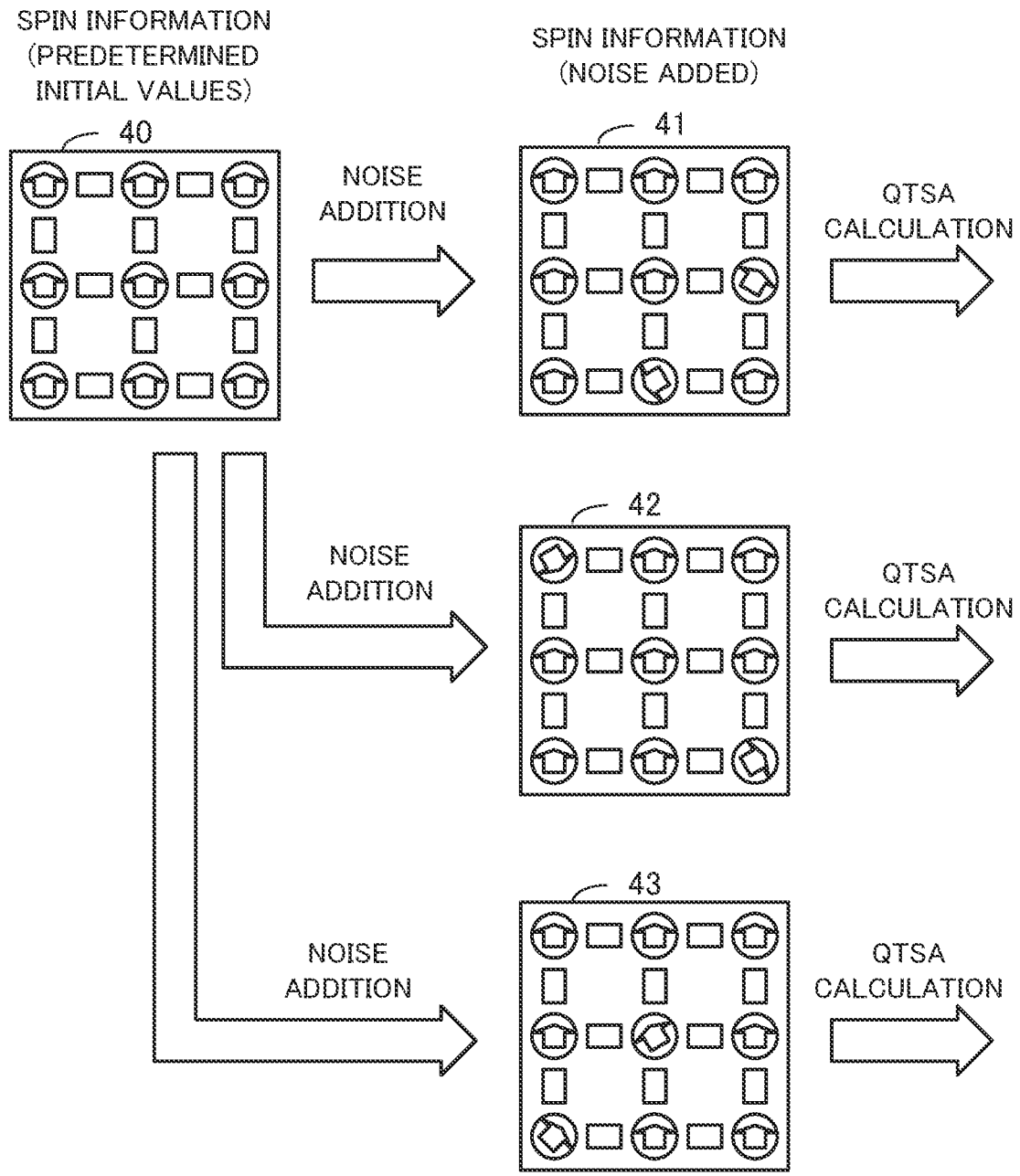
FIG. 7 is a schematic diagram of QTSA calculation involving noise addition.

FIG. 7 is a schematic diagram of QTSA calculation involving noise addition. For example, the optimization apparatus 100 first sets a predetermined initial value as spin information 40 that represents states of spins. In the spin information 40, the orientation of each spin is set to, for example, either 0 or 1. The optimization apparatus 100 adds noise to the spin information 40 to generate a plurality of spin information pieces 41, 42, 43, and so on. In each of the spin information pieces 41, 42, 43, and so on, some randomly chosen spins have been changed to states other than 0 and 1 (probability representations based on quantum mechanics).

The optimization apparatus 100 performs QTSA calculation using each of the spin information pieces 41, 42, 43, and so on as an initial state. Results obtained from the QTSA calculation run on each of the spin information pieces 41, 42, 43, and so on would be either the ground state or an excited state. Therefore, by generating a sufficient number of spin information pieces 41, 42, 43, and so on as initial states, any of the computation results is expected to indicate the ground state.

The use of quantum trials and noise addition is also expected to shorten calculation time. The reason for this is described next.

Based on equation (2.5), the decay rate of an excited state needs to satisfy expression (5.2) in the imaginary time propagation process.

$$\exp\left(-\frac{(E_n - E_0)}{\hbar}\tau\right) \ll 1 \qquad (5.2)$$

Here, energy $E_n$ is defined for the Hamiltonian equation (1.5), which includes the transverse field term and defines the individual $G_1$ and $G_2$. This is denoted by $E_1(G_1, G_2)$. Note that the term with the slowest decay rate limits the rate of calculation. This is a first excited state. Therefore, the calculation takes approximately the amount of time indicated by equation (5.3).

$$\tau = \frac{\hbar}{\Delta E_1} \quad (5.3)$$

Here, a change $\Delta E_1$ from $E_0$ to $E_1$ is given by equation (5.4).

$$\Delta E_1 = E_1(G_1, G_2) - E_0(G_1, G_2) \quad (5.4)$$

If a first-order quantum phase transition occurs here, an energy gap exists which is approximately equal to energy indicated by equation (5.5).

$$\Delta E_1 = O(\exp(-\alpha N)) \quad (5.5)$$

Therefore, the computation takes an amount of time indicated by equation (5.6).

$$\tau_1 \approx O(\exp(\alpha N)) \quad (5.6)$$

This indicates a virtually exponential increase in calculation time. Such calculation time is determined by the uncertainty principle, and it is therefore difficult to avoid the exponential growth in time.

However, once it is accepted that degeneration is practically taking place, the growth in computational complexity may be controlled in the range of the energy truncation error. Instead, all quantum states within the range of the energy truncation error become candidates, which is still small compared to the size of the entire solution space. This is because practically not all quantum states are degenerate.

As has been described above, the optimization apparatus 100 efficiently finds the solution by adding noise to each initial spin state and calculating a solution to a minimization problem using the QTSA.

<Implementation of QTSA with Noise Addition on Optimization Apparatus>

Next, specific description is provided on functions of the optimization apparatus 100, which adds noise to an initial state of Q spins and solves a minimization problem using the QTSA scheme.

Figure 8:
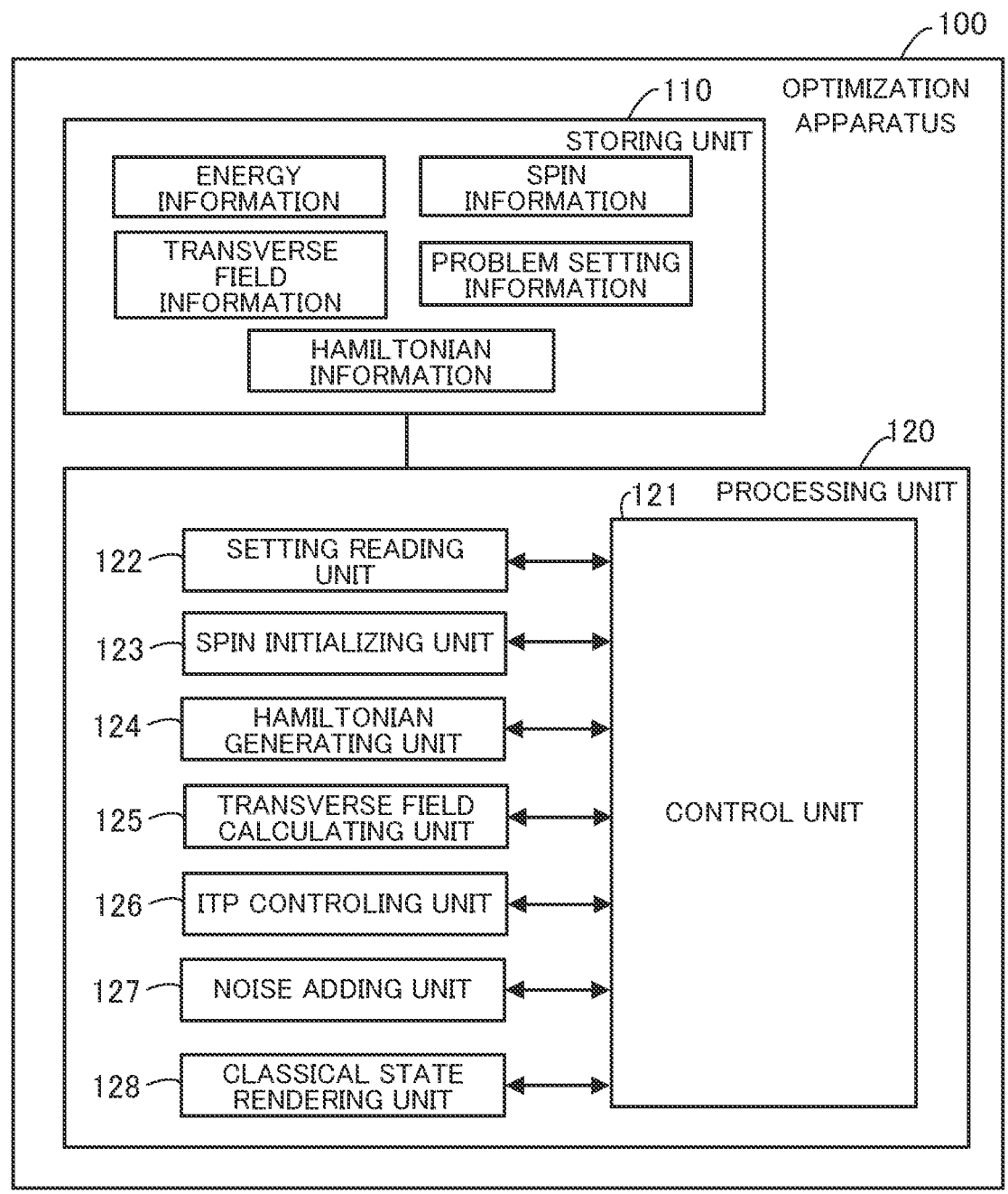
FIG. 8 is a block diagram illustrating functions of the optimization apparatus.

FIG. 8 is a block diagram illustrating functions of an optimization apparatus. The optimization apparatus 100 includes a storing unit 110 and a processing unit 120. The storing unit 110 is implemented using part of a storage area secured, for example, in the memory 102 or the storage device 103. The processing unit 120 is implemented, for example, by the processor 101 executing predetermined programs.

The storing unit 110 stores therein energy information, spin information, transverse field information, problem setting information, and Hamiltonian information.

The energy information includes calculated initial energy values and, amongst energy values calculated so far, a predetermined number of energy values in ascending order, starting with the minimum value. The energy information may also include a combination of values of individual state variables corresponding to each of the predetermined number of energy values. The spin information includes values of the individual state variables and information on specification of a spin initializing method. The transverse field information includes information on the strength of the transverse field acting on the system. The problem setting information includes, for example, information representing a solution target problem, optimization methods for use (such as SA and QTSA schemes), various parameters for carrying out the optimization methods, and an end-of-calculation condition. The Hamiltonian information includes, for example, the weight coefficient ($W_{ij}$), the bias coefficient ($b_i$), and the constant (C) of the energy function given by equation (1.1).

The processing unit 120 includes a control unit 121, a setting reading unit 122, a spin initializing unit 123, a Hamiltonian generating unit 124, a transverse field calculating unit 125, an ITP controlling unit 126, a noise adding unit 127, and a classical state rendering unit 128.

The control unit 121 exercises control over each unit of the processing unit 120 to perform the minimum value solving process.

The setting reading unit 122 reads, from the storing unit 110, the aforementioned various information into a form understandable to the control unit 121.

The spin initializing unit 123 initializes states of a plurality of spins included in an Ising model. The spin initializing unit 123 stores, in the storing unit 110, spin information including values of the state variables that represent the initialized spin states.

The Hamiltonian generating unit 124 generates, based on the problem setting information, Hamiltonian information that represents the Hamiltonian of the Ising model, used to solve the target problem. The Hamiltonian generating unit 124 stores the generated Hamiltonian information in the storing unit 110.

The transverse field calculating unit 125 calculates the transverse field updated with progress of real time.

The ITP controlling unit 126 controls imaginary time propagation. For example, each time the spin state is calculated with the strength of the transverse field fixed, the ITP controlling unit 126 moves imaginary time forward by each imaginary time step width $\Delta\tau$.

The noise adding unit 127 adds noise to the spin state initialized by the spin initializing unit 123. For example, the noise adding unit 127 randomly selects a predetermined number of spins from the multiple spins. The noise adding unit 127 adds noise to the probability amplitude of each selected spin. The noise adding unit 127 determines the amount of noise for each spin, for example, using a random number.

The classical state rendering unit 128 finds a state corresponding to a classical Ising model from a set of solutions obtained by quantum trials, and sets the state as an initial state of a classical MCMC process. Then, the classical state rendering unit 128 obtains the ground state by the classical MCMC process.

It is noted that the solid lines interconnecting functional blocks in FIG. 8 represent some of their communication paths. A person skilled in the art would appreciate that there may be other communication paths in actual implementations. Each functional block seen in FIG. 8 may be implemented as a program module, so that a computer executes the program module to provide its encoded functions.

Next described is a procedure run by the optimization apparatus 100 to search for the solution to a minimization problem using the QTSA scheme.

Figure 9:
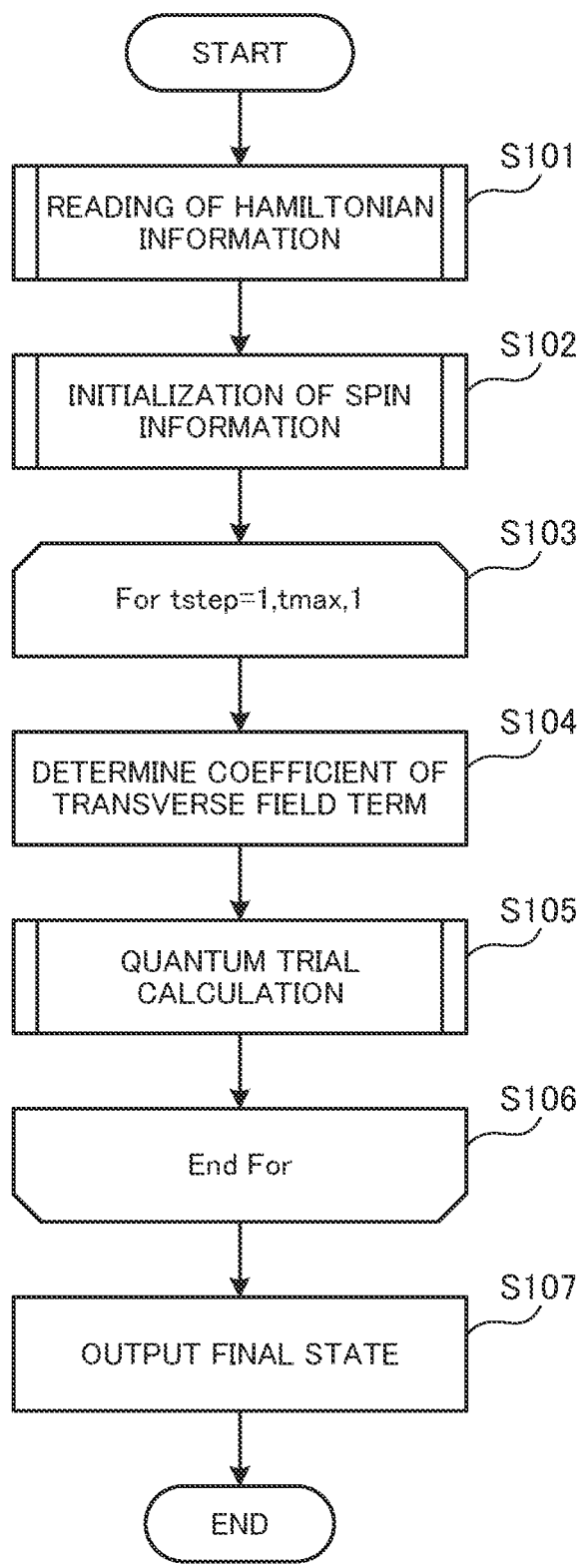
FIG. 9 is a flowchart illustrating an exemplary solution exploration procedure.

FIG. 9 is a flowchart illustrating an exemplary solution exploration procedure. The process in FIG. 9 is described below in the order of step numbers.

[Step S101] The control unit 121 performs a process of reading the Hamiltonian information from the storing unit 110. This process is described in detail later on (see FIG. 10).

[Step S102] The spin initializing unit 123 initializes the spin information. For example, the spin initializing unit 123 reads, from the storing unit 110, the specification information indicating a spin initializing method specified by the user. There are modes from which a spin initializing method is selected, including: specified mode; bonding mode; antibonding mode; and random mode. The specified mode is an initializing method for setting the spin states as specified by the user. The bonding mode is an initializing method that assigns the same sign to coefficients of the state |1> and the state |0> of each spin. The antibonding mode is an initializing method that assigns opposite signs to the coefficients of the state |1> and the state |0> of each spin. If a spin initializing method is specified by the user amongst the specified mode, bonding mode, and antibonding mode, the spin initializing unit 123 initializes the spin information by the specified initializing method. The random mode is an initializing method that stochastically sets each spin to point either up or down. In the random mode, by setting the probability of ups and downs to $50r$ each, the spin initializing unit 123 prepares an equal number of up and down spins. The spin information initialization process is described in detail later on (see FIG. 11).

[Step S103] The control unit 121 repeats steps S104 and S105 until the end-of-calculation condition is met. For example, the control unit 121 sets a predetermined number of iterative calculation runs as tmax. Then, the control unit 121 counts up a variable tstep representing the number of iterations, starting from 1, each time steps S104 and S105 are performed. The control unit 121 repeats the iterative process steps S104 and S105 while the value of tstep is less than or equal to tmax.

[Step S104] The transverse field calculating unit 125 determines the value of the coefficient $G_2$ of the transverse field term. For example, the transverse field calculating unit 125 sets the initial value of $G_2$ to 1, and decreases the value of $G_2$ by a predetermined amount after each iteration of steps S104 and 105. The transverse field calculating unit 125 allows the value of $G_2$ to be 0 when the value of tstep has reached tmax.

[Step S105] The ITP controlling unit 126, the noise adding unit 127, and the classical state rendering unit 128 perform a quantum trial calculation in cooperation with each other. By the quantum trial calculation, the ground state of the Hamiltonian under the current transverse field is obtained. The quantum trial calculation is described in detail later on (see FIG. 12).

[Step S106] When the end-of-calculation condition for the iterative process is met, the control unit 121 moves to step S107. For example, the control unit 121 determines that the end-of-calculation condition is met if the value of tstep is equal to tmax at the end of step S105.

[Step S107] The control unit 121 outputs the final state. For example, the control unit 121 outputs the ground state (optimal value) of the Hamiltonian obtained when the value of the coefficient $G_2$ of the transverse field has reached 0 and a combination of the state variables in the ground state.

By reducing the strength of the transverse field gradually with repetition of the imaginary time propagation process, it is thus possible to find the combination of the state variables that produce the optimal value of the system. The obtained combination of the state variables is the solution to the minimization problem.

Next described are further details of the process of reading the Hamiltonian information.

Figure 10:
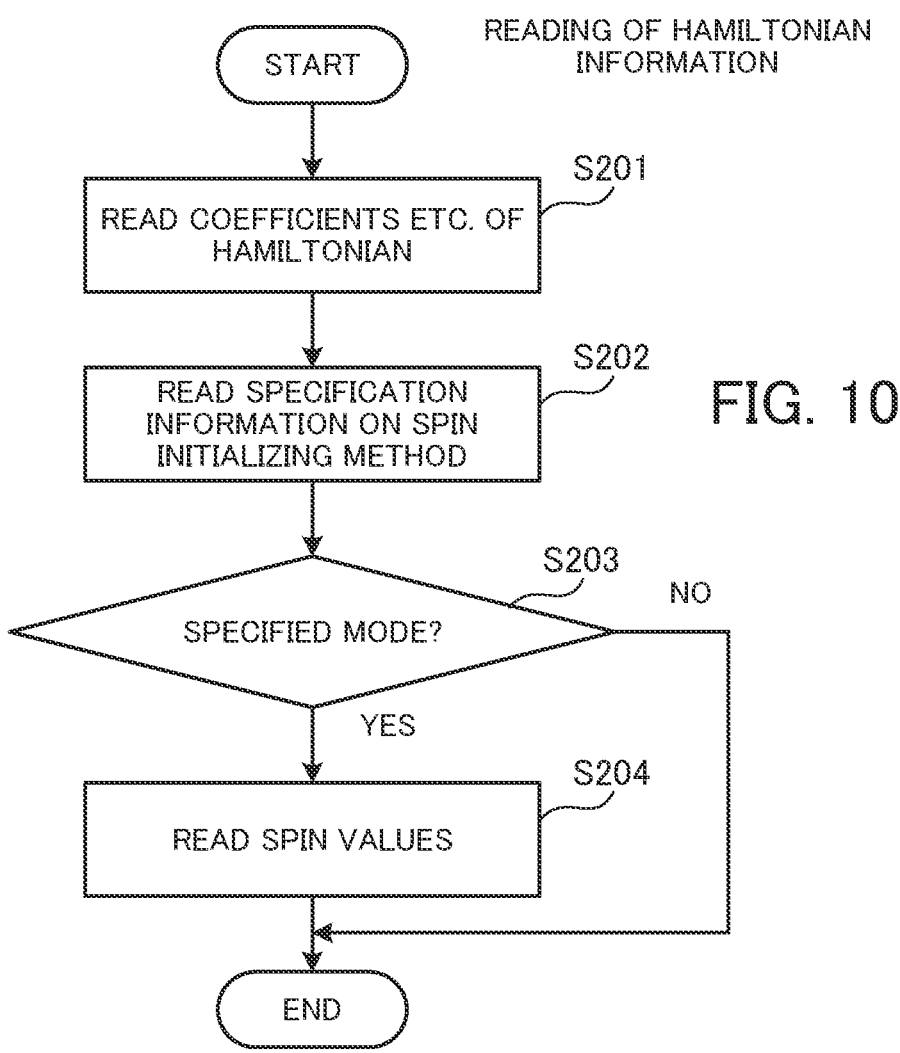
FIG. 10 is a flowchart illustrating an exemplary Hamiltonian information reading procedure.

FIG. 10 is a flowchart illustrating an exemplary Hamiltonian information reading procedure. The process in FIG. 10 is described below in the order of step numbers.

[Step S201] The control unit 121 reads, from the storing unit 110, the coefficients $W_{ji}$ and $b_i$ and the constant C of the target Hamiltonian. At this point, the control unit 121 also reads various parameters used in the QTSA calculation from the storing unit 110. For example, the control unit 121 reads the imaginary time step width $\Delta\tau$ if it is specified in advance. Note that variable time step width may be adopted as the imaginary time step width $\Delta\tau$. In that case, $\alpha\tau$ is obtained by a predetermined calculation and thus reading of the imaginary time step width $\Delta\tau$ is omitted.

[Step S202] The spin initializing unit 123 reads specification information on the spin initializing method.

[Step S203] The spin initializing unit 123 determines whether the spin initializing method is the specified mode. If it is the specified mode, the spin initializing unit 123 moves to step S204; otherwise, ends the Hamiltonian information reading process.

[Step S204] The spin initializing unit 123 reads spin values specified by the user from the storing unit 110. Subsequently, the spin initializing unit 123 ends the Hamiltonian information reading process.

Next described are further details of the process of initializing the spin information.

Figure 11:
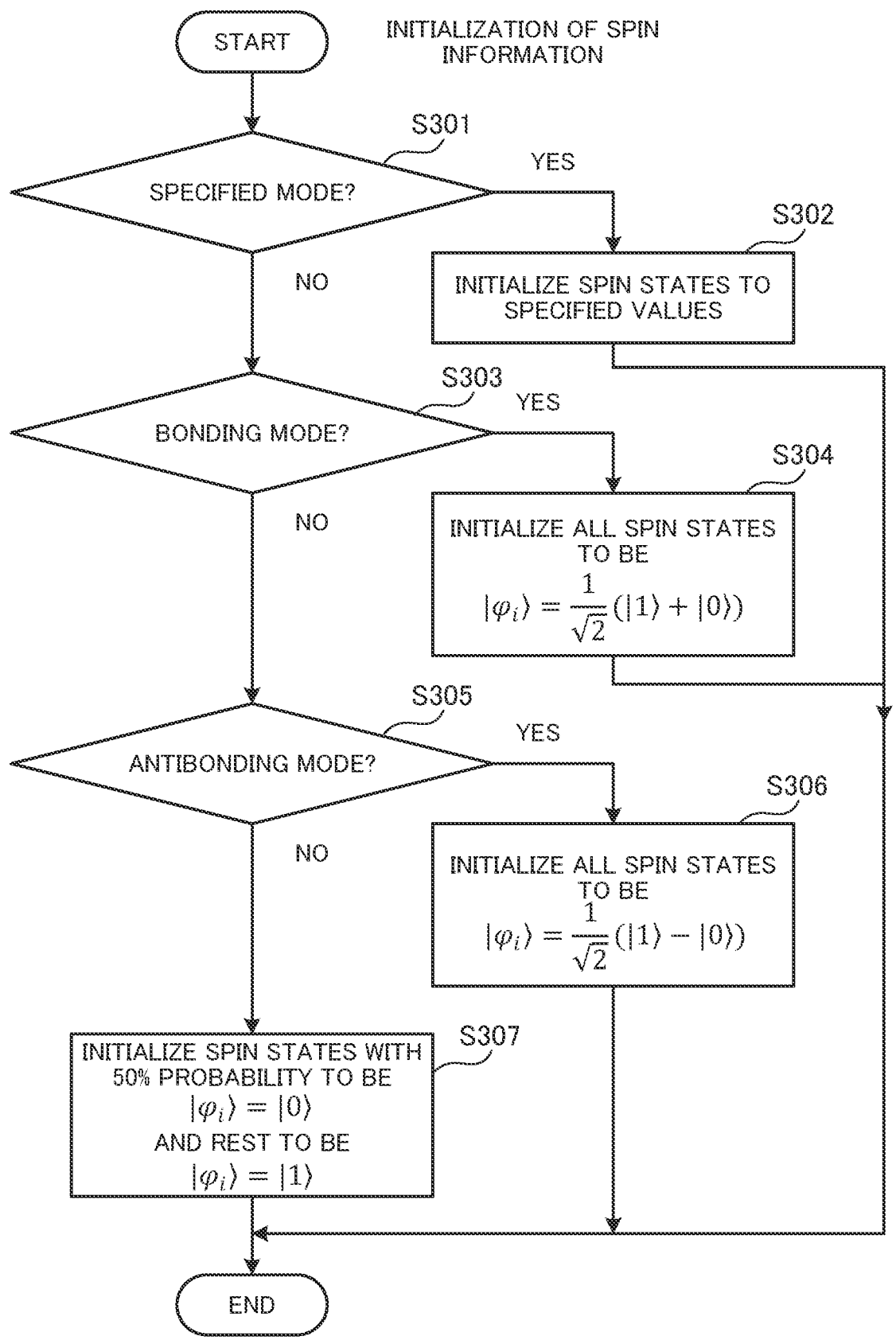
FIG. 11 is a flowchart illustrating an exemplary spin information initialization procedure.

FIG. 11 is a flowchart illustrating an exemplary spin information initialization procedure. The process in FIG. 11 is described below in the order of step numbers.

[Step S301] The spin initializing unit 123 determines whether the spin initializing method is the specified mode. If it is the specified mode, the spin initializing unit 123 moves to step S302; otherwise, moves to step S303.

[Step S302] The spin initializing unit 123 initializes the spin states to the values specified by the user. For example, the spin initializing unit 123 initializes the spin states based on the information on the spin states read from the storing unit 110. Subsequently, the spin initializing unit 123 ends the spin information initialization process.

[Step S303] The spin initializing unit 123 determines whether the spin initializing method is the bonding mode. If it is the bonding mode, the spin initializing unit 123 moves to step S304; otherwise, moves to step S305.

[Step S304] The spin initializing unit 123 initializes the spin states to enter the bonding mode. For example, the spin initializing unit 123 initializes the states of all the spins to be $|\varphi_i\rangle=1/(2^{1/2})$ (|1>+|0>). Subsequently, the spin initializing unit 123 ends the spin information initialization process.

[Step S305] The spin initializing unit 123 determines whether the spin initializing method is the antibonding mode. If it is the antibonding mode, the spin initializing unit 123 moves to step S306; otherwise, moves to step S307.

[Step S306] The spin initializing unit 123 initializes the spin states to enter the antibonding mode. For example, the spin initializing unit 123 initializes the states of all the spins to be $|\varphi_i\rangle=1/(2^{1/2})$ (|1>−|0>). Subsequently, the spin initializing unit 123 ends the spin information initialization process.

[Step S307] The spin initializing unit 123 initializes the spin states to enter the random mode. For example, the spin initializing unit 123 initializes the states of spins selected with a probability of 50% from all the spins to be $|\varphi_i\rangle=|0\rangle$ and those of the rest to be $|\varphi_i\rangle=|1\rangle$. Subsequently, the spin initializing unit 123 ends the spin information initialization process.

In the above-described manner, the spin information is initialized. At an early stage of the quantum trial calculation, noise is added to part of the wavefunction for each qubit (spin) set based on the initialized spin information. Next described in detail is a procedure of the quantum trial calculation involving noise addition.

Figure 12:
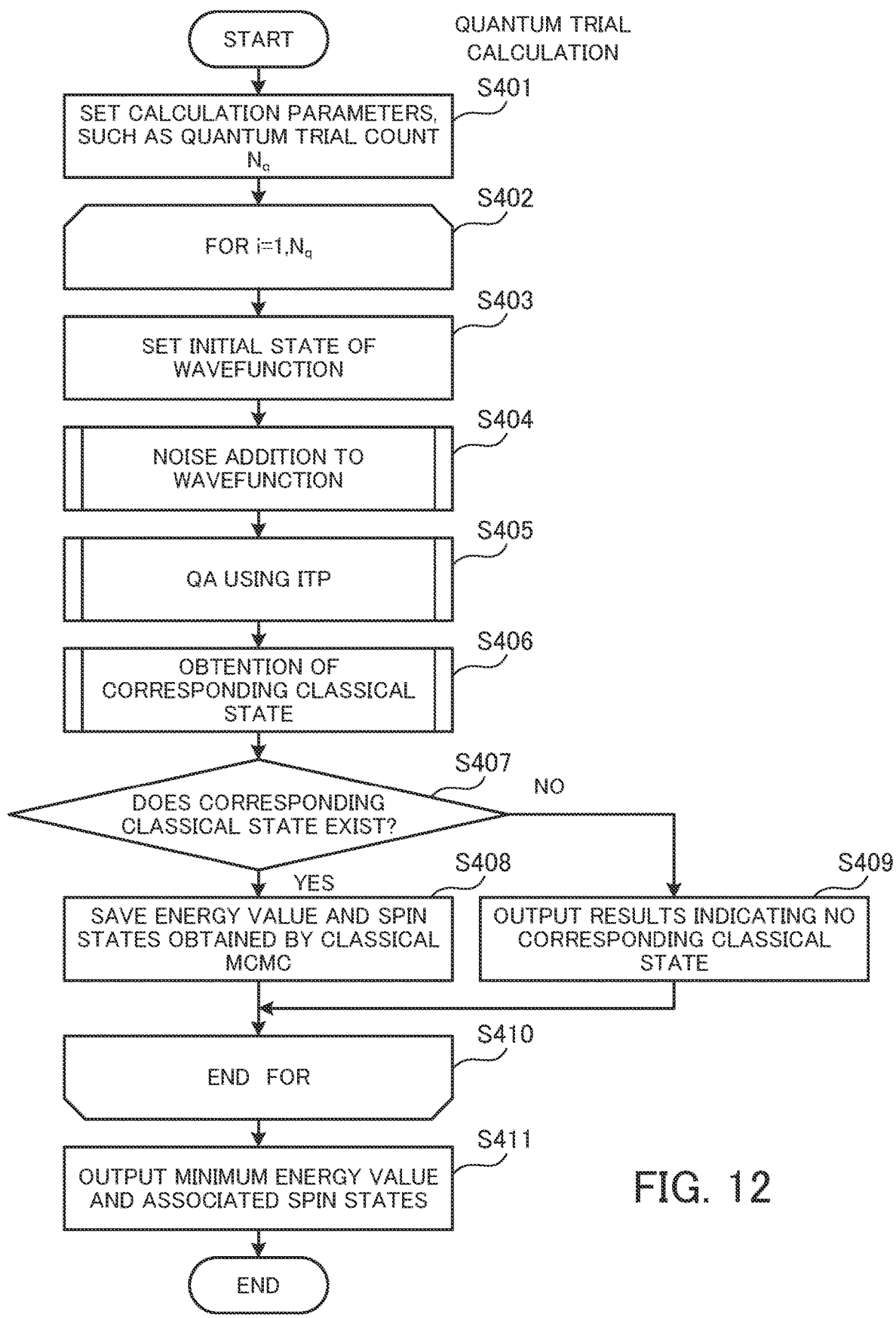
FIG. 12 is a flowchart illustrating an exemplary quantum trial calculation procedure.

FIG. 12 is a flowchart illustrating an exemplary quantum trial calculation procedure. The process in FIG. 12 is described below in the order of step numbers.

[Step S401] The ITP controlling unit 126 sets calculation parameters including a quantum trial count $N_q$. For example, the ITP controlling unit 126 sets values of the calculation parameters specified in advance to corresponding variables.

[Step S402] The ITP controlling unit 126 repeats steps S403 to S409 $N_q$ times.

[Step S403] The ITP controlling unit 126 sets an initial state of the wavefunction for each spin. For example, the ITP controlling unit 126 generates, for each spin, the wavefunction of equation (4.1) corresponding to the value initialized by the spin information initialization process.

[Step S404] The noise adding unit 127 performs a noise addition process on wavefunctions. The noise addition process is described in detail later on (see FIG. 13).

[Step S405] The ITP controlling unit 126 carries out quantum annealing using imaginary time propagation. The quantum annealing process using imaginary time propagation is described in detail later on (see FIG. 14).

[Step S406] The classical state rendering unit 128 calculates a classical state corresponding to the current spin states. In a process of calculating the classical state, "metastable state" is output as the processing results if no classical state exists. The process of calculating the classical state is described in detail later on (see FIG. 15).

[Step S407] The classical state rendering unit 128 determines whether the classical state corresponding to the current spin states exists. For example, if "metastable state" is obtained as the processing results, the classical state rendering unit 128 determines that no classical state exists; otherwise, determines that the classical state exists. If the corresponding classical state exists, the classical state rendering unit 128 moves to step S408; otherwise, moves to step S409.

[Step S408] The classical state rendering unit 128 obtains the ground state by a classical MCMC approach using the classical state obtained in step S406 as the initial state. For example, the classical state rendering unit 128 stochastically determines, by using a random number, which spin in the classical state of the Ising model is to be flipped and whether to accept the flip of the spin. If having determined to accept the spin flip, the classical state rendering unit 128 changes the current state of the Ising model into a state with the spin flipped. By repeating such state transition, the classical state rendering unit 128 obtains a state with the minimum energy. Then, the classical state rendering unit 128 saves the energy value and the spin states obtained by the classical MCMC as processing results of the current processing loop. Subsequently, the classical state rendering unit 128 moves to step S410. Note that the solution using the classical MCMC may be undertaken in cooperation with an apparatus as described in the aforementioned "An Accelerator Architecture for Combinatorial Optimization Problems".

[Step S409] The classical state rendering unit 128 outputs processing results indicating that no corresponding classical state exists.

[Step S410] At the completion of $N_q$ iterations of steps S403 to S409, the ITP controlling unit 126 ends the quantum trial calculation process.

[Step S411] The ITP controlling unit 126 outputs, as the results of the quantum trial calculation, the minimum energy value among all the energy values saved in step S408 and the spin states which yielded the minimum energy value.

In the above-described manner, quantum annealing employing imaginary time propagation, in which noise-added wavefunctions are used as initial states, is performed multiple times, and then spin states yielding the minimum energy value are obtained. Noise addition to wavefunctions is achieved stochastically using random numbers.

Figure 13:
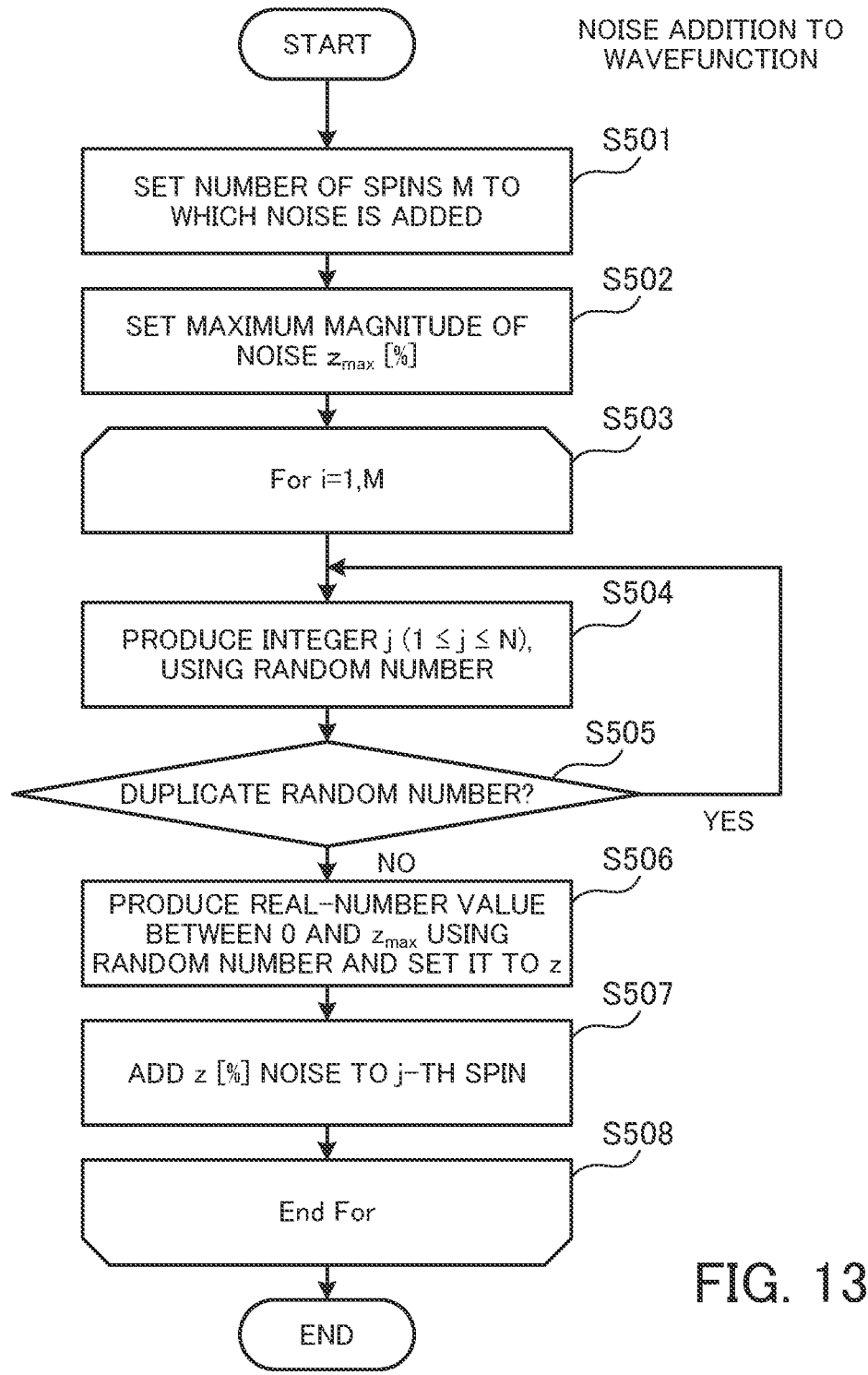
FIG. 13 is a flowchart illustrating an exemplary procedure of noise addition to wavefunctions.

FIG. 13 is a flowchart illustrating an exemplary procedure of the noise addition to wavefunctions. The process in FIG. 13 is described below in the order of step numbers.

[Step S501] The noise adding unit 127 sets a number of spins M to which noise is added. For example, the noise adding unit 127 sets a value designated in advance as the variable indicating the number of spins M for noise addition.

[Step S502] The noise adding unit 127 sets the maximum magnitude of noise $z_{max}$[%]. For example, the noise adding unit 127 sets a value designated in advance as the variable indicating the magnitude of noise z.

[Step S503] The noise adding unit 127 repeats steps S504 to S507 M times.

[Step S504] The noise adding unit 127 produces one integer j between 1 and N by using a random number.

[Step S505] The noise adding unit 127 determines whether the random number currently generated in step S504 overlaps with one produced before then. If there is a duplicate random number, the noise adding unit 127 moves to step S504; otherwise, moves to step S506.

[Step S506] The noise adding unit 127 produces a real-number value between 0 and $z_{max}$ [%] by using a random number. Then, the noise adding unit 127 sets the produced real-number value to z [%].

[Step S507] The noise adding unit 127 adds noise of z [%] to the probability amplitude of the wavefunction of the j-th spin.

[Step S508] At the completion of M iterations of steps S504 to S507, the noise adding unit 127 ends the process of noise addition to wavefunctions.

In the above-described manner, randomly selected magnitudes of noise are added to the wavefunctions of M spins, which then undergo quantum annealing using the imaginary time propagation process. Note that noise of the same magnitude may be applied to all the M spins. In that case, for example, the noise adding unit 127 sets $z_{max}$ [%] to z [%], without the production of a real-number value based on a random number in step S506.

Figure 14:
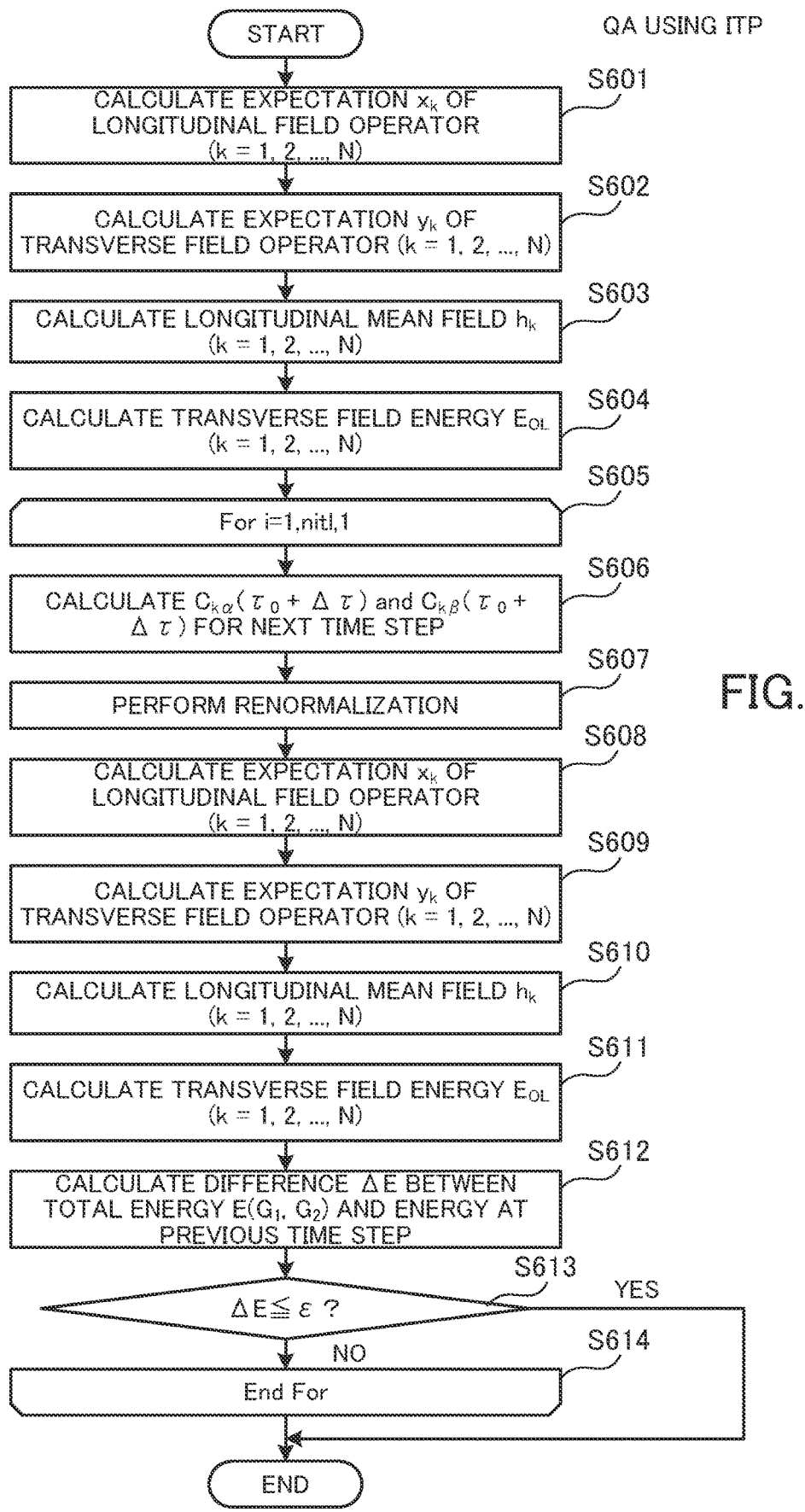
FIG. 14 is a flowchart illustrating an exemplary procedure of quantum annealing using an imaginary time propagation method.

FIG. 14 is a flowchart illustrating a procedure of quantum annealing using imaginary time propagation. The process in FIG. 14 is described below in the order of step numbers. In the following description, the symbol i representing the spin number used in the aforementioned equations is replaced by a symbol k.

[Step S601] The ITP controlling unit 126 calculates, based on equation (1.19), an expectation $x_k$ of the longitudinal field operator for each of all the spins (k=1, 2, ..., N).

[Step S602] The ITP controlling unit 126 calculates, based on equation (1.20), an expectation $y_k$ of the transverse field operator for each of all the spins (k=1, 2, ..., N).

[Step S603] The ITP controlling unit 126 calculates, based on equations (2.23 and 2.24), a longitudinal mean field $h_k$ for each of all the spins (k=1, 2, ..., N).

[Step S604] The ITP controlling unit 126 calculates, based on equation (2.35), transverse field energy $E_{OL}$.

[Step S605] The ITP controlling unit 126 repeats steps S606 to S613 until the end-of-condition is met. For example, the ITP controlling unit 126 sets a predetermined number of iterative calculations as nitl. Then, the control unit 121 sequentially counts up, by 1, a variable i representing the number of iterations of imaginary time propagation, starting from 1 each time steps S606 to S609 are run. The control unit 121 repeats the iterative process steps S606 to S609 while the value of i is less than or equal to nitl.

[Step S606] The ITP controlling unit 126 calculates, based on equation (2.16), $C_{k\alpha}(\tau_0+\Delta\tau)$ and $C_{k\beta}(\tau_0+\Delta\tau)$ for the next time step (i.e., a time point obtained by moving imaginary time forward by $\Delta\tau$).

[Step S607] The ITP controlling unit 126 performs, based on equation (6.1) below, renormalization so as to meet the normalization condition.

$$\gamma_m = \frac{1}{\sqrt{|C_{m\alpha}(t+\Delta t)|^2 + |C_{m\beta}(t+\Delta t)|^2}} \quad (6.1)$$

$\gamma_m$ is a normalization constant. Coefficients $C_{m\alpha}(t+\Delta t)$ and $C_{m\beta}(t+\Delta t)$ of the wavefunction before renormalization are individually multiplied by the normalization constant $\gamma_m$, and these products are used as coefficients of the wavefunction after renormalization.

[Step S608] The ITP controlling unit 126 calculates, based on equation (1.19) using the renormalized coefficient, the expectation $x_k$ of the longitudinal field operator for each of all the spins (k=1, 2, . . . , N).

[Step S609] The ITP controlling unit 126 calculates, based on equation (1.20) using the renormalized coefficients, the expectation $y_k$ of the transverse field operator for each of all the spins (k=1, 2, . . . , N).

[Step S610] The ITP controlling unit 126 calculates, based on equations (2.23 and 2.24), the longitudinal mean field $h_k$ for each of all the spins (k=1, 2, . . . , N).

[Step S611] The ITP controlling unit 126 calculates, based on equation (2.35), the transverse field energy $E_{OL}$.

[Step S612] The ITP controlling unit 126 calculates a difference $\Delta E$ between the total energy $E(G_1, G_2)$ based on equation (2.34) and the total energy at the previous time step.

[Step S613] The ITP controlling unit 126 determines whether the difference $\Delta E$ in the total energy between the current time step and the previous time step is less than or equal to truncation precision ε of calculation. If $\Delta E$ is less than or equal to ε, the ITP controlling unit 126 ends the imaginary time propagation process; otherwise, moves to step S614.

[Step S614] If the end-of-calculation condition of the iterative process has been met, the ITP controlling unit 126 ends the imaginary time propagation process. For example, the ITP controlling unit 126 determines that the end-of-calculation condition has been met when the value of i is equal to nitl at the end of step S613.

After the quantum annealing using imaginary time propagation is finished, the process of obtaining a corresponding classical state is carried out.

Figure 15:
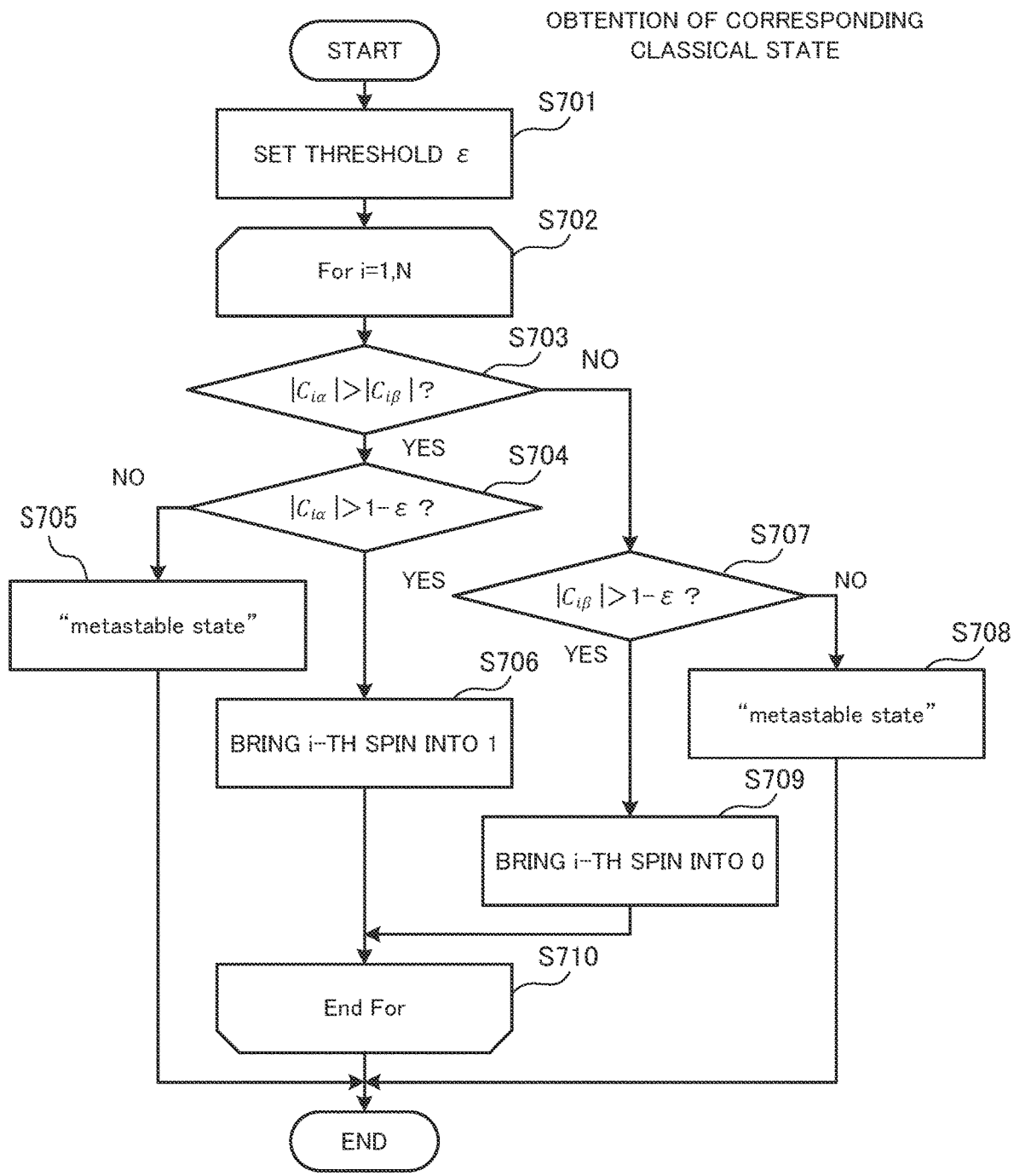
FIG. 15 is a flowchart illustrating an exemplary procedure for obtaining a corresponding classical state.

FIG. 15 is a flowchart illustrating an exemplary procedure for obtaining a corresponding classical state. The process in FIG. 15 is described below in the order of step numbers.

[Step S701] The classical state rendering unit 128 sets a threshold ε. For example, the classical state rendering unit 128 sets a value designated in advance as the variable representing the threshold ε.

[Step S702] The classical state rendering unit 128 repeats steps S703 to S709 N times (N=the number of spins) while counting up the variable i starting from 1.

[Step S703] The classical state rendering unit 128 compares the magnitude relationship between the absolute $C_{i\alpha}$ and the absolute $C_{i\beta}$, which represent the probability amplitudes (see equation (4.1)). If $|C_{i\alpha}|>|C_{i\beta}|$, the classical state rendering unit 128 moves to step S704; otherwise moves to step S707.

[Step S704] The classical state rendering unit 128 determines whether $|C_{i\alpha}|>1-\varepsilon$. If $|C_{i\alpha}|>1-\varepsilon$, the classical state rendering unit 128 moves to step S706; otherwise, moves to step S705.

[Step S705] The classical state rendering unit 128 outputs "metastable state" as the processing results, and ends the process of obtaining a corresponding classical state.

[Step S706] The classical state rendering unit 128 brings the i-th spin into state 1. Subsequently, the classical state rendering unit 128 moves to step S710.

[Step S707] The classical state rendering unit 128 determines whether $|C_{i\beta}|>1-\varepsilon$. If $|C_{i\beta}|>1-\varepsilon$, the classical state rendering unit 128 moves to step 3709; otherwise, moves to step S708.

[Step S708] The classical state rendering unit 128 outputs "metastable state" as the processing results, and ends the process of obtaining the corresponding classical state.

[Step S709] The classical state rendering unit 128 brings the i-th spin into state 0.

[Step S710] At the completion of N iterations of steps S703 to S709, the classical state rendering unit 128 ends the process of obtaining the corresponding classical state.

By obtaining the classical state, it is possible to find the ground state of the wave equation even if the ground state is not found only by quantum trials. This reduces the chance of not being able to obtain the ground state due to using the imaginary time propagation process.

<Calculated Examples of Combinatorial Optimization Problems>

Next described is an actual calculated example of a real-life combinatorial optimization problem. Note that, in the following calculated example, a stand-alone von Neumann computer is used. The calculation is achieved within a practical time frame with neither implementation of parallelization nor use of an accelerator, such as a graphics processing unit.

<<Practical Case of Collapse Phenomenon Induced by Quantum Trials on Noise-Added Initial States>>

Let us take a look at the calculated results of the aforementioned 4-city TSP obtained by the optimization apparatus 100 running 200 quantum trials. Calculation conditions given to the optimization apparatus 100 are as follows.

The optimization apparatus 100 randomly selects k spins (k=1, 2, and so on) for noise addition. In addition, the optimization apparatus 100 solves the problem with $G_1$ fixed to 1.0 while changing $G_2$ from 1 to 0. The number of division points of $G_2$ is $n_0=128$. $G_2(n)$ is given by equation (7.1) below.

$$G_2(n) = 1 - \frac{n}{n_0} \quad (7.1)$$

The optimization apparatus 100 sets the truncation error 5E of QTSA (imaginary time propagation) to $10^{-8}$ ($\delta E = 10^{-8}$). In addition, the optimization apparatus 100 continues, for a given $G_2(n)$, the QTSA calculation until the calculation reaches or falls below the truncation error of the energy convergence process. Once the energy has converged, the optimization apparatus 100 increases the value of n by 1, and then repeats the QTSA calculation again. In the end, values yielded at $G_2=0$ are obtained.

As for the initial values of the wavefunctions, the optimization apparatus 100 randomly selects any two amongst sixteen qubits (spins), and randomly adds noise of up to 1% to the probability amplitude $C_{m\alpha}(0)$ of each of the selected bits. The results obtained after repeating such a quantum trial about 200 times are depicted in FIG. 16.

Figure 16:
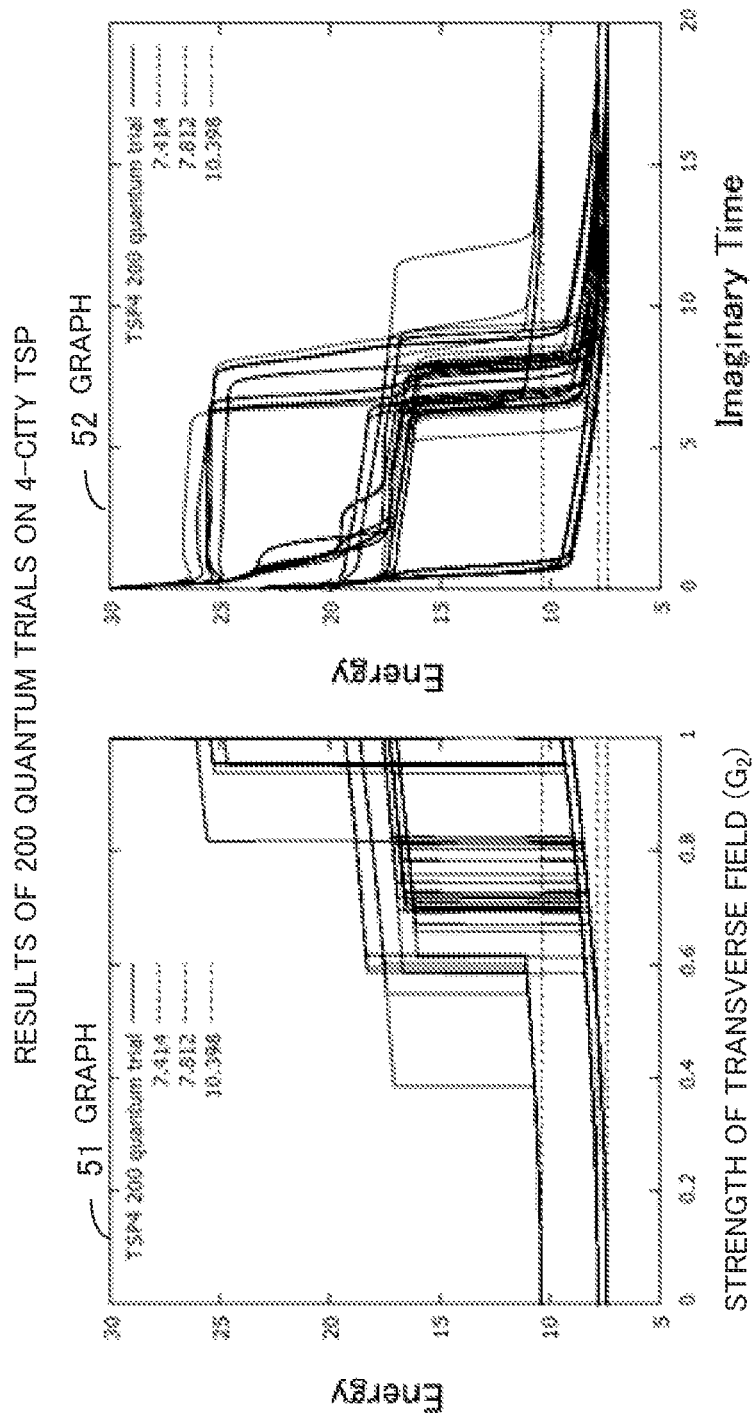
FIG. 16 illustrates exemplary results of 200 quantum trials on the 4-city TSP.

FIG. 16 illustrates exemplary results of 200 quantum trials on a 4-city TSP. In FIG. 16, a left-hand graph 51 represents energy transition in relation to the strength of the transverse field. In the graph 51, the horizontal axis represents the strength of the transverse field while the vertical axis represents energy. A right-hand graph 52 represents energy transition along the imaginary time path. In the graph 52, the horizontal axis indicates imaginary time while the vertical axis represents energy.

In the graphs 51 and 52, the solid lines overlapping correspond to the individual two hundred quantum trials. According to the graph 51, each of all the trials reach one of energy states which are the solutions to the 4-city TSP, i.e., 7.414, 7.812, and 10.398. It turns out that the ground state is not obtained 100% of the time but found with finite probability. It is also seen that, although each trial moves through different progress to reach its solution, many trials go through high energy states.

Such high energy quantum states are apparent in the graph 52. A noticeable trend is that the energy remains at higher levels in finite lengths of time and then collapses into the TSP solution levels. These higher energy levels are referred to as metastable states.

When the imaginary time propagation is continued, some trials reach their final states straight away but others go through metastable states. The metastable states are not always classical states that are generally described using only 1s and 0s.

Figure 17:
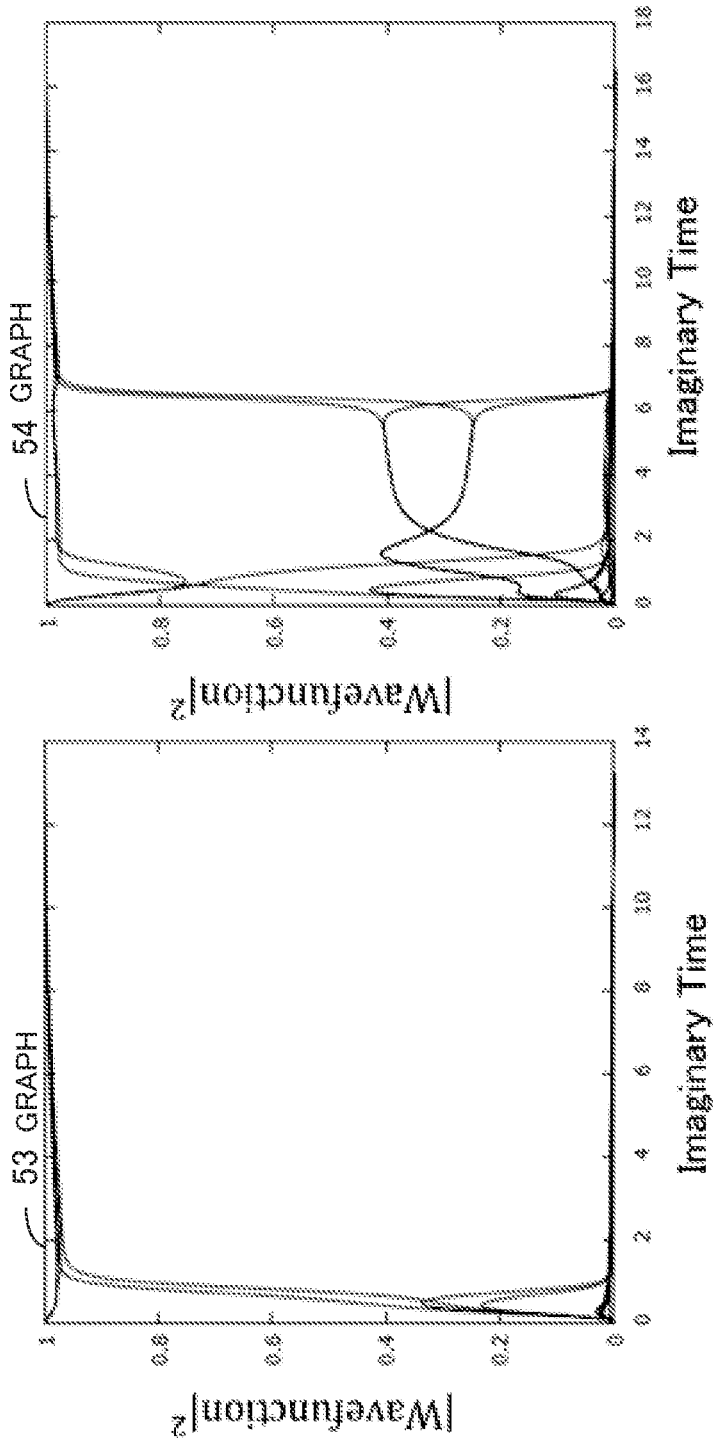
FIG. 17 illustrates exemplary temporal variations in wavefunctions of spins.

FIG. 17 illustrates exemplary temporal variations in wavefunctions of spins. A left-hand graph 53 represents temporal variations in wavefunctions of 16 spins when the energy reaches the ground state without going through a metastable state. A right-hand graph 54 represents temporal variations in wavefunctions of 16 spins when the energy reaches the ground state after going through a metastable state. In the graphs 53 and 54, the horizontal axis indicates imaginary time and the vertical axis indicates the square of the absolute value of the wavefunction.

In the case of not going through a metastable state, all the spins flip early in the imaginary time propagation. In the case of going through a metastable state, on the other hand, 12 out of the 16 spins flip early in the imaginary time propagation; however, the remaining 4 spins are disordered and remain in intermediate states. No classical states exist that correspond to these intermediate states, which are unique to quantum mechanics. Then, at imaginary time $\tau \approx 6$, in each of two pairs made up of the remaining 4 spins, one spin flips to state 0 and the other flips to state 1 and they separately reach their ground states. This is a type of phenomenon called bifurcation.

Note that, with an increase in the number of qubits in a system, the duration of metastable state tends to extend. This indicates the existence of deep potential barriers. Because such a metastable state lasts long and is stable, the calculation may be over, even with the effect of heat dissipation, before the energy collapses to a lower energy level. In this case, there is no classical state corresponding to the metastable state, and it is therefore impossible to obtain the solution of a corresponding classical Ising model. Hence, in extracting solutions of classical Ising models, the optimization apparatus 100 weeds out, from solution candidates, solutions whose end results indicate metastable states. Note however that it is not as if metastable states have no meaning. It is simply a matter of not being able to map such metastable states to classical counterparts. This problem results from the quantum theory approach essentially being an extension of the classical.

<<Practical Case of Symmetry Destruction by Noise Addition>>

Next presented is a practical case indicating that the symmetry of wavefunctions of spins may be deliberately broken by adding noise to initial values of the wavefunctions. We use an 8-city TSP as a target problem for a system size of 64 qubits.

FIG. 18 illustrates an exemplary 8-city TSP. In FIG. 18, the location (x and y coordinates) of each city is mapped to the identification number of the city. One of the optimal solutions of the problem indicates a sequence of the cities to be visited as cities 1, 2, 3, 4, 5, 6, 7, and 8. The optimal value at this time is 2.5023.

Figure 19:
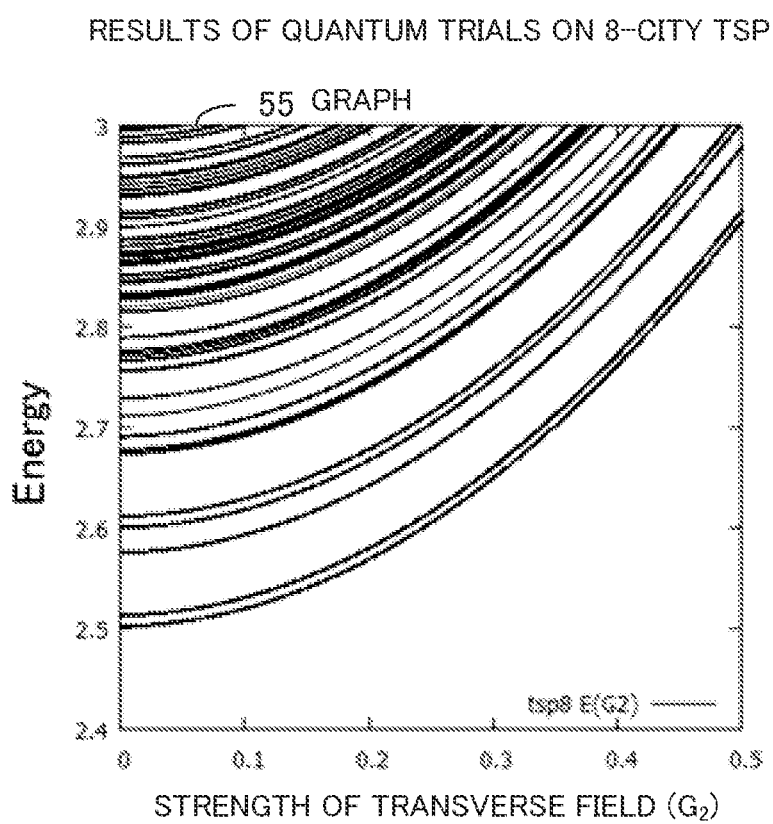
FIG. 19 illustrates exemplary results of quantum trials on the 8-city TSP.

FIG. 19 illustrates exemplary results of quantum trials on the 8-city TSP. In a graph 55 of FIG. 19, the horizontal axis represents the strength of the transverse field while the vertical axis represents energy. Lines in the graph 55 represent energy transitions in relation to the strength of the transverse field in quantum trials each run on one of multiple initial states with different noise patterns.

An initial state evolves into its final state via scattering according to equation (3.2); however, the initial states here are all different from one another due to addition of the different noise patterns, and therefore they evolve into different final states. As a consequence, various quantum states including the ground state are obtained. It can be seen that, even though noise added to the initial states is small, the ground state is not always obtained as the results of quantum annealing.

This is not desirable if obtention of the ground state with a probability of 100% is sought. However, taking advantage of the effect of noise, it is possible to calculate quantum states including the ground state by deliberate addition of noise. To put it another way, the ground state is calculated with not a probability of 100% but finite probability.

Next described is how the symmetry of a wavefunction is broken by noise addition.

Figure 20:
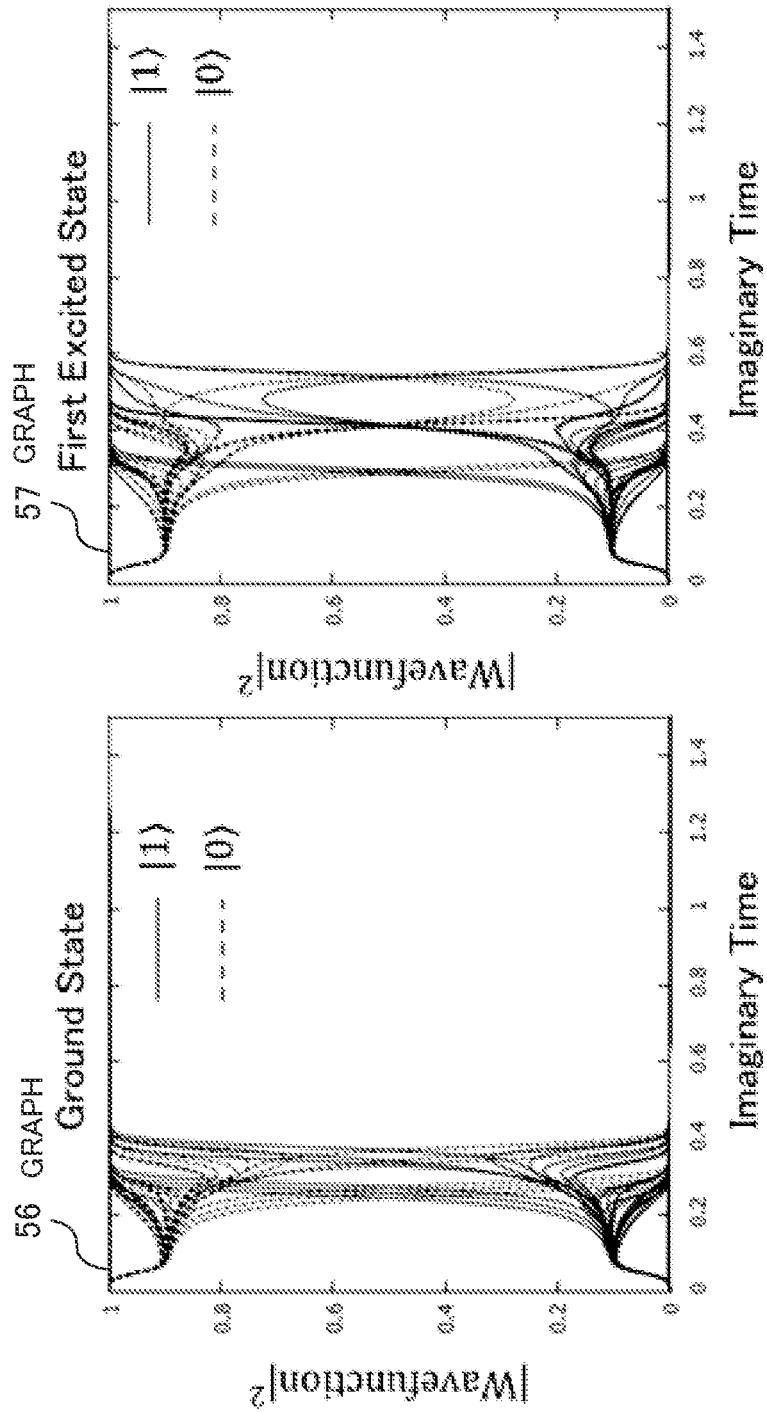
FIG. 20 illustrates exemplary time propagation of wavefunctions on the 8-city TSP.

FIG. 20 illustrates exemplary time propagation of wavefunctions in the 8-city TSP. FIG. 20 depicts time propagation of wavefunctions of 64 qubits for the ground state and a first excited state. A left-hand graph 56 represents the time propagation of the ground state, and a right-hand graph 57 represents the time propagation of the first excited state. In the graphs 56 and 57, time propagation of sixty-four |1> is indicated by solid lines and that of sixty-four |0> is indicated by dotted lines. The horizontal axis and the vertical axis in the graphs 56 and 57 represent imaginary time and the square of the absolute value of each wavefunction, respectively.

As can be seen by comparison of the ground state and the first excited state, noise addition does not make much difference at an early stage in the time propagation of the system. However, as time progresses, the effect of noise is increasingly amplified. Then, eventually the amplified noise influences the behavior of the entire system, i.e., which spins to flip. Therefore, addition of slight noise to an initial value of a wavefunction keeps the system from evolving into the ground state in a deterministic manner.

Next described is how the spins flip. At an early stage in the time propagation, all the spins start flipping in a coordinated manner, keeping in step with others. However, when just one spin starts flipping at a faster pace than others, the symmetry of the entire system is broken. Then, the flipping of the spin triggers the flipping of others, and in this manner the spin states of the entire system become determined.

It is no use adding noise again after the symmetry has been broken. Once the flipping starts, the system is stable against addition of some noise unless taking measures to allow the spins to completely flip over. This is of importance from a physical perspective because the symmetry of wavefunctions affect the calculation stability and the success or failure of quantum annealing. Right after the spin information initialization, the wavefunctions of all spins are in the same state and therefore highly symmetrical, which is however easily broken. On the other hand, once the symmetry is broken, an addition of some noise is not enough to break the symmetry of wavefunctions to bring the system to a state with lower energy. Therefore, if it is desired to find the ground state 100 percent of the time in quantum annealing, noise is not supposed to be added from the initial state to the final state, until the symmetry of the ground state is selected. Therefore, strict constraints such as implementation of adiabatic evolution are imposed on the transition of the system.

On the other hand, if noise is actively employed on the precondition that heat dissipation takes place, it is possible to obtain states that also include excited states although then the probability of reaching the ground state is not 100%.

<<Comparison in Efficiency Between Quantum Trials and Classical MCMC Trials>>

Next, the results obtained by quantum trials with noise addition are compared to those of a classical MCMC approach with replica exchange, which are obtained by dealing with the same problem as a classical Ising model. The purpose of this comparison is to examine the efficiency of a sampling calculation based on the quantum trials against a classical MCMC-based sampling calculation. Calculation conditions given to the optimization apparatus 100 are as follows.

A numerical solution of the classical Ising model is based on MCMC. Two approaches are used for the solution: single-spin-flip and pair-spin-flip approaches. The single-spin-flip approach randomly selects one spin amongst N spins and flips the selected spin. The pair-spin-flip approach simultaneously conducts randomly selecting a spin in state 1 amongst N spins and flipping it to state 0 and randomly selecting a spin in state 0 and flipping it to state 1, in such a manner as to keep the number of spins in state 1 the same.

The pair flip approach is adopted because, in the case of a TSP, the number of spins in state 1 is determined to be the number of cities. The pair flip approach keeps the number of answers the same and therefore substantially reduces the size of search space compared to the single flip approach. The Metropolis method is used to decide whether to accept or reject a new state built by the flipping. In addition, because a simple MCMC is too slow, the replica exchange sampling is used in the classical MCMC calculation. The number of replicas is fixed to 10. For each replica, one billion trials are performed, and the frequency of replica exchange is set to once every 100 times. The temperature is optimized manually.

Figure 21:
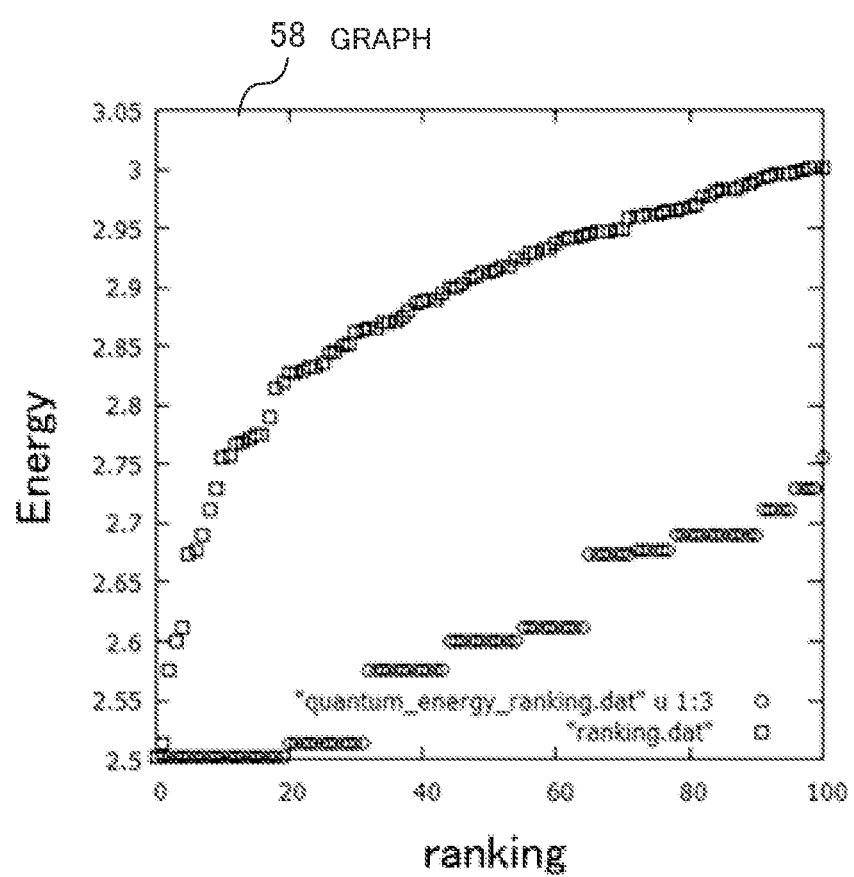
FIG. 21 illustrates an exemplary comparison between calculated results of quantum trials and those of classical Ising model MCMC on the 8-city TSP.

FIG. 21 illustrates an exemplary comparison between calculated results of quantum trials and those of the classical Ising model MCMC on an 8-city TSP. In a graph 58 of FIG. 21, the circles represent results of the top 100 trials in ascending order of energy amongst the 1000 quantum trials on the 8-city TSP. As for the classical Ising model MCMC on the 8-city TSP, the top 100 results in ascending order of energy are denoted by squares. In the graph 58, the horizontal axis represents the ranking (results with lower energy is higher in rank) while the vertical axis represents energy.

It is understood that the ground state is obtained by both the quantum and classical theory approaches. As for excited states, those up to the $11^{th}$ place from the bottom (up to the $100^{th}$ in rank in the quantum theory approach) are coincided with each other. As for the ground state, eight ground states are degenerate. Obtention of eight or more ground states results from exact the same quantum state being calculated. Herewith, it is seen that the quantum theory approach is able to obtain the ground state together with excited states.

Figure 22:
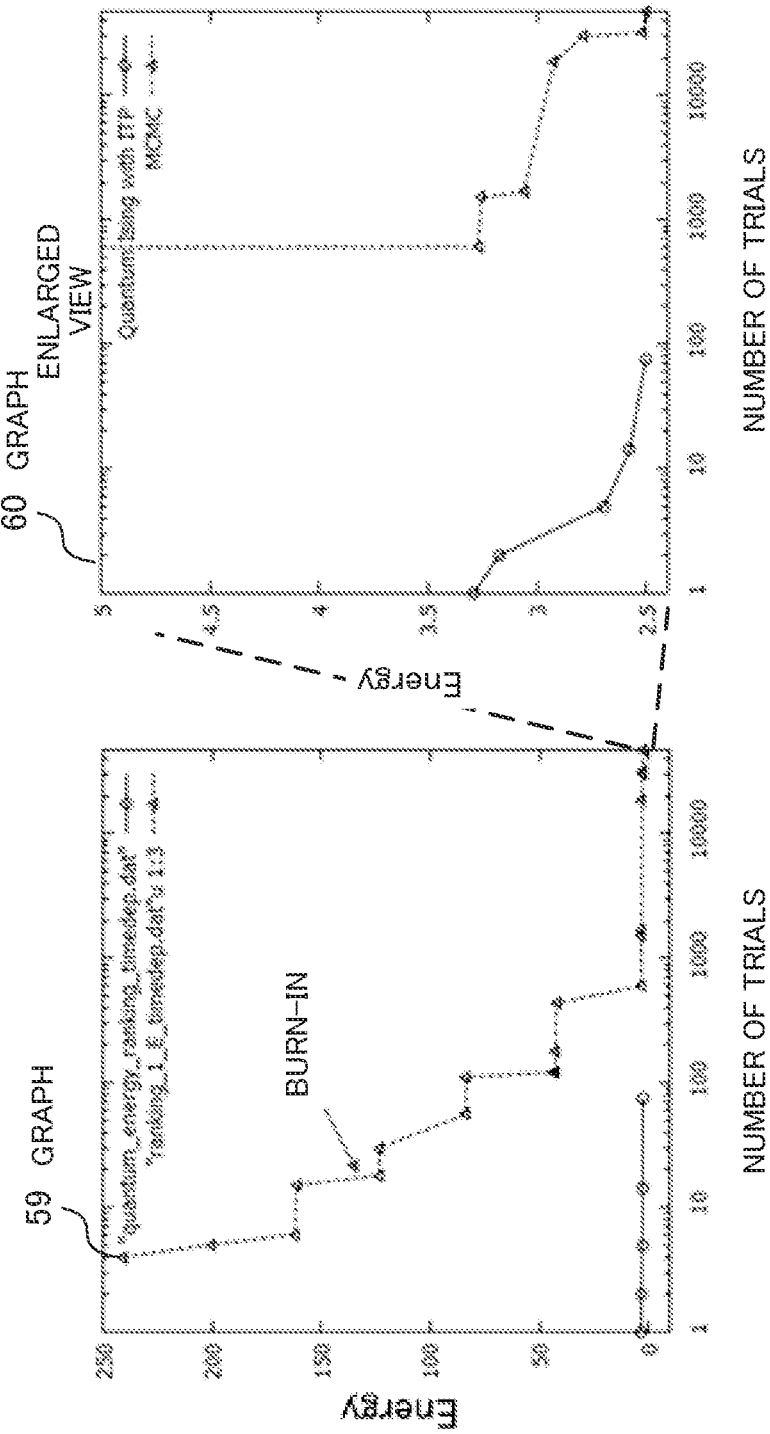
FIG. 22 illustrates exemplary energy transition according to the number of trials.

FIG. 22 illustrates exemplary energy transition according to the number of trials. A graph 59 of FIG. 22 represents how energy value is updated as a function of the number of trials. A graph 60 is an enlarged view of the graph 59, only around the range of energy from 0 to 5. In the graphs 59 and 60, the horizontal axis indicates the number of trials and the vertical axis indicates energy.

In the example of FIG. 22, the value of the ground state energy is obtained in the $75^{th}$ quantum trial, as indicated by the polygonal line with circles. Note however that when the ground state is reached differs depending on how to give random numbers. There is a case where the ground state is reached in the third trial if the random seed is changed. In the case of solving the classical Ising model by the MCMC-based sampling, on the other hand, the solution is reached in the $47492^{nd}$ trial, as indicated by the polygonal line with triangles. Given the number of replicas, the ground state is in fact reached in the 474920 trials.

However, it should be noted that the absolute value of 474920 trials does not have much meaning because MCMC based replica exchange may be accelerated ten to hundred times faster by optimization. What is always seen in the MCMC-based sampling is that the minimum value is updated at such a slow pace as to be almost inversely proportional to the logarithm of time after an initial burn-in (initial relaxation) is over. Therefore, scaling properties are very important.

In the case of the 8-city TSP, the effect of scaling properties is not prominent; however, with an increased number of cities, differences in the scaling properties are clearly seen. This is illustrated later by calculated results obtained from a TSP with an increased number of cities.

An important feature seen in the results of the quantum theory approach is deexcitation induced by the effects of noise and heat dissipation. The deexcitation may be considered as a transition from a high energy to a low energy state by a tunneling effect. Therefore, the final state obtained is relatively close to the ground state.

<<Scaling Evaluation for Case of Ulysses16>>

Next described is a comparison in scaling of solution update rate with the classical MCMC-based sampling. ulysses16 included in TSPLIB is used here, whose optimal solution is known to be 6859. Unlike in the case of 8-city TSP, ulysses16 involves a significant number of paths, and is thus complex enough to highlight differences between the classical and quantum theory approaches.

As for exemplary calculation using the classical Ising model solution, 10 replicas are used in the replica exchange, and one billion trials are performed for each replica, as in the case of the 8-city TSP. In the calculated example, the frequency of replica exchange is once every 100 times. As for the QTSA scheme, $G_1$ is set to 0.001 while $G_2$ decreases from 1 to 0 according to equation (6.1). The number of quantum trials is 1000. Noise is added on single-particle excitation basis.

Figure 23:
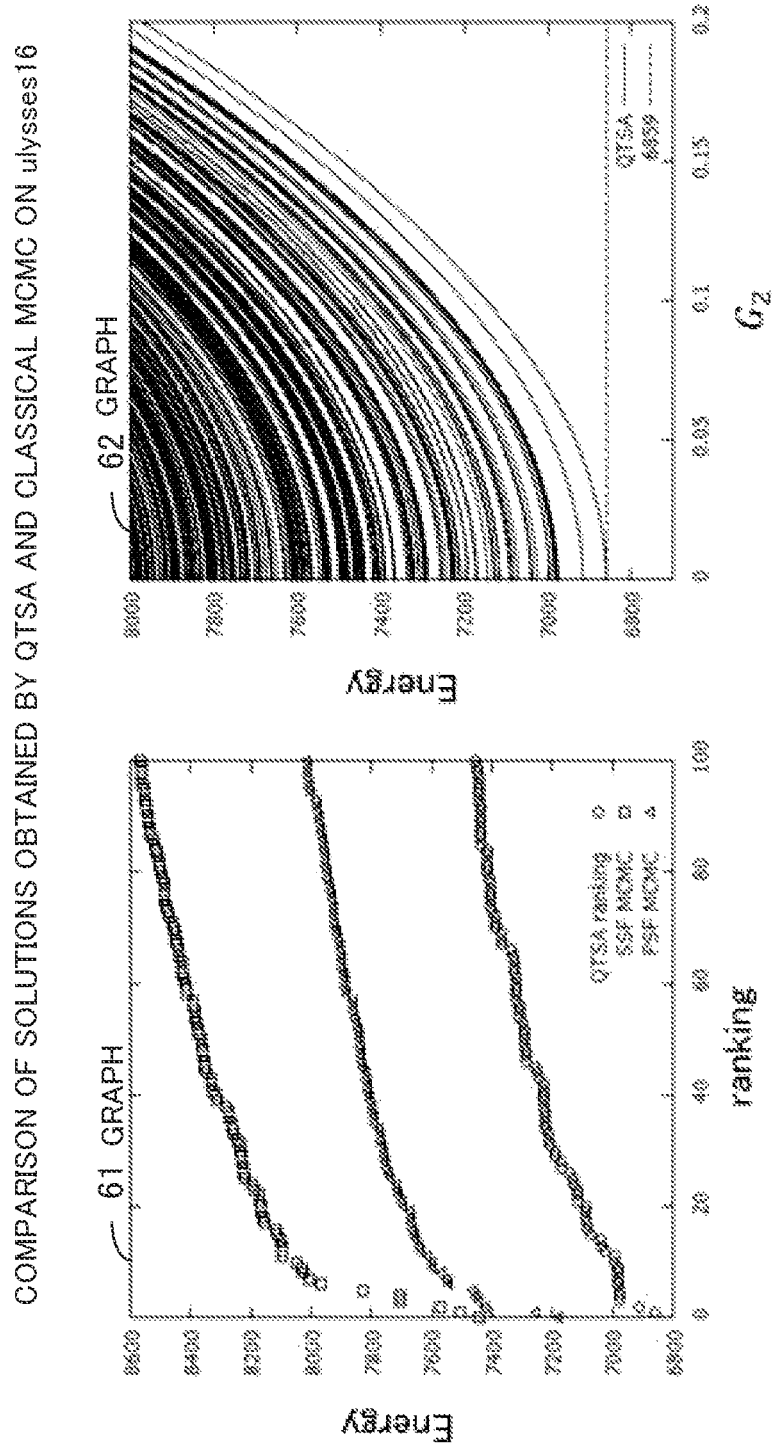
FIG. 23 illustrates exemplary comparison of solutions obtained by QTSA and classical MCMC on ulysses16.

FIG. 23 illustrates exemplary comparison of solutions obtained by the QTSA and the classical MCMC on ulysses16. A left-hand graph 61 depicts a comparison in the top 100 trials in ascending order of energy between the classical MCMC and the QTSA. In the graph 61, the horizontal axis represents the ranking while the vertical axis represents energy. A right-hand graph 62 depicts change in energy (solution target) as a function of the strength of the transverse field, $G_2$. In a graph 62, the horizontal axis represents the strength of the transverse field while the vertical axis represents energy.

With reference to FIG. 23, the ground state is reached in the quantum theory-based calculation (circles in the graph 61). Compared to the results of the classical MCMC (squares and triangles in graph 61), the quantum theory approach yields better results. With the parameter set used to run one billion trials for each replica, the classical MCMC does not reach the solution. Note that, in the graph 61, SSF and PSF stand for single spin flip and pair spin flip, respectively. The minimum value of SSF is 7442 while that of PSF is 7181. The minimum value obtained by the quantum theory approach is 6859, which matches the official minimum value.

Figure 24:
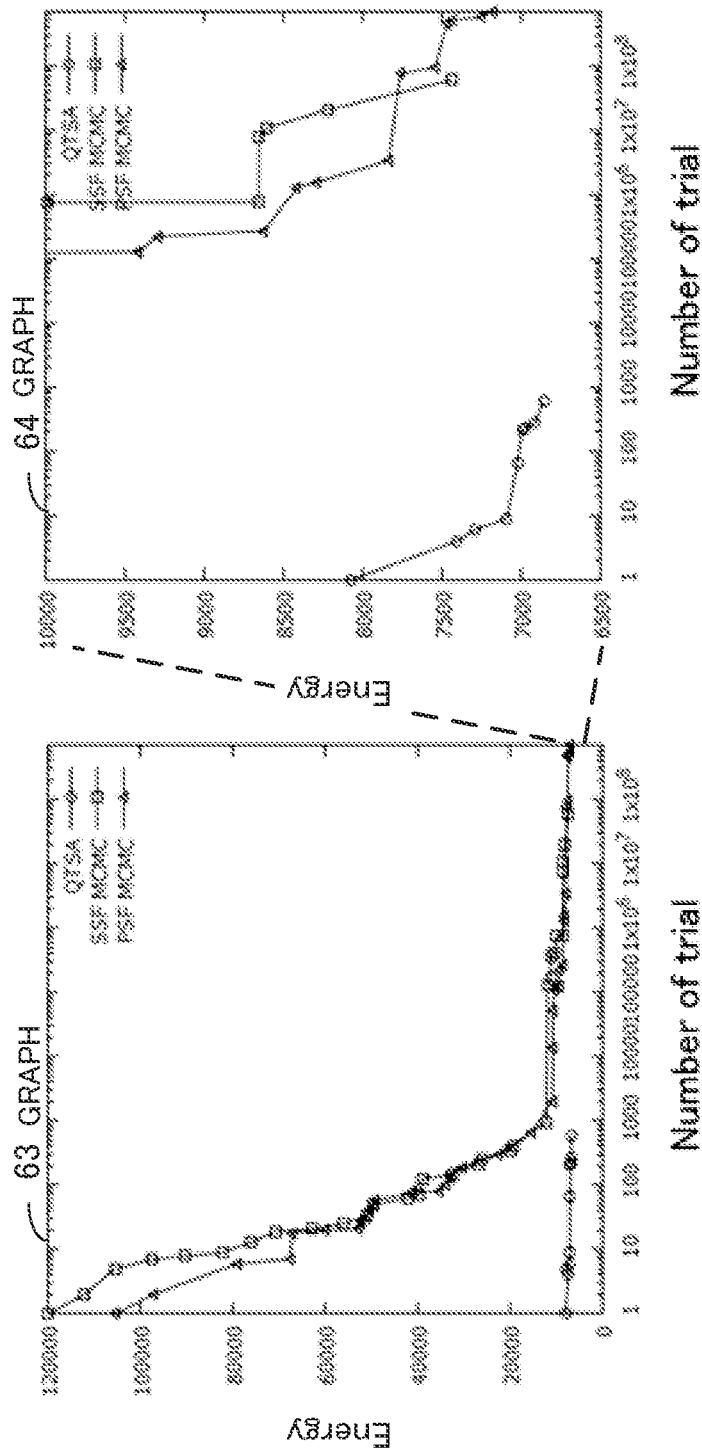
FIG. 24 illustrates an exemplary comparison in solution improvement rate between quantum and classical theory approaches.

FIG. 24 illustrates an exemplary comparison in the rate of solution improvement between the quantum and classical theory approaches. FIG. 24 represents how the solution is updated as a function of the number of trials. A left-hand graph 63 depicts the transition of solution updates, starting with the first trial. A right-hand graph 64 depicts the transition of solution updates after a burn-in period is over. In the graphs 63 and 64, the horizontal axis indicates the number of trials and the vertical axis indicates energy.

The first 1000 trials in the graph 63 is deemed as a burn-in period. The updates during the burn-in period are not a substantial part for the rate of solution update. In the case of the classical MCMC sampling (the polygonal lines with squares and triangles), as illustrated in the graphs 63 and 64, the update rate drastically slows down after the initial burn-in period is over and the solution update progresses logarithmically with an increase in the number of trials. In the case of the quantum theory approach (the polygonal line with circles), on the other hand, the measurements start around 8000 from the very beginning and then the solution is reached in the $597^{th}$ trial.

Next described is a mechanism that bifurcation accelerates calculation. This phenomenon is accounted for by seeing temporal variations in microscopic states of spins.

Figure 25:
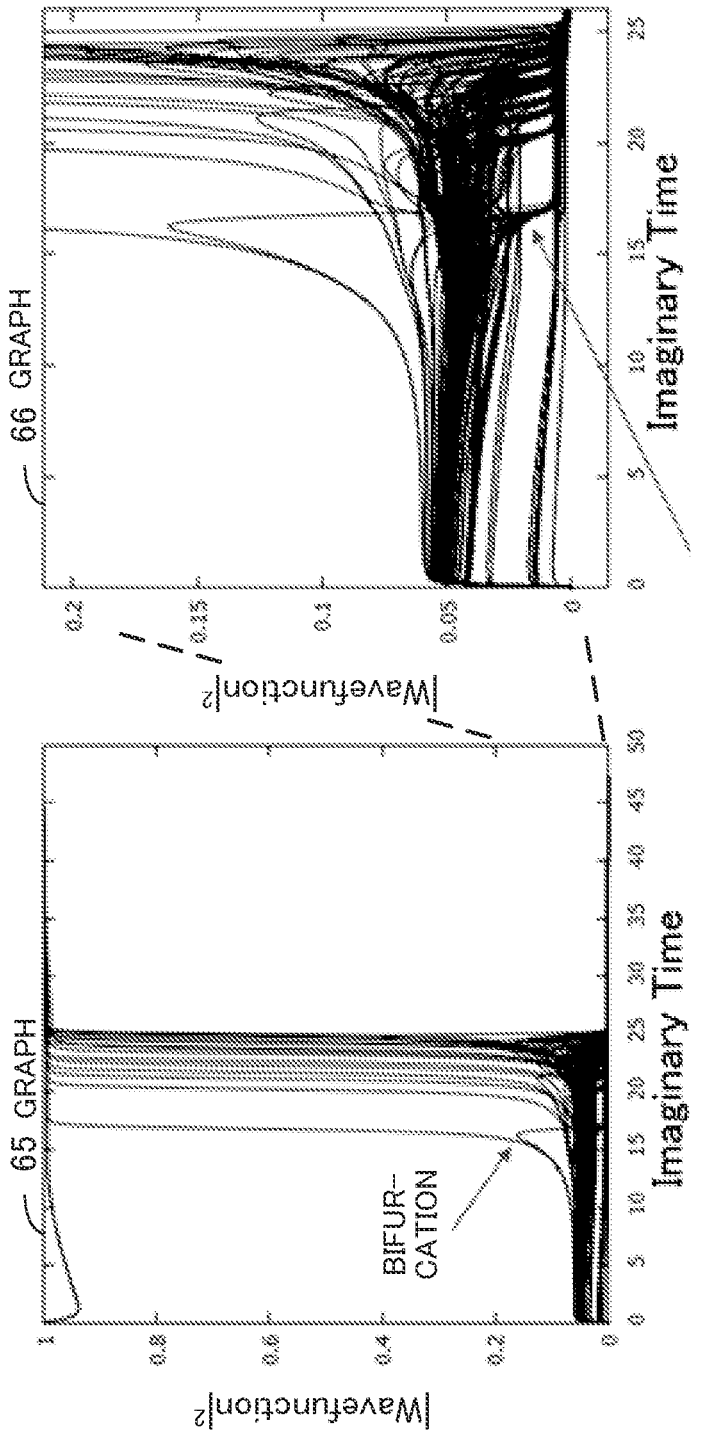
FIG. 25 illustrates time propagation of a typical quantum trial.

FIG. 25 illustrates time propagation of a typical quantum trial. FIG. 25 depicts temporal variations in the microscopic states of spins over one typical quantum trial during the QTSA. In graphs 65 and 66 of FIG. 25, the horizontal axis represents imaginary time and the vertical axis represents observation probability (the square of the absolute value of the wavefunction) of spin in state 11>. The graph 66 is an enlarged view of the graph 65, around the range of observation probability from 0 to 0.2.

It is understood from the graph 65 that spin flips do not occur at the same time but a certain spin flips and is set in the state and then successive spin flips take place. In the graph 65, the aforementioned bifurcation is observed around imaginary time $\tau \approx 15$. When, in a classical Ising model, this phenomenon has occurred, $2^N$ solution candidates are reduced to one quarter, i.e., $2^{N-2}$. This is because the classical states of two spins have been determined. Another phenomenon may also occur where the state of one spin is set, which then drives a bundle of many qubits together to be set in a classical state. This is seen in the graph 66. The state of one qubit is set to 1, and then the states of many qubits bundled together are set to 0 almost at the same time. The number of qubits in the bundle varies, sometimes 2 and other times 10 or more. What is important is that once this phenomenon occurs, the solution search space instantly becomes $2^{N-q}$ given the number of qubits in the bundle being q. The solution space exponentially decreases each time. In the case of the graph 66, for example, a bundle of 20 qubits or so all together turns to state 0 at one time. Assuming that a bundle includes about 20 qubits set to state I0>, the size of the solution space decreases to a fraction of a millionth each time this phenomenon occurs because $2^{20}$ is equivalent to approximately a fraction of a millionth. Because the phenomenon occurs in a row over a short amount of time, the solution space decreases in size very quickly.

This is equivalent to searching a solution space with size of $2^N$ faster than binary tree. That is, an exponentially large search space is reduced exponentially.

Next described is how energy is lost by heat dissipation.

FIG. 26 illustrates energy dissipation in the quantum theory approach. FIG. 26 depicts heat dissipation by imaginary time propagation in the process of reaching the optimal solution of ulysses16, i.e., 6859. In graphs 67 and 68 of FIG. 26, the horizontal axis represents imaginary time and the vertical axis represents energy. The graph 68 is an enlarged view of the graph 67, around the range of energy from 6840 to 7000.

The phenomenon depicted in FIG. 26 always occurs in each quantum trial. At first, the energy decreases gradually when it is close to the ground state of the transverse field. However, as the imaginary time propagation proceeds, there is a sharp sudden energy drop in a remarkably short time during a certain period. At this time, the symmetry of the system is nearly determined, which means that it is determined at this time which spins are to be in state 1 or 0. Subsequently, there is a period of time during which the energy virtually remains constant. As illustrated in the spin-flip diagram of FIG. 25, not all the spins flip at the same time. Some spins are not yet set, and for this reason, very slow energy relaxation takes place here. However, at a certain point, some spins are determined to eventually be in state 1, and then others follow to be in state 0. Then, the energy starts decreasing exponentially again, and reaches the final state of 6859. This is easy to understand by seeing this as a type of base selection taking place.

This trend is more evident if the number of qubits increases. Therefore, the case of ulysses22 including a larger number of cities than ulysses16 is provided next as an example. ulysses22 is also publicly available, whose optimal solution is known to be 7013. When ulysses22 is mapped into an Ising model, the number of qubits is 484.

Figure 27:
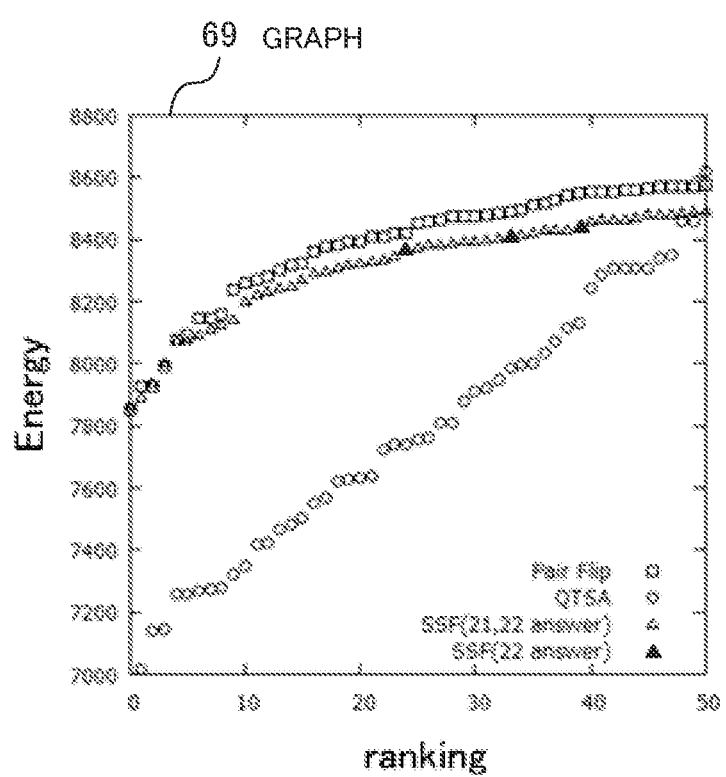
FIG. 27 illustrates an example of ranking information on ulysses22.

FIG. 27 illustrates an example of ranking information on ulysses22. A graph 69 of FIG. 27 depicts results of the top 50 trials in ascending order of energy amongst 200 quantum trials based on the QTSA. Calculation conditions given to the optimization apparatus 100 are as follows.

The number of replicas in the classical MCMC-based sampling is 20. Replica exchange is implemented in the same manner as in ulysses16, and a random walk of the replicas is performed in temperature space. In addition, the simulated temperature is set to a sufficiently high value. For each replica, one billion trials are performed. Both SSF (triangles in the graph 69) and PSF (squares) schemes are employed. The penalty value is set to 4000.

Solid triangles in the graph 69 represent solutions meeting the constraint condition. In the case of SSF, although the energy decreases, solutions with constraint violations are not excluded due to the penalty value set to 4000. A minimum energy value of 7861 is obtained; however, this is an infeasible solution. Only feasible solutions, i.e., solutions satisfying the constraint condition, amongst the top 50 of the obtained solutions are depicted by solid triangles in the graph 69. The minimum value of the solutions satisfying the constraint is 8365, which is more than 1300 higher in energy than the optimal solution. In the case of PSF, because spins are flipped such that the constraint condition is met, all solutions satisfy the constraint. The best value of the solutions is 7852.

On the other hand, the minimum value obtained by the quantum theory approach is 7019 after 200 trials, which is above 7013, yet is sufficiently close to the optimal solution.

Figure 28:
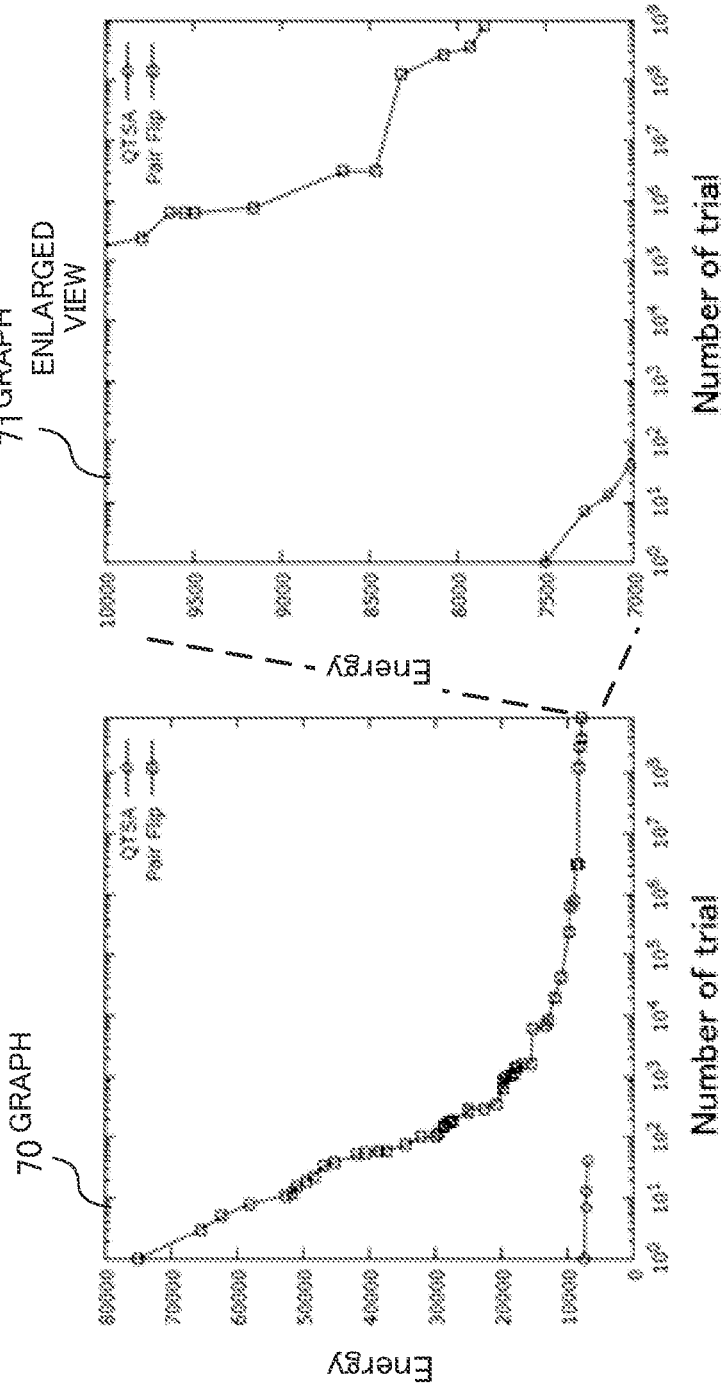
FIG. 28 illustrates how solution is updated on ulysses22.

FIG. 28 illustrates how the solution is updated on ulysses22. In graphs 70 and 71, the horizontal axis represents the number of trials and the vertical axis represents energy. Results of the quantum trials are represented by circles while those of the classical MCMC are represented by squares. The graph 71 is an enlarged view of the graph 70, around the range between 7000 and 10000.

The number of steps for a burn-in period (initial relaxation) tends to increase with a higher degree of freedom. In addition, relaxation after the initial relaxation slows down further, and thus the classical MCMC calculation faces serious difficulties which grow at an accelerating pace as the degree of freedom increases. This is not the case for the quantum trials, which promptly work out almost the optimal solution. Although both the approaches fail to reach the optimal solution, using the solution obtained by the quantum theory approach as an input of the classical MCMC calculation allows the optimal solution to be obtained by exchanging two cities. Note that the classical MCMC-based calculation is terminated because a tenfold increase in the number of trials leads to little improvement in the solution. It is seen in the graph 71 that the solution obtained by the classical MCMC calculation after 1 billion trials is still higher than the initial value yielded by the quantum trial approach.

<<Quantum-Classical Hybrid Calculation>>

As for the solution 7019, which is obtained by solving ulysses22 using the quantum trial approach, the problem is assumed to be practically solved. This may be understood by examining the microscopic states of spins. In the case of ulysses22, the sequence of cities in the optimal solution is: {1, 14, 13, 12, 7, 6, 15, 5, 11, 9, 10, 19, 20, 21, 16, 3, 2, 17, 22, 4, 18, 8}. The microscopic states of the obtained solution 7013 has cities 14 and 13 swapped in order, that is: {1, 13, 14, 12, 7, 6, 15, 5, 11, 9, 10, 19, 20, 21, 16, 3, 2, 17, 22, 4, 18, 8}.

This means that, by using the solution 7013 as an initial value of a different solution method, the real solution is obtained after a minimum of one trial. The QTSA scheme provides solution candidates by a mechanism different from that of the MCMC. Therefore, when the solution is not obtained only by the quantum theory approach, the QTSA that combines the quantum theory approach with the classical theory approach may be able to reach a real solution. The calculation of ulysses22 described above is one example demonstrating that the combination of the quantum and classical theory approaches readily finds a real solution.

According to the QTSA scheme, the ground state is obtained stochastically. The QTSA scheme is completely different from the MCMC approach, and finds the solution by a type of tunneling effect based on quantum mechanics. Once the classical MCMC-based approach gets stuck in a local minima, it is not easy to escape from it. It is also hard to reach a state at a large Hamming distance. However, these issues are irrelevant in the quantum theory approach because energy loss is caused by heat dissipation and, as if passing through potential barriers by the tunneling effect, the system energy rapidly decreases and reaches a value close to the ground state energy on its own.

<<Effects of Setting Energy Resolution>>

Next described are effects of deciding in advance energy resolution of the ITP method based on equation (5.3). The energy resolution serves as a threshold for testing energy convergence in imaginary time propagation.

A numerical experiment conducted for demonstrating the effects of deciding the energy resolution is as follows. The 8-city TSP of FIG. 18 is used. Energy resolutions examined are $\Delta E=10^{-5}$, $10^{-6}$, $10^{-7}$, $10^{-8}$, $10^{-9}$, $10^{-10}$, $10^{-11}$, and $10^{-12}$. For each energy resolution, 1000 quantum trials are conducted. Noise given to the initial state of a wavefunction is randomly added on single-particle excitation basis. The magnitude of noise is also randomly determined. Therefore, even when noise is added to the same qubit, different final states are reached. This is because equation (2.16) is a non-linear equation and depends on the amplitude of noise.

The summary of the results of the numerical experiments is described below. In the case where the energy resolution is larger than $\Delta E=10^{-6}$, the energy level does not reach a state corresponding to a classical one. This corresponds to the case where the observing time of the uncertainty principle equation (5.3) is shortened, and also means that, in quantum annealing, reducing the magnetic field quickly results in failure.

In the case of $\Delta E=10^{-7}$, the energy level converged to a state corresponding to a classical Ising model in 858 quantum trials out of 1000; however, in the remaining 142 trials, the energy level fails to converge to a state corresponding to a classical state. In the case of $\Delta E \leq 10^{-8}$, the energy level successfully converged to a state corresponding to a classical state in all the 1000 quantum trials.

This indicates that, in quantum annealing, the maximum decreasing rate of the magnetic field to be complied with exists. If the speed of decreasing the magnetic field is too high, the energy level does not converge even to a state corresponding to a classical state, let alone to the ground state.

Next described are effects of increasing energy resolution.

Figure 29:
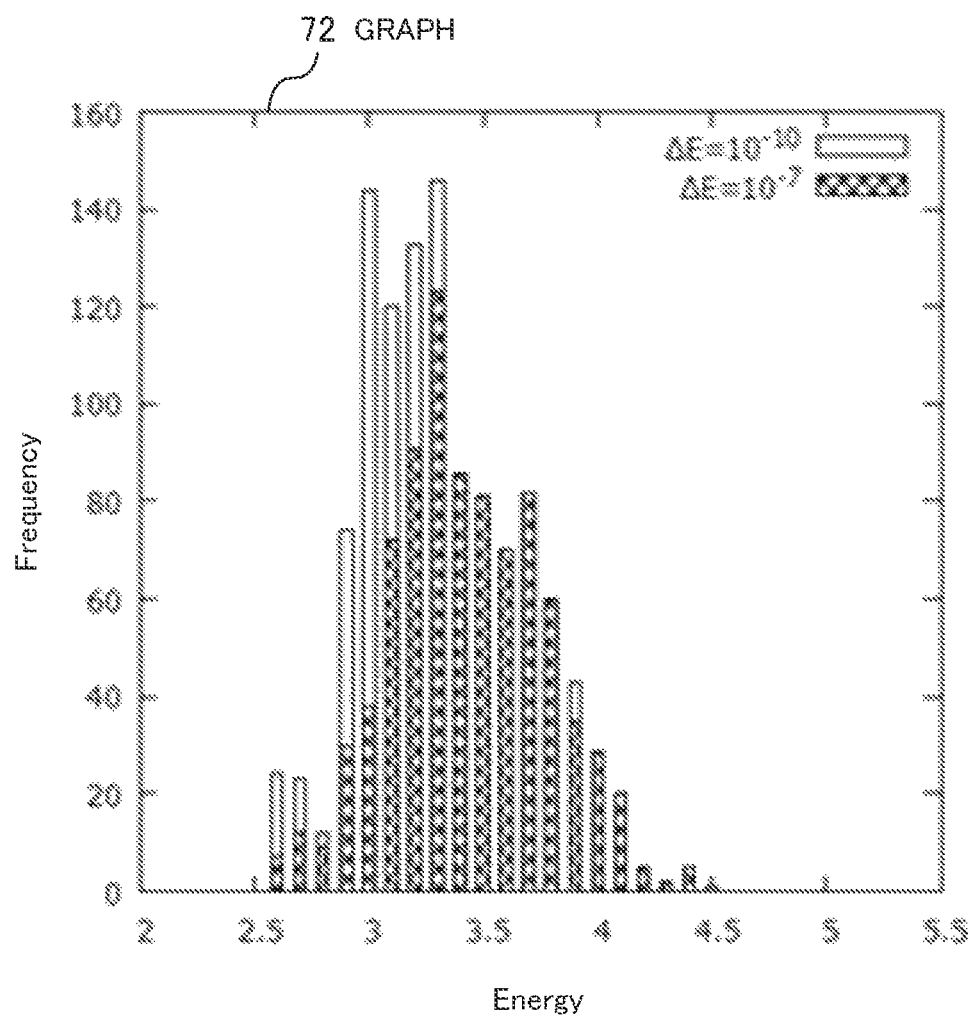
FIG. 29 illustrates exemplary results of quantum trials for each degree of energy resolution.

FIG. 29 illustrates exemplary results of quantum trials for each degree of energy resolution. A graph 72 of FIG. 29 is a histogram of energy values obtained in 1000 quantum trials with different degrees of resolution, $\Delta E=10^{-7}$ and $10^{-10}$. In a graph 72, the horizontal axis represents energy, and the vertical axis represents frequency (the number of trials in which a corresponding energy value is observed). The histogram includes only the results of trials whose obtained energy states correspond to classical states. In the case of $\Delta E=10^{-7}$, sampling fails with a fixed probability, which results in energy states unable to be mapped to classical state. Values of the energy states unable to be mapped are of the order of $10^2$.

The histogram depicts probability distributions on values of energy states obtained by the quantum trials. It is seen from FIG. 29 that, with higher energy resolution, states with lower energy values are observed more often, and also the ground state is more likely to be sampled.

When the energy resolution is low (coarse resolution), the distribution is bell-shaped. Because the probability of success of sampling the ground state increases as the degree of energy resolution becomes higher, the overall shape of the distribution is skewed to the right with more observations on the lower end.

Although the probability of success of sampling energy states on the lower end increases as the degree of energy resolution is set higher, the calculation takes longer. In imaginary time propagation, the energy tends to decay exponentially, and the calculation time therefore remains within, at most, several fold if the energy resolution is increased to one-tenth or one-hundredth. Nonetheless, the higher the energy resolution is, the longer the calculation time.

This indicates that, in sampling, there is an optimum decreasing rate of the magnetic field for quantum annealing. Calculation time is reduced by decreasing the transverse field faster; however, this makes the heat dissipation mechanism difficult to work, which in turn reduces the probability of obtaining the ground state. Conversely, sufficiently slow annealing of the transverse field allows for heat dissipation but in turn increases calculation time.

With regard to the experiment, the heat dissipation effect is incorporated as a non-unitary term in the framework of this calculation, and renormalization is performed to avoid the wavefunction from going to 0 halfway through. If the experimental system is desired to be made closer to an actual system, the heat dissipation term is multiplied by a coefficient to adjust the magnitude of heat dissipation. Besides, with no renormalization performed, the experimental system moves toward an actual system. In that case, as the calculation time increases more, the amplitude of the wavefunction vanishes and only noise remains at the end. Therefore, it is inadvisable to increase the energy resolution too high in an actual system. There is an optimal observing time that varies depending on the problem. That is, the minimum annealing rate to be complied with exists.

The framework where renormalization of the wavefunction is performed deals with such an ideal condition that the probability lost by heat dissipation is always amplified from the outside.

Thus, it turns out that, in the case of allowing stochastically obtaining the ground state of a system even if the first-order quantum phase transition occurs, the energy resolution (the rate of annealing) does not have to comply with the adiabatic transition condition.

(c) Third Embodiment

According to the second embodiment, the optimization apparatus 100 adds noise to the wavefunctions of spins in the initial states. That is, by employing such a measure of breaking the symmetry of the wavefunctions, quantum trials are defined. However, the QTSA governing equation is a mean field approximation. To ensure that the solution of the QTSA stochastically converges to the ground state, the symmetry needs to be broken as time proceeds. For this purpose, the optimization apparatus 100 may add noise to a coefficient of the magnetic field.

For example, the optimization apparatus 100 may add noise to the coefficient of the transverse field $J_i$ of the i-th spin, as defined by equation (8.1) below.

$$J_i = J + \frac{i}{N} \tag{8.1}$$

Here, J is the strength of the total transverse field. To establish a formula, the strength of the transverse field acting on each spin is assumed to be the same. Now, the optimization apparatus 100 randomly introduces fluctuations to the strength of the transverse field as noise. In this manner, addition of very small noise suffices to break the symmetry of the system. This therefore produces similar results to the case of adding noise to wavefunctions.

Figure 30:
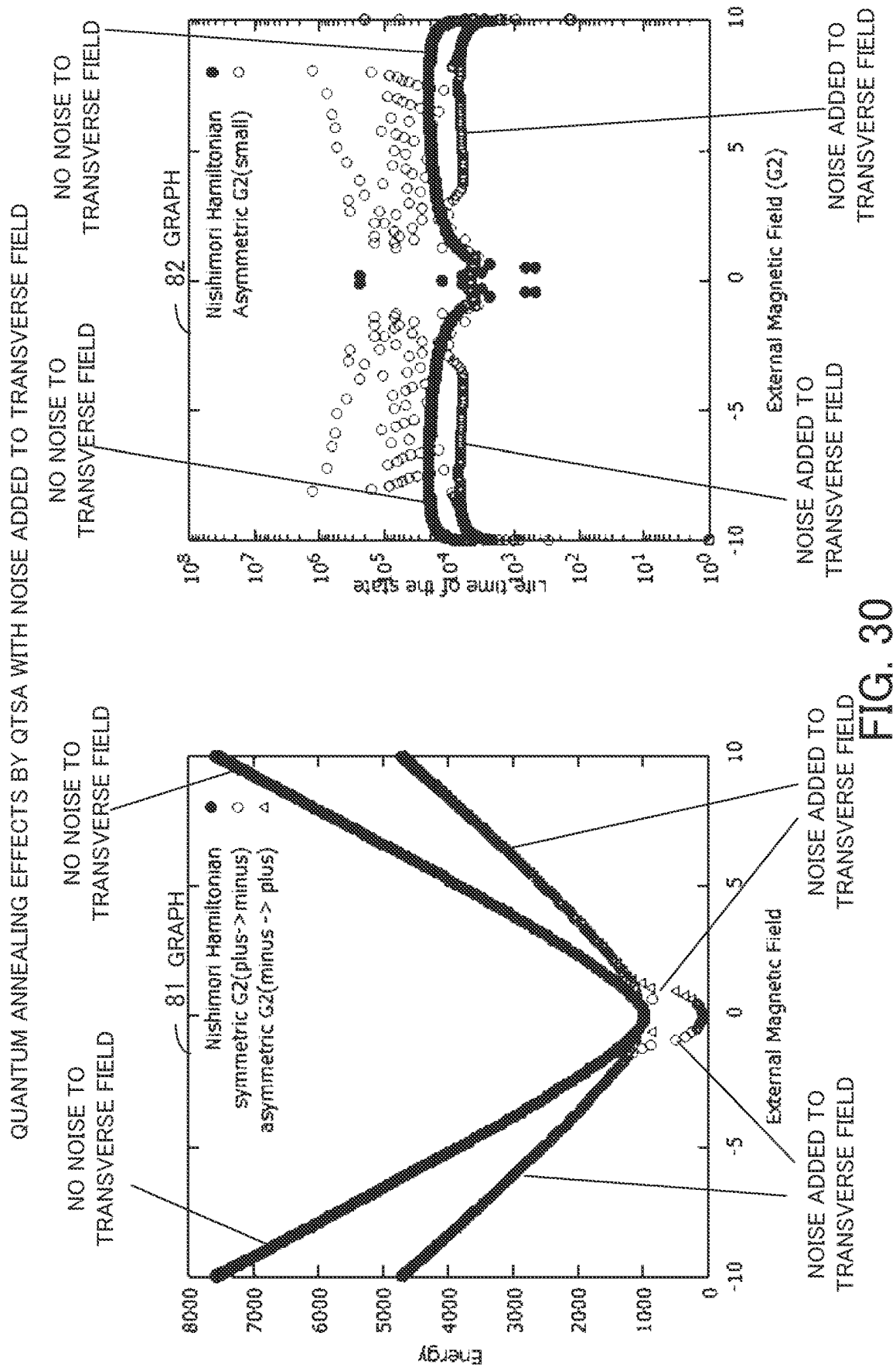
FIG. 30 illustrates exemplary results of quantum annealing by QTSA, in the case where noise is added to the transverse field.

FIG. 30 illustrates exemplary results of quantum annealing by QTSA, in the case where noise is added to the transverse field. A left-hand graph 81 represents energy as a function of the strength of the transverse field. In the graph 81, the horizontal axis indicates the strength of the transverse field while the vertical axis indicates energy. The solid circles in the graph 81 represent exemplary calculated results of the QTSA, obtained when no noise is added to the transverse field. Both the open circles and triangles represent exemplary calculated results of the QTSA, with noise addition.

A right-hand graph 82 depicts the number of calculation steps needed before imaginary time propagation as a function of the transverse field converges. In the graph 82, the horizontal axis represents the strength of the transverse field, and the vertical axis represents the number of calculation steps needed before the imaginary time propagation converges. The solid circles depict exemplary calculated results of the QTSA, obtained when no noise is added to the transverse field. The open circles depict exemplary calculated results of the QTSA, with noise addition.

The calculated examples of FIG. 30 are cases where the energy level does not decrease and the system is trapped in a metastable state under a typical quantum annealing protocol. As depicted in the graph 81, when, in calculation, asymmetry is introduced to the magnetic field, the transverse field is reduced and, then, the energy quickly decreases. If the transverse field increases in the negative direction, the system tries to return to its original state. That is, the energy of the system decreases when the symmetry of the system is broken in some way.

Also as depicted in the graph 82, in the case of introducing no asymmetry (solid circles), imaginary time propagation converges in an almost constant number of trials. It can be seen that the number of trials increases in the range of $G_2 \approx 0$. This is because the strength of the transverse field is reduced and, therefore, spin flips are less likely to occur. On the other hand, introduction of asymmetry to the magnetic field suddenly extends the lifetime at multiple values of $G_2$, which represents emergence of many metastable states. Thus, it turns out that a slight asymmetry brings a substantial change to the behavior of the system, and the system collapses to a lower energy state.

In the above-described manner, introduction of asymmetry to the magnetic field achieves a similar effect to noise addition to the wavefunction. Note that the way of adding noise to the magnetic field illustrated above is just an example. As in the case of adding noise to the wavefunction, particular k spins may be selected, to which uniform or non-uniform noise is then added.

(d) Other Embodiments

The QTSA with noise addition may allow for parallel processing. By the definition of quantum trials, noise addition produces different results, and two different quantum trials are run independently of one another. Therefore, Hamiltonian information is given once to individual L classical computing machines (L is an integer greater than or equal to 1), and then only information on noise to be added needs to be given. After calculation, simply the results of qubits information are then collected. The computation involves only vector and matrix operations. Therefore, the calculation is desirably compatible with superscalar-based parallel computers and accelerators such as GPUs.

When being given coefficients of an optimization problem represented by an Ising model, the optimization apparatus 100 is able to calculate the optimal solution by the QTSA scheme. That is, the optimization apparatus 100 is able to calculate optimal solutions if optimization problems are described by Ising models, irrespective of areas and industries of the problems. For example, the optimization apparatus 100 is able to find the solutions of minimization problems in areas including finance, distribution, material engineering, computational chemistry, and computational biology. In addition, the optimization apparatus 100 is able to find the solutions of minimization problems in industries including finance, distribution, and healthcare (pharmaceutical).

According to the second and third embodiments above, the optimization apparatus 100 is implemented by a von Neumann computer structure, including the processor 101 and the memory 102; however, an optimization apparatus may be implemented, for example, using a quantum computer. In this case, heat dissipation in the quantum computer-based optimization apparatus may be phenomenologically incorporated into the optimization apparatus 100 in the von Neumann architecture. This allows the von Neumann computer-based optimization apparatus 100 to be also used as a simulator for designing hardware of the quantum computer-based optimization apparatus.

According to one aspect, it is possible to efficiently find the ground state of an Ising model.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
  a memory; and
  a processor coupled to the memory and configured to execute a process including:
    adding, in finding a ground state of an Ising model by running a simulation of state changes of the Ising model that occur upon reduction in a magnetic field applied to the Ising model, a value corresponding to noise to some of coefficients used in the simulation, the Ising model representing a target problem, the coefficients being included in wavefunctions of some spins amongst a plurality of spins included in an initial state of the Ising model, and
    performing a first process of real time propagation of reducing strength of the magnetic field as time in the simulation progresses and a second process of reducing energy of the Ising model based on an imaginary time propagation method by using a resultant state of the Ising model with the value corresponding to the noise added thereto, as a starting state of the simulation,
  wherein the adding of the value corresponding to the noise includes randomly selecting the some spins to be given the value corresponding to the noise amongst the plurality of spins.

2. The optimization apparatus according to claim 1, wherein:
  the adding of the value corresponding to the noise includes performing, a plurality of times, the adding of the value corresponding to the noise on the Ising model to generate a plurality of states of the Ising model, each with a different pattern of the noise, and
  the performing of the first process and the second process includes performing the first process and the second process by using each of the plurality of states of the Ising model as the starting state of the simulation.

3. The optimization apparatus according to claim 1, wherein:
  the adding of the value corresponding to the noise includes adding the value corresponding to the noise to coefficients each indicating strength of the magnetic field acting on a spin included in the Ising model.

4. The optimization apparatus according to claim 1, wherein:
  the process further includes:
    determining a state of each spin of the Ising model based on quantum mechanics to take one of possible values based on classical mechanics, the state of each spin of the Ising model being obtained by repeating the first process and the second process, and
    performing a third process of obtaining the ground state of the Ising model by a solution based on the classical mechanics, using, as an initial state, a state of a classical Ising model where each spin has the determined value.

5. A non-transitory computer-readable recording medium storing therein a computer program that causes a computer to execute a process comprising:
  adding, in finding a ground state of an Ising model by running a simulation of state changes of the Ising model that occur upon reduction in a magnetic field applied to the Ising model, a value corresponding to noise to some of coefficients used in the simulation, the Ising model representing a target problem, the coefficients being included in wavefunctions of some spins amongst a plurality of spins included in an initial state of the Ising model; and
  performing a first process of real time propagation of reducing strength of the magnetic field as time in the simulation progresses and a second process of reducing energy of the Ising model based on an imaginary time propagation method by using a resultant state of the Ising model with the value corresponding to the noise added thereto, as a starting state of the simulation,
  wherein the adding of the value corresponding to the noise includes randomly selecting the some spins to be given the value corresponding to the noise amongst the plurality of spins.

6. An optimization method comprising:
  adding, by a processor, in finding a ground state of an Ising model by running a simulation of state changes of the Ising model that occur upon reduction in a magnetic field applied to the Ising model, a value corresponding to noise to some of coefficients used in the simulation, the Ising model representing a target problem, the coefficients being included in wavefunctions of some spins amongst a plurality of spins included in an initial state of the Ising model; and performing, by the processor, a first process of real time propagation of reducing strength of the magnetic field as time in the simulation progresses and a second process of reducing energy of the Ising model based on an imaginary time propagation method by using a resultant state of the Ising model with the value corresponding to the noise added thereto, as a starting state of the simulation, wherein the adding of the value corresponding to the noise includes randomly selecting the some spins to be given the value corresponding to the noise amongst the plurality of spins.

* * * * *